(12) United States Patent
Gerhardt et al.

(10) Patent No.: US 12,219,081 B2
(45) Date of Patent: *Feb. 4, 2025

(54) SYSTEMS AND METHODS FOR CONTROLLING A LOCKING MECHANISM USING A PORTABLE ELECTRONIC DEVICE

(71) Applicant: The Chamberlain Group LLC, Oak Brook, IL (US)

(72) Inventors: Paul Michael Gerhardt, Palo Alto, CA (US); Charles Cameron Robertson, Mountain View, CA (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,941

(22) Filed: Jun. 25, 2020

(65) Prior Publication Data

US 2020/0329136 A1 Oct. 15, 2020

Related U.S. Application Data

(63) Continuation of application No. 16/511,772, filed on Jul. 15, 2019, now Pat. No. 10,708,410, which is a
(Continued)

(51) Int. Cl.
*G07C 9/00* (2020.01)
*H04L 9/40* (2022.01)
(Continued)

(52) U.S. Cl.
CPC .... *H04M 1/72415* (2021.01); *G07C 9/00309* (2013.01); *G07C 9/00571* (2013.01);
(Continued)

(58) Field of Classification Search
CPC ............ G07C 9/00309; G07C 9/00571; G07C 2009/00365; G07C 2009/00412;
(Continued)

(56) References Cited

U.S. PATENT DOCUMENTS 6,134,593 A 10/2000 Alexander
6,204,763 B1 3/2001 Sone
(Continued)

FOREIGN PATENT DOCUMENTS

AT 501039 5/2006
AT 008481 8/2006
(Continued)

OTHER PUBLICATIONS

"Assa Abloy trials remote hotel check-ins", © 2012 AOL Inc., [online]. Retrieved from the Internet: <URL: http://www.engadget.com/2010/11/02/assa-abloy-trials-remote-hotel-check-ins-unlocking-your-room-wi/>, (Accessed Apr. 23, 2012), 2 pgs.
(Continued)

*Primary Examiner* — Nabil H Syed
(74) *Attorney, Agent, or Firm* — Dority & Manning, P.A.

(57) ABSTRACT

Systems and methods are provided for operating a remotely operable lock. In an example embodiment, a method comprises receiving credentials at a web service from a portable electronic device, authenticating the credentials, and based on a successful authentication, issuing a command for receipt by the lock from the web service or the portable electronic device.

20 Claims, 54 Drawing Sheets

Related U.S. Application Data continuation of application No. 15/686,385, filed on Aug. 25, 2017, now Pat. No. 10,382,608, which is a continuation of application No. 14/468,114, filed on Aug. 25, 2014, now abandoned, which is a continuation of application No. 13/462,669, filed on May 2, 2012, now abandoned.

(60) Provisional application No. 61/481,518, filed on May 2, 2011.

(51) Int. Cl.
| | | |
|---|---|---|
| *H04M 1/72415* | (2021.01) | |
| *H04W 12/06* | (2021.01) | |
| *H04W 12/08* | (2021.01) | |
| *H04W 12/50* | (2021.01) | |
| *H04W 12/64* | (2021.01) | |
| *H04W 12/77* | (2021.01) | |

(52) U.S. Cl.
CPC ...... *H04L 63/0428* (2013.01); *H04L 63/0492* (2013.01); *H04L 63/08* (2013.01); *H04W 12/06* (2013.01); *H04W 12/08* (2013.01); *H04W 12/50* (2021.01); *G07C 2009/00365* (2013.01); *G07C 2009/00412* (2013.01); *G07C 2209/64* (2013.01); *H04W 12/64* (2021.01); *H04W 12/77* (2021.01)

(58) Field of Classification Search
CPC .......... G07C 2209/64; H04M 1/72415; H04W 12/06; H04W 1/08
See application file for complete search history.

(56) References Cited

U.S. PATENT DOCUMENTS

| | | | |
|---|---|---|---|
| 6,529,949 B1 | 3/2003 | Getsin | |
| 6,574,455 B2 | 6/2003 | Jakobsson | |
| 6,793,253 B2 | 9/2004 | Bruwer | |
| 6,853,853 B1 | 2/2005 | Van Wiemeersch | |
| 6,909,356 B2 | 6/2005 | Brown | |
| 6,950,725 B2 | 9/2005 | Von Kannewurff | |
| 6,952,181 B2 | 10/2005 | Karr | |
| 6,965,294 B1 | 11/2005 | Elliott | |
| 6,967,562 B2 | 11/2005 | Menard | |
| 6,987,452 B2 | 1/2006 | Yang | |
| 7,035,916 B1 | 4/2006 | Backman | |
| 7,120,697 B2 | 10/2006 | Aiken, Jr. | |
| 7,149,959 B1 | 12/2006 | Jones | |
| 7,170,998 B2 | 1/2007 | McLintock | |
| 7,193,644 B2 | 3/2007 | Carter | |
| 7,205,908 B2 | 4/2007 | Tsui | |
| 7,212,889 B2 | 5/2007 | Mann | |
| 7,237,013 B2 | 6/2007 | Winkeler | |
| 7,260,835 B2 | 8/2007 | Bajikar | |
| 7,269,634 B2 | 9/2007 | Getsin | |
| 7,379,805 B2 | 5/2008 | Olsen, III | |
| 7,553,173 B2 | 6/2009 | Kowalick | |
| 7,735,732 B2 | 6/2010 | Linton | |
| 7,746,223 B2 | 6/2010 | Howarter | |
| 7,786,891 B2 | 8/2010 | Owens | |
| 7,788,221 B2 | 8/2010 | Tanaka | |
| 7,847,675 B1 | 12/2010 | Thyen | |
| 8,018,329 B2 | 9/2011 | Morgan | |
| 8,044,782 B2 | 10/2011 | Saban | |
| 8,045,961 B2 | 10/2011 | Ayed | |
| 8,093,986 B2 | 1/2012 | Harvey | |
| 9,322,194 B2 | 4/2016 | Cheng | |
| 9,322,201 B1 | 4/2016 | Cheng | |
| 9,326,094 B2 | 4/2016 | Johnson | |
| 9,359,794 B2 | 6/2016 | Cheng | |
| 9,382,739 B1 | 7/2016 | Johnson | |
| 9,447,609 B2 | 9/2016 | Johnson | |
| 9,470,018 B1 | 10/2016 | Cheng | |
| 9,530,262 B2 | 12/2016 | Johnson | |
| 9,530,295 B2 | 12/2016 | Johnson | |
| 9,644,399 B2 | 5/2017 | Johnson | |
| 9,647,996 B2 | 5/2017 | Johnson | |
| 9,652,917 B2 | 5/2017 | Johnson | |
| 9,683,391 B2 | 6/2017 | Johnson | |
| 9,704,320 B2 | 7/2017 | Johnson | |
| 9,727,328 B2 | 8/2017 | Johnson | |
| 9,779,571 B2 | 10/2017 | Chong | |
| 9,916,746 B2 | 3/2018 | Johnson | |
| 10,138,671 B2 | 11/2018 | Fitzgibbon | |
| 10,382,608 B2 | 8/2019 | Gerhardt | |
| 10,708,410 B2 | 7/2020 | Gerhardt | |
| 2001/0040422 A1 | 11/2001 | Gramlich | |
| 2002/0147919 A1 | 10/2002 | Gentry | |
| 2002/0152390 A1 | 10/2002 | Furuyama | |
| 2002/0177460 A1 | 11/2002 | Beasley | |
| 2002/0180582 A1 | 12/2002 | Nielsen | |
| 2003/0007851 A1 | 1/2003 | Heigl | |
| 2003/0208386 A1* | 11/2003 | Brondrup | G07C 9/00904 705/5 |
| 2004/0057567 A1 | 3/2004 | Lee | |
| 2004/0066328 A1 | 4/2004 | Galley | |
| 2004/0168083 A1 | 8/2004 | Gasparini | |
| 2005/0006908 A1 | 1/2005 | Bruwer | |
| 2005/0060063 A1 | 3/2005 | Reichelt | |
| 2005/0080898 A1 | 4/2005 | Block | |
| 2005/0149741 A1 | 7/2005 | Humbel | |
| 2005/0172462 A1 | 8/2005 | Rudduck | |
| 2005/0199019 A1 | 9/2005 | Marcelle | |
| 2005/0204787 A1 | 9/2005 | Ernst | |
| 2005/0258935 A1 | 11/2005 | Hom | |
| 2006/0058012 A1 | 3/2006 | Caspi | |
| 2006/0170533 A1 | 8/2006 | Chioiu | |
| 2006/0176016 A1 | 8/2006 | Kok | |
| 2006/0190419 A1 | 8/2006 | Bunn | |
| 2006/0255912 A1 | 11/2006 | Simms | |
| 2007/0022438 A1 | 1/2007 | Arseneau | |
| 2007/0176739 A1 | 8/2007 | Raheman | |
| 2007/0193834 A1 | 8/2007 | Pai | |
| 2008/0072170 A1 | 3/2008 | Simons | |
| 2008/0168271 A1 | 7/2008 | Sherburne | |
| 2008/0247345 A1 | 10/2008 | Bahar | |
| 2008/0261560 A1* | 10/2008 | Ruckart | G07C 9/21 455/411 |
| 2008/0298230 A1 | 12/2008 | Luft | |
| 2009/0037217 A1 | 2/2009 | Naik | |
| 2009/0231093 A1 | 9/2009 | Keller, Jr. | |
| 2009/0251281 A1 | 10/2009 | Fitzgibbon | |
| 2010/0075655 A1 | 3/2010 | Howarter | |
| 2010/0176919 A1 | 7/2010 | Myers | |
| 2010/0201536 A1 | 8/2010 | Robertson | |
| 2010/0250929 A1 | 9/2010 | Schultz | |
| 2010/0274570 A1 | 10/2010 | Proefke | |
| 2010/0278457 A1 | 11/2010 | Greco | |
| 2010/0283560 A1 | 11/2010 | Sommer | |
| 2010/0283580 A1 | 11/2010 | Sheng | |
| 2010/0306549 A1 | 12/2010 | Ullmann | |
| 2011/0060480 A1 | 3/2011 | Mottla | |
| 2011/0084836 A1 | 4/2011 | Fitzgibbon | |
| 2011/0106329 A1 | 5/2011 | Donnelly | |
| 2011/0165896 A1 | 7/2011 | Stromberg | |
| 2011/0166700 A1 | 7/2011 | Dunn | |
| 2011/0187497 A1 | 8/2011 | Chin | |
| 2011/0227712 A1 | 9/2011 | Atteck | |
| 2011/0231914 A1 | 9/2011 | Hung | |
| 2011/0252843 A1 | 10/2011 | Sumcad | |
| 2011/0311052 A1 | 12/2011 | Myers | |
| 2012/0007735 A1 | 1/2012 | Rhyins | |
| 2012/0280783 A1 | 11/2012 | Gerhardt | |
| 2012/0280789 A1 | 11/2012 | Gerhardt | |
| 2012/0280790 A1 | 11/2012 | Gerhardt | |
| 2013/0024222 A1 | 1/2013 | Dunn | |
| 2014/0265359 A1 | 9/2014 | Cheng | |
| 2014/0365773 A1 | 12/2014 | Gerhardt | |
| 2015/0102906 A1 | 4/2015 | Gerhardt | |
| 2015/0145993 A1 | 5/2015 | Scalisi | |
| 2015/0181014 A1 | 6/2015 | Gerhardt | |

(56) References Cited

U.S. PATENT DOCUMENTS

| | | |
|---|---|---|
| 2017/0099295 A1 | 4/2017 | Ricci |
| 2018/0191889 A1 | 7/2018 | Gerhardt |
| 2019/0085615 A1 | 3/2019 | Cate |
| 2019/0342443 A1 | 11/2019 | Gerhardt |
| 2020/0002997 A1 | 1/2020 | Fitzgibbon |

FOREIGN PATENT DOCUMENTS

| | | |
|---|---|---|
| AT | 008482 | 8/2006 |
| CN | 101329779 | 12/2008 |
| CN | 101329779 A | 12/2008 |
| CN | 103635940 | 3/2014 |
| CN | 103635940 A | 3/2014 |
| KR | 20040035952 | 4/2004 |
| KR | 1020040035952 | 4/2004 |
| WO | 0210040 | 2/2002 |
| WO | 02100040 | 12/2002 |
| WO | 02100040 A | 12/2002 |
| WO | 2006136662 | 12/2006 |
| WO | 2006136662 A | 12/2006 |
| WO | 2010144490 | 12/2010 |
| WO | 2010144490 A | 12/2010 |
| WO | 2012151290 | 11/2012 |
| WO | 2012151290 A | 11/2012 |

OTHER PUBLICATIONS

"Cell phone controlled door lock", Copyright © 2012, Hack a Day, [online]. Retrieved from the Internet: <URL: http:J/hackaday.com/2007/07/17/cell-phone-controlled-door-lock/>, Accessed Apr. 23, 2012), 11 pgs.

"Chinese Application Serial No. 201280032878.2, Office Action mailed May 11, 2015", w/English Translation, 14 pgs.

"Chinese Application Serial No. 201280032878.2, Office Action mailed Sep. 26, 2018", w/English Translation, 14 pgs.

"ECKey—Turn your phone into a KEY!", [online}. Retrieved from the Internet: <URL: http://www.eckev.com/>, (Accessed Apr. 23, 2012), 2 pgs.

"iDoor—iPhone Controlled Hydraulic Door", http://varenhor.st/ 2009 /07 /idoor-i phone-contro lied- hydraulic-door/, retrieved Apr. 23, 2012, 12 pages.

"iDoor—iPhone Controlled Hydraulic Door", Chris Varenhorst chris@localhost, [online]. Retrieved from the Internet: <URL: http://varenhor.st/2009/07/idoor-iphone-controlledhydraulic-door/>, (Accessed Apr. 23, 2012), 12 pgs.

"Keyless entry via SMS", Copyright © 2012, Hack a Day, [on line]. Retrieved from the Internet: <URL: http://hackaday.com/2011 /01 /24/keyless-entry-via-sms/, (Accessed Apr. 23, 2012), 9 pgs.

"Knock detecting lock", Copyright © 2012, Hack a Day, [online]. Retrieved from the Internet: <URL: http://hackaday.com/2009/11 /04/knock-detecting-lock/>, (Accessed Apr. 23, 2012), 10 pgs.

"Knock response automatic door opener", Copyright © 2012, Hack a Day, [on line]. Retrieved from the Internet: <URL: http://hackaday.com/2007/06/11/knock-responseautomatic-door-opener/>, (Accessed Apr. 23, 2012), 9 pgs.

"More cellphone controlled door locks", Copyright © 2012, Hack a Day, [online]. Retrieved from the Internet: <URL: http://hackaday.com/2010/02/23/more-cellphone-controlled-doorlocks/>, (Accessed Apr. 23, 2012), 10 pgs.

"Nexia Home Intelligence", Nexia™, [online]. Retrieved from the Internet: <URL: http://www.nexiahome.com/Products/ProductCatalog.aspx?catsel=5>, (Accessed Apr. 23, 2012), 2 pgs.

"Oliver Nash's Blog", [online]. Retrieved from the Internet: <URL: http ://ocfnash. wordpress .com/2009/10/31 /locked-out-at-2am/>, (Accessed Apr. 23, 2012), 18 pgs.

"Open Ways", OpenWays copyright 2011 , [online]. Retrieved from the Internet: <URL: http:// www.openways.com/>, (Accessed Apr. 20, 2012), 1 pg.

"Opening a door via text message", [online]. Retrieved from the Internet: <URL: http:/ /anerroroccurredwhileprocessingthisdirective .com/2011 /01/01 /opening-a-door-via- textmessage/>, (Accessed Apr. 23, 2012), 8 pgs.

"Phantom Keyless Home Entry", Copyright © 2012 Phantom Smart Home, LLC, [online]. Retrieved from the Internet: <URL: http://phantomsmarthome.com/, (Accessed Apr. 23, 2012), 1 pg.

"Remote entry via Android and Launchpad", Copyright © 2012, Hack a Day, [online]. Retrieved from the Internet: <URL: http://hackaday.com/2012/01/24/remote-entry-viaandroid-and-launchpad/>, (Accessed Apr. 23, 2012), 9 pgs.

"SimpliciKey Electronic Door Look Solutions", Copyright © 2011 SimpliciKey TM, [online ]. Retrieved from the Internet: <URL: http://simplicikey.com/>, (Accessed Apr. 23, 2012), 1 pg.

"Unlock you door with Siri, SMS, or a secret knock", © 201 O laan labs, [online]. Retrieved from the Internet: <URL: http://labs.laan.com/wp/2011/10/unlock-your-door-with-siri-sms-ora-secret-knock/>, (Accessed Apr. 23, 2012). 11 pgs.

"USB Auth—Makers Local 256", Wiki pages, [online]. Retrieved from the Internet: <URL: https://256.makerslocal.ori:i/wiki/index.php/USB Auth>, (Accessed Apr. 23, 2012), 9 pgs.

"Viper SmartStart", © Copyright 2012 Directed., [online]. Retrieved from the Internet: <URL: http://www.vioer.com/smartstartl>, (Accessed Apr. 23, 2012), 2 pgs.

"Yale demos NFC-enabled residential locks, germaphobes rejoice", © 2012 AOL Inc, onlinel. Retrieved from the Internet: <URL:, (Accessed Apr. 23, 2012), 4 pgs.

"Zwave Products", Copyrights © 2012—Zwave Products Inc, [online]. Retrieved from the Internet: <URL: http://www.zwaveoroducts.com/KWIKSET.html>, (Accessed Apr. 23, 2012), 3 pgs.

U.S. Appl. No. 13/462,669 , Response filed Nov. 19, 2013 to Non Final Office Action mailed Aug. 26, 2013; 12 pgs.

U.S. Appl. No. 13/462,669, Examiner Interview Summary mailed Nov. 14, 2013, 3 pgs.

U.S. Appl. No. 13/462,669, Non Final Office Action mailed Aug. 26, 2013, 17 pgs.

U.S. Appl. No. 13/462,669, Response filed Nov. 19, 2013 to Non Final Office Action mailed Apr. 26, 12013, 12 pgs.

U.S. Appl. No. 13/462,714, Non Final Office Action mailed 08-26- pgs, 17 pgs.

U.S. Appl. No. 14/508,501, Non Final Office Action mailed Mar. 6, 2015, 15 pgs.

English Abstract of KR 20040035952; Dated Apr. 30, 2004.

International Application Serial No. PCT/722012/036141, International Search Report mailed Apr. 9, 2012, 5 pages.

International Application Serial No. PCT/US2012/036141 , International Preliminary Report on Patentability mailed Nov. 5, 2013, 7 pgs.

International Application Serial No. PCT/US2012/036141, International Search Report mailed Sep. 4, 2012, 5 pgs.

International Application Serial No. PCT/US2012/036141, Written Opinion mailed Sep. 4, 2012, 6 pgs.

Phantom Smart Snart Home; Hands-Free Keyless Home Entry, https://web.archive.org/web/20110222072442/http:/www.phantomsmarthome.com/; 3 pages, copyright 2011.

Sorex_wirelessKey_2_0-Sorex Wayback site of Sep. 6, 2011, 2 pages.

SOREX_wirelessKey_Folder_2009, 2 pages.

U.S. Appl. No. 13/462,714, Non-Final Office Action Mailed Aug. 26, 2013, 17 pages.

U.S. Appl. No. 13/462,669, Final Office Action mailed Feb. 24, 2014, 22 pgs.

U.S. Appl. No. 13/462,669, Non Final Office Action mailed Aug. 26, 2013, 18 pgs.

U.S. Appl. No. 13/462,714, Examiner Interview Summary mailed Mar. 7, 2014, 3 pgs.

U.S. Appl. No. 13/462,714, Final Office Action mailed Apr. 7, 2014, 20 pgs.

U.S. Appl. No. 13/462,714, Non Final Office Action mailed Aug. 26, 2013, 17 pgs.

U.S. Appl. No. 13/462,714, Response filed Feb. 26, 2014 to Non Final Office Action mailed Aug. 26, 2013, 15 pgs.

U.S. Appl. No. 13/462,765, Non Final Office Action mailed Sep. 4, 2014, 11 pgs.

(56) References Cited

OTHER PUBLICATIONS

U.S. Appl. No. 14/468,114, Final Office Action mailed Mar. 15, 2016, 13 pgs.
U.S. Appl. No. 14/468,114, Non Final Office Action mailed Jul. 21, 2016, 11 pgs.
U.S. Appl. No. 14/468,114, Preliminary Amendment filed Aug. 27, 2014, 7 pgs.
U.S. Appl. No. 14/638,828, Examiner Interview Summary mailed Mar. 4, 2016, 3 pgs.
U.S. Appl. No. 14/638,828, Final Office Action mailed May 16, 2016, 15 pgs.
U.S. Appl. No. 14/638,828, Non Final Office Action mailed Jan. 11, 2017, 13 pgs.
U.S. Appl. No. 14/638,828, Non Final Office Action mailed Oct. 26, 2015, 11 pgs.
U.S. Appl. No. 14/638,828, Response filed Feb. 26, 2016 to Non Final Office Action mailed Oct. 26, 2015, 12 pgs.
U.S. Appl. No. 14/638,828, Response Filed Nov. 16, 2016 to Final Office Action mailed May 16, 2016, 12 pgs.
U.S. Appl. No. 16/511,772; Notice of Allowance mailed Feb. 27, 2020; (pp. 1-5).
U.S. Appl. No. 16/511,772; Notice of Allowance mailed Nov. 20, 2019; (pp. 1-5).
WirelessKey Hardware Deutsch 1.1 Sep. 6, 2011 Wayback Machine, (with Google Machine Translation) 34 pages.
YouTube Video entitled Bluetooth Sorex Wirelss Key, dated Mar. 5, 2009, 5 pages.
YouTube Video entitled Bluetooth SorexLoXX Entrance System, dated Mar. 5, 2009, 9 pages.
YouTube Video entitled Bluetooth-Sorex LoXX dated Feb. 5, 2009, 8 pages.

\* cited by examiner

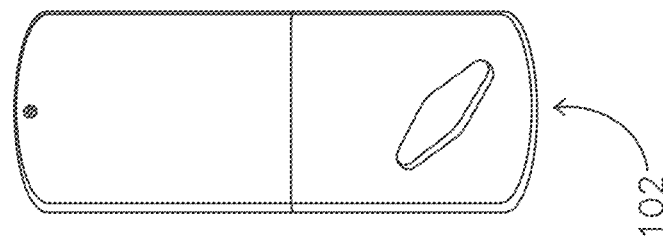
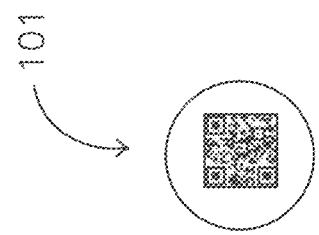
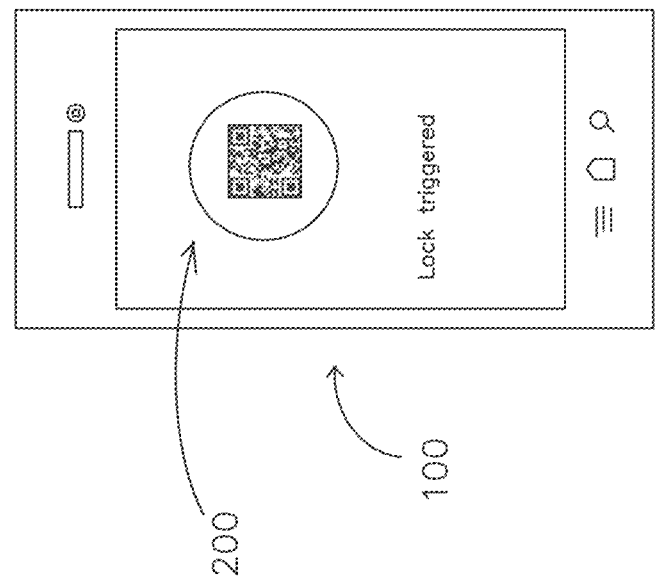
Fig. 2

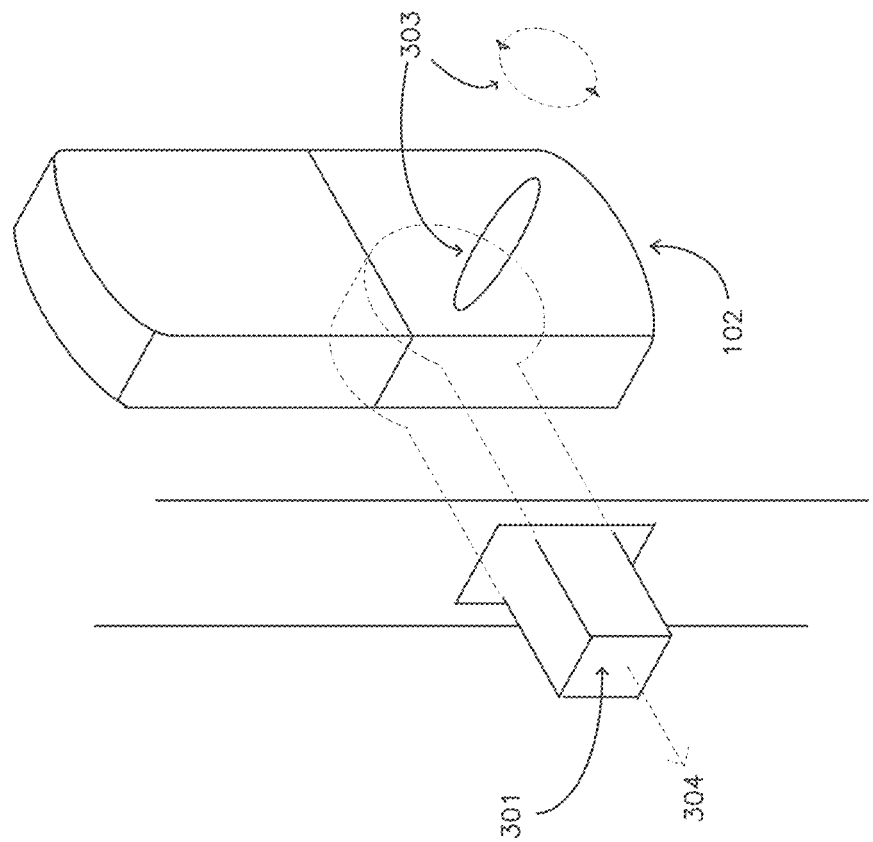
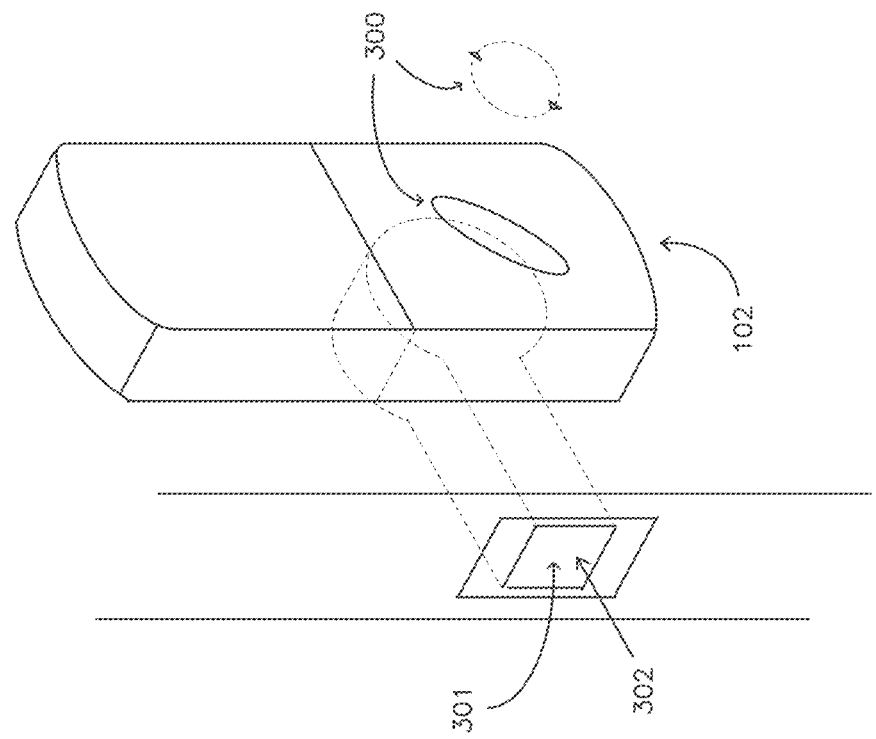
Fig. 3

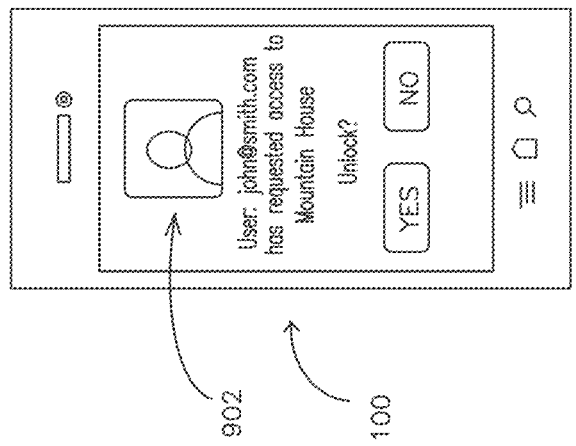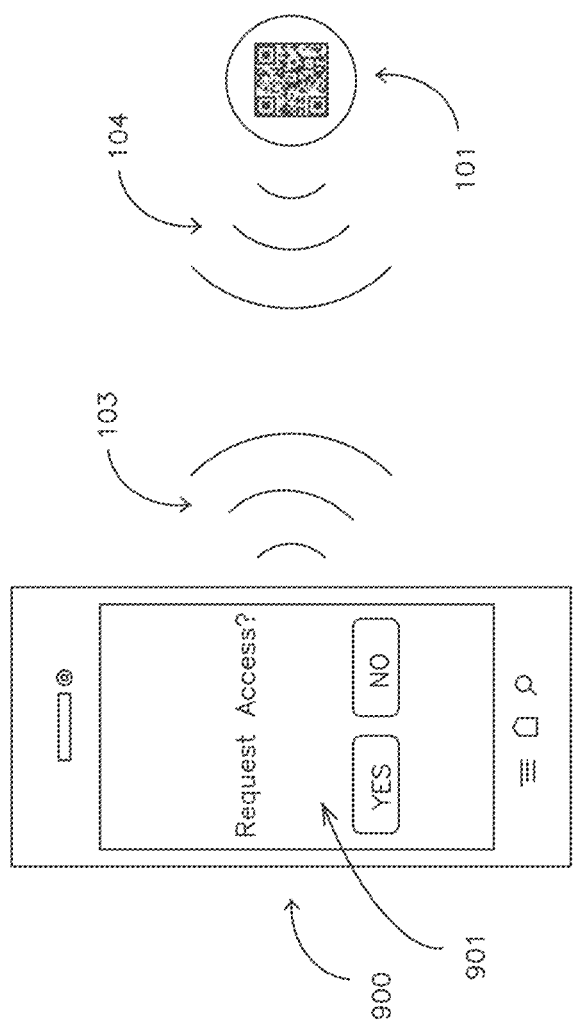
Fig. 9

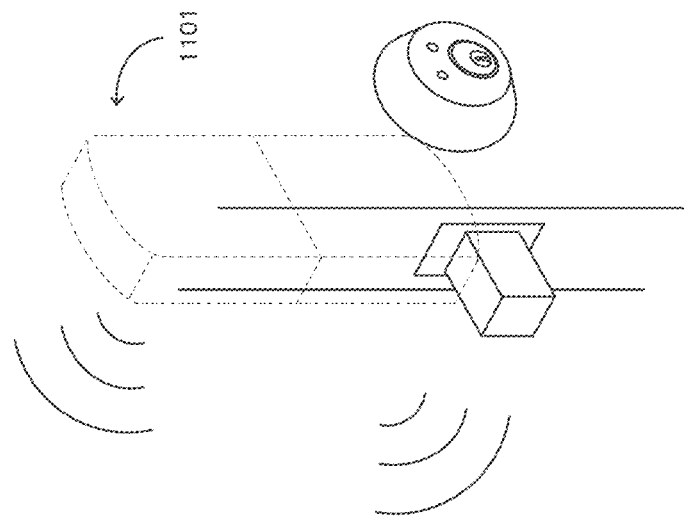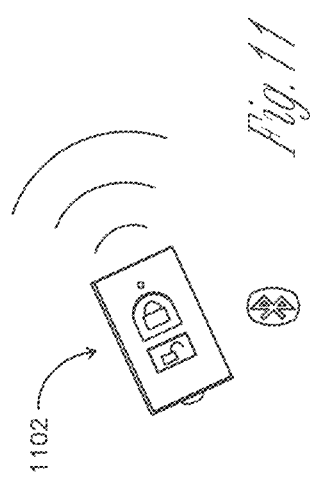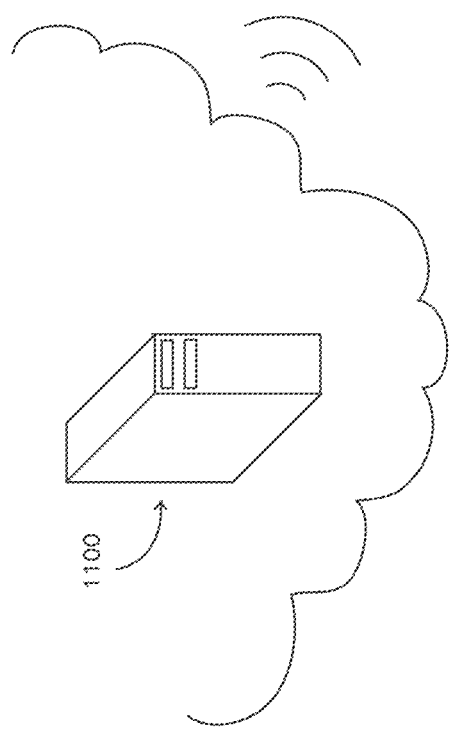
Fig. 11

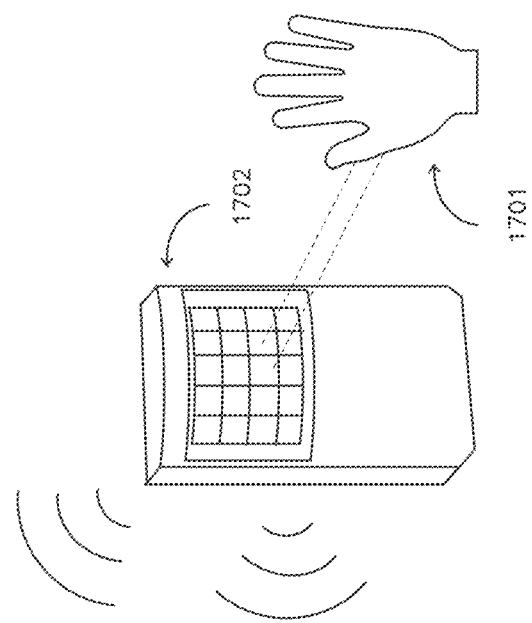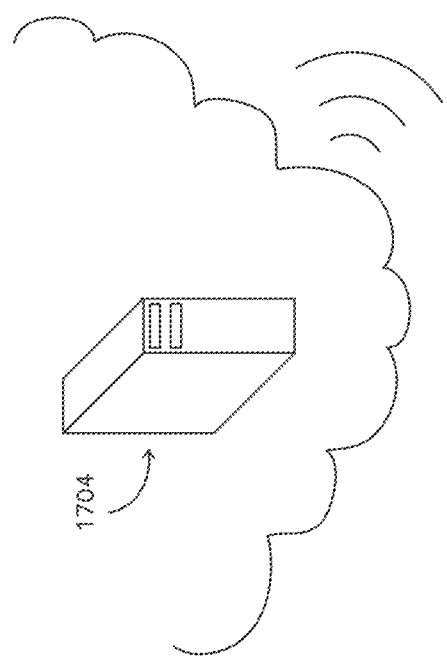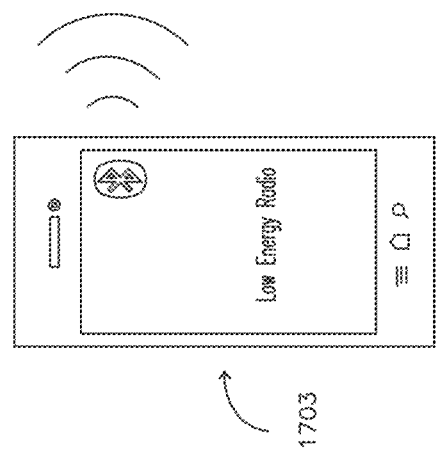
Fig. 17

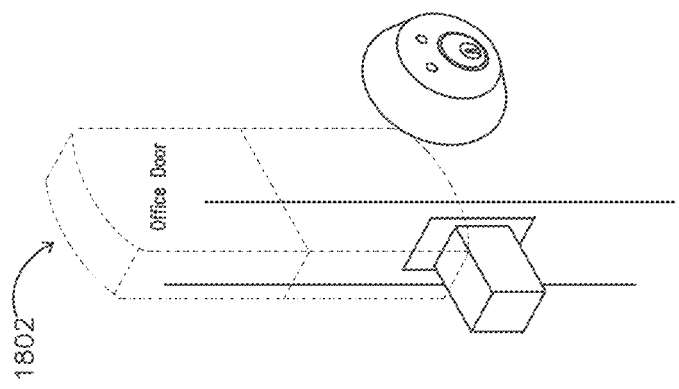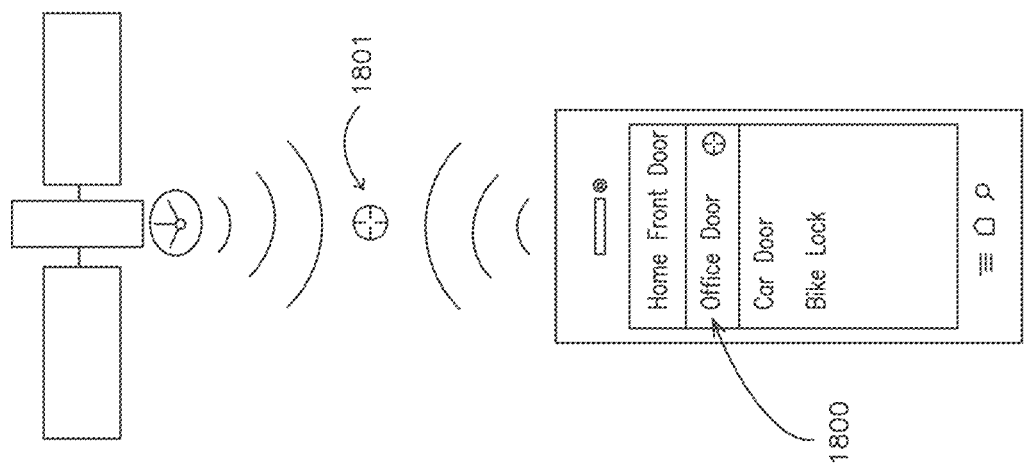
Fig. 18

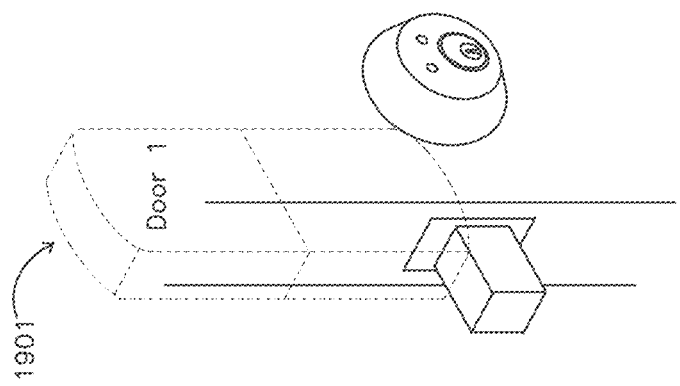
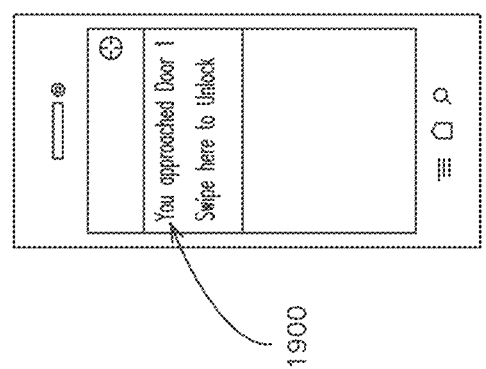
Fig. 19

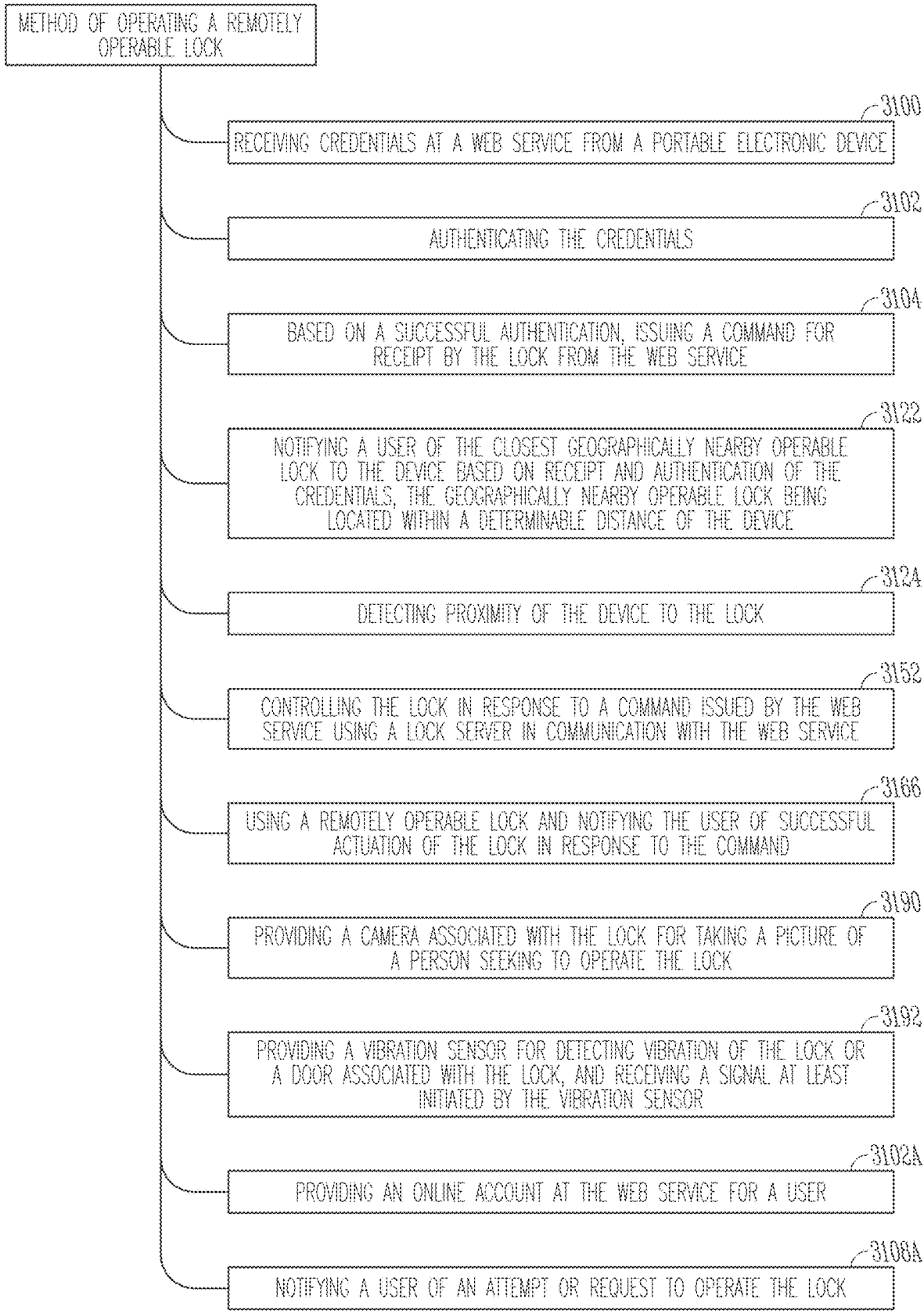

3192 providing a vibration sensor for detecting vibration of the lock or a door associated with the lock, and receiving a signal at least initiated by the vibration sensor 3194 notifying the user of the received signal initiated by the vibration sensor detecting vibration of the door or lock 3196 detecting a user's special knock on the lock or door associated with the lock, the special knock forming part of the credentials

FIG. 31D

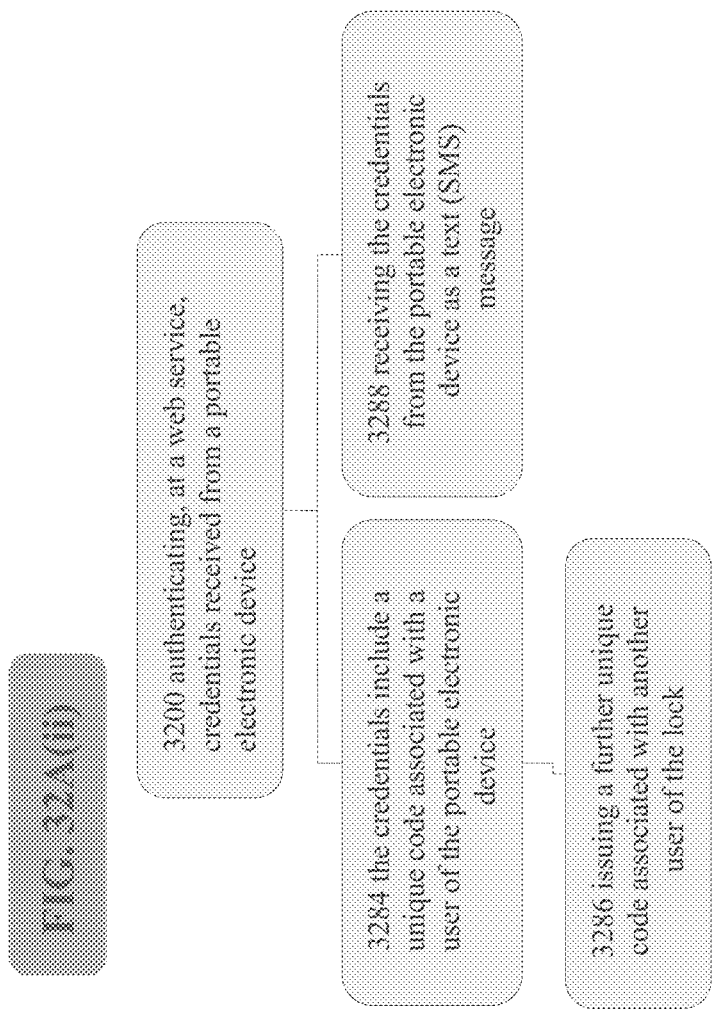

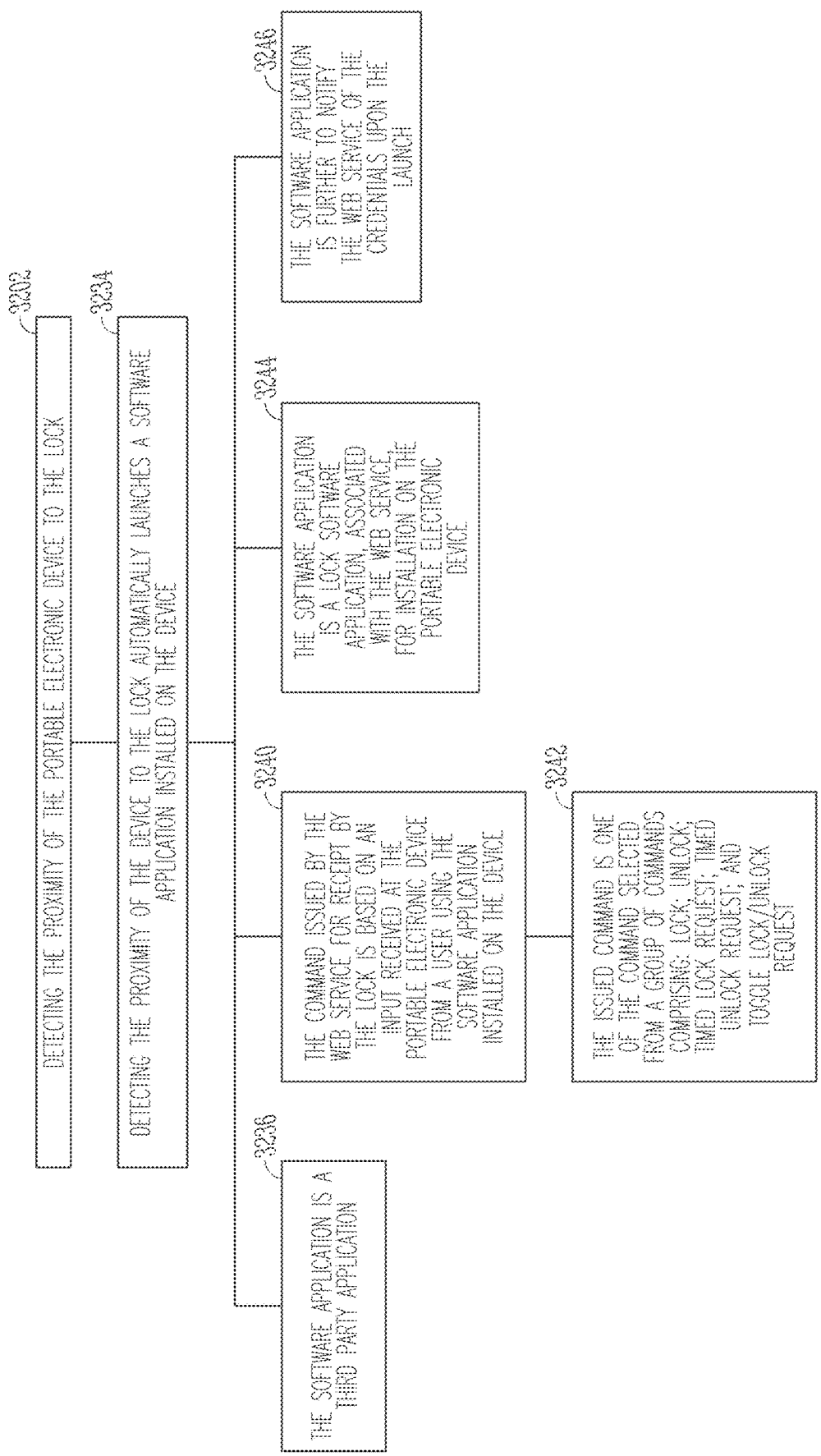
Fig. 32B(ii)

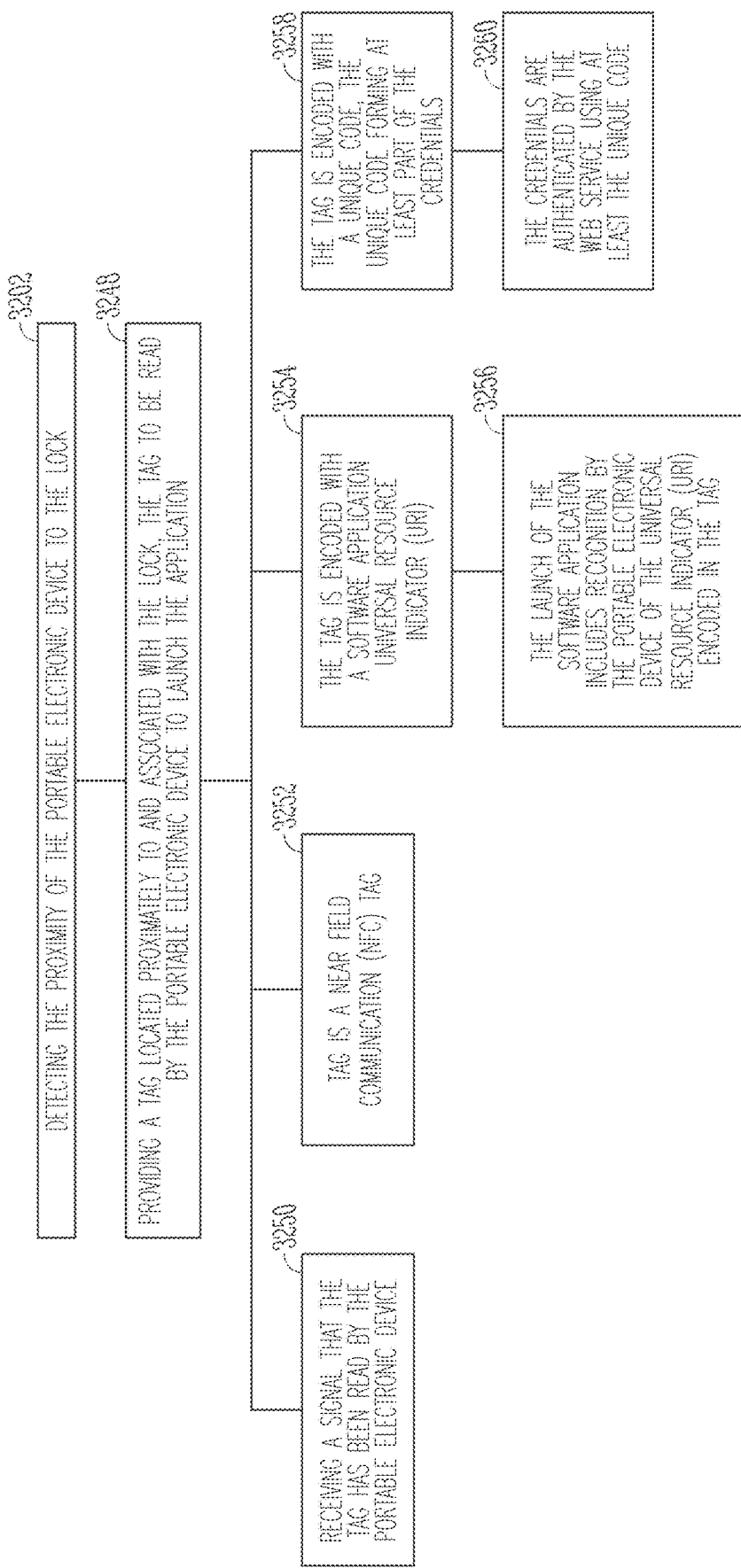

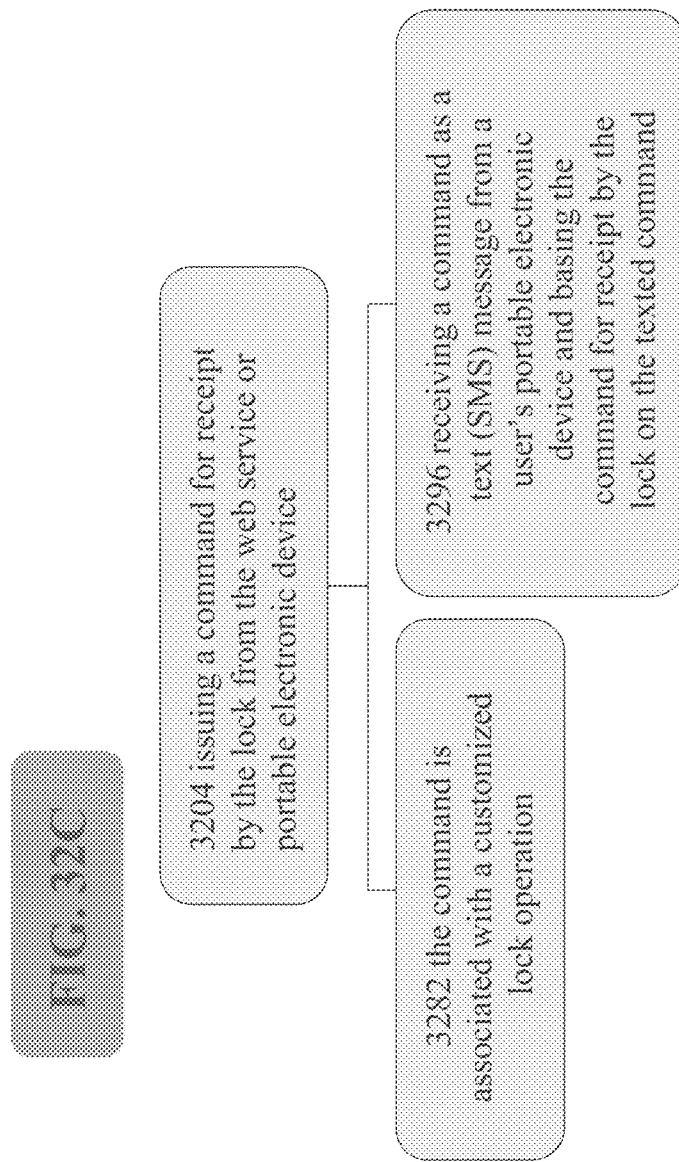

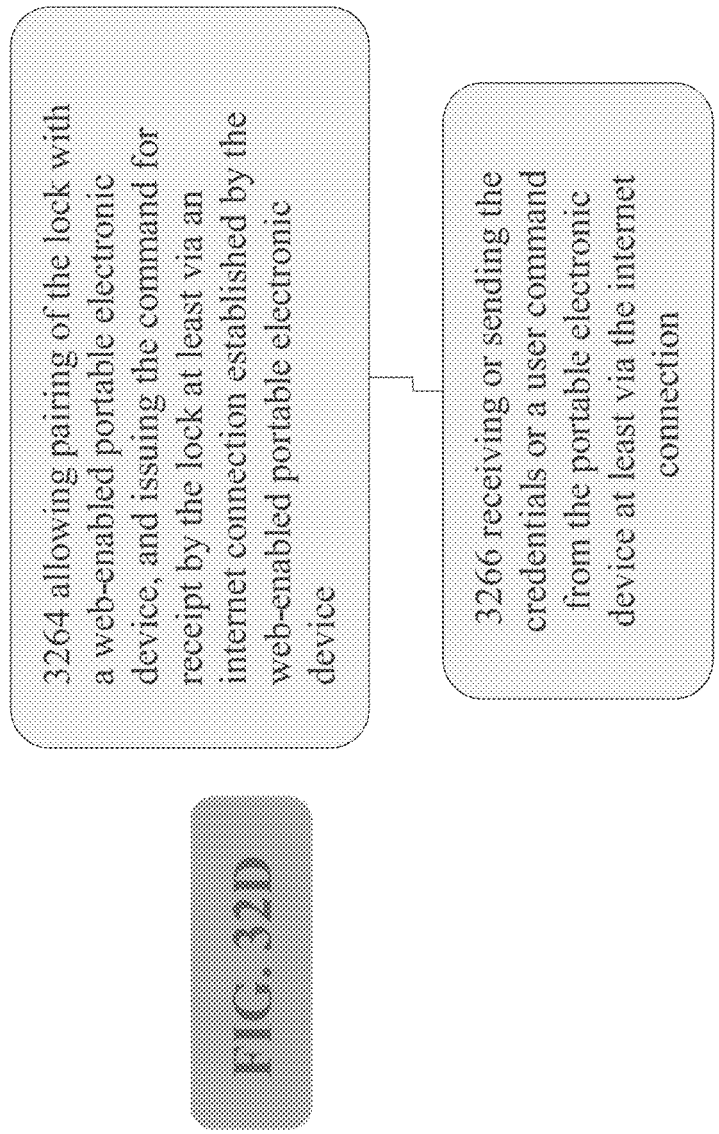

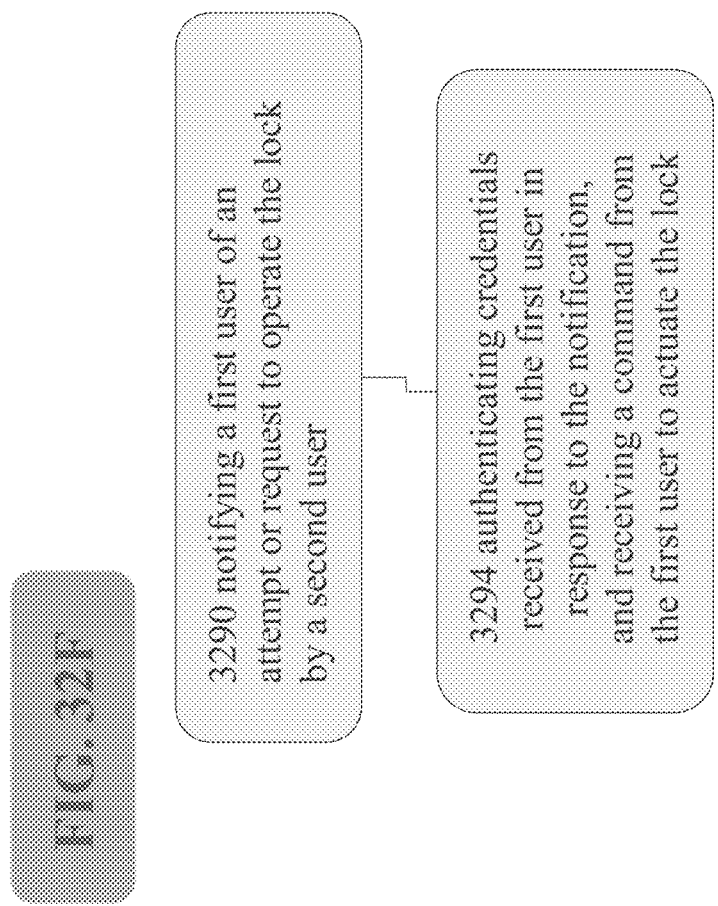

3302 issuing a command for receipt by the lock from the web service 3330 the command for receipt by the lock is received by the lock via the second web service.

SYSTEMS AND METHODS FOR CONTROLLING A LOCKING MECHANISM USING A PORTABLE ELECTRONIC DEVICE

CROSS-REFERENCE TO RELATED APPLICATIONS

This application is a continuation of U.S. application Ser. No. 16/511,772, filed Jul. 15, 2019, which is a continuation of U.S. application Ser. No. 15/686,385, filed Aug. 25, 2017, now issued as U.S. Pat. No. 10,382,608, which is a continuation of U.S. application Ser. No. 14/468,114, filed Aug. 25, 2014, which is a continuation of U.S. application Ser. No. 13/462,669, filed May 2, 2012, which claims the benefit under 35 U.S.C. 119(e) to U.S. Provisional Patent Application Ser. No. 61/481,518 filed May 2, 2011, which are all incorporated herein by reference in their entireties and made a part hereof.

BACKGROUND

Technical Field

The present disclosure relates to access control for security purposes, and more specifically to electronic access control mechanisms which can be locked or unlocked remotely using commands issued from a website, portable electronic device, or other computer devices through means of software, Short Message Service (SMS), Remote Frequency Identification (RFID), Near Field Communications (NFC), or other means of radio communication. Non-limiting examples of a computer device may include but are not limited to a laptop Personal Computer (PC), a desktop PC, a tablet PC, a smart phone, a mobile phone, or Personal Digital Assistant.

Description of Related Art

There are a number of electronic locks which can be activated using cut keys, scanning a passive Radio Frequency Identification (RFID) tag with a hardwired reader, or pressing a button on an electronic key fob which transmits an encrypted radio signal to an access control mechanism.

These devices generally rely on hardware components unique to each user, and which if lost or compromised require system reprogramming and material replacement.

SUMMARY

The present disclosure relates to a network (e.g., Internet) accessible system and web service to communicate with remotely operable locks, for example radio frequency controlled deadbolt locks, doorknob locks, or electrical strikes which can be actuated remotely by communicating with a nearby server through encrypted Internet communication protocols. The service can be accessed from portable electronic devices with Internet connections or that are equipped with Short Message Service (SMS) functionality as well as non-portable devices such as Desktop Personal Computers with network connections. An individual signs up for an account on the website associated with the service. The website acts as a gateway service to access, administer, and configure the remotely accessible electronic lock system. If a user or administrator is the owner of the lock server unit, they may grant other people virtual keys to access the associated lock. The keys may be temporary or permanent. The keys may be valid during certain hours or days or valid at any time. The keys may grant a guest the ability to invite others or not. Their function may be suspended or reinstated by the owner, user or an administrator at any time. In an example embodiment, the virtual keys may be sent to a phone number or email address.

A user may use the web service by executing a software application on their portable electronic device, which can lock and unlock the door, invite guests, view access history; the user may also visit a website which offers the same functionality. The user can also lock and unlock the door sending a text message with a corresponding pin code to a purpose specific telephone number. Text messages are validated with a pin code as well as verifying that the source telephone number is associated with the lock. The user may grant others access or change their pin code through text message as well.

The system abstracts access control from physical identifiers such as material keys or unique key-cards to virtual keys, which may be accessed from physical electronic devices. As the keys are stored in an electronic format in a secure web server, a loss of an electronic device; which is used to access the key, does not represent a lost key. In addition virtual access can be revoked remotely, or the password used to access the key can be changed at any time. A lost physical key on the other hand might require that the owners rekey their locks to maintain a secure environment.

In an example embodiment, a web service is a method of communication between two electronic devices over the web (internet).

The W3C defines a "Web service" as "a software system designed to support interoperable machine-to-machine interaction over a network". It has an interface described in a machine-processable format (specifically Web Services Description Language, known by the acronym WSDL). Other systems interact with the Web service in a manner prescribed by its description using SOAP (Simple Object Access Protocol) messages, typically conveyed using HTTP (Hypertext Transfer Protocol) with an XML (Extensible Markup Language) serialization in conjunction with other Web-related standards.

In this specification, a "user" is anyone interacting with the locking system or web service, including a person operating a portable electronic device as described herein. The words "user" and "device" (or "portable electronic device") are in some cases used interchangeably, since the device is carried and operated by the user.

A "locking system" or "lock system" includes a "lock", and the terms are sometimes used interchangeably. Configuration, description, use or claims to a "locking system" or "lock system" includes configuration, description, use or claims to a "lock" accordingly.

In an example embodiment, a system for operating a remotely operable lock comprises: a web service for receiving credentials from a portable electronic device; authenticating the received credentials; and issuing a command for receipt by the lock upon successful authentication of the credentials. The system may further comprise a tag located on or adjacent the lock and associated with the lock, the tag allowing the portable electronic device to identify or receive credentials from the tag. In an example embodiment, receiving credentials from a portable electronic device includes receiving a command input by a user on the portable electronic device. The web service may further issue a software application for installation on the portable electronic device, the application allowing communication of credentials or commands from the portable electronic device to the web service. The web service may further to update the application software periodically.

In another example embodiment, a system for operating a remotely operable lock comprises: a web service for detecting the proximity of a portable electronic device to the lock; receiving credentials from the portable electronic device; and issuing a command for receipt by the lock. The web service may further authenticate the credentials received at the web service, and based on a successful authentication, issue the command for receipt by the lock.

The system may further comprise a tag located on or adjacent the lock and associated with the lock, the tag allowing the portable electronic device to identify or receive credentials from the tag. Receiving credentials from a portable electronic device may include receiving a command input by a user on the portable electronic device.

The web service may further communicate with a software application installed on the portable electronic device, the application allowing communication of credentials or commands from the portable electronic device to the web service. The system may detect the proximity of the portable electronic device to the lock and automatically launch the software application.

In another example embodiment, a system for operating a remotely operable lock comprises: a first web service for receiving credentials or a command from a portable electronic device having a software application installed thereon, and for issuing a command for receipt by the lock from the web service; the first web service having an application programming interface (API) for integrating a second web service or the software application with the first web service to allow the portable electronic device to communicate with the lock or web service.

DESCRIPTION OF THE DRAWINGS

The example embodiments may be better understood, and its numerous features and advantages made apparent to those skilled in the art by referencing the accompanying drawings and descriptions provided in the Detailed Description. For ease of understanding and simplicity, common numbering of elements within the illustrations is employed where an element is the same in different drawings. In the drawings, which are not necessarily drawn to scale, like numerals may describe similar components in different views. In some instances, different numerals may describe similar components in different views. Like numerals having different letter suffixes may represent different instances of similar components. The drawings illustrate generally, by way of example, but not by way of limitation, various embodiments discussed in the present document.

FIG. 2 demonstrates a camera enabled portable electronic device reading a Quick Response (QR) code. The act of reading the code will trigger an application to launch and actuate a door lock.

FIG. 3 depicts one type of door lock in unlocked and locked positions.

FIG. 9 depicts a second portable electronic device attempting to unlock a door for which it does not have access. In this case, the owner's device is notified with relevant information pertinent to the requestor and presented with an option to unlock the door for the requestor.

FIGS. 11-30 are schematic views of locking systems, web services with associated components and features in accordance with various example embodiments.

DETAILED DESCRIPTION

The following is a detailed description of illustrative embodiments of the present invention. As these embodiments of the present invention are described with reference to the aforementioned drawings, various modifications or adaptations of the methods and or specific structures described may become apparent to those skilled in the art. All such modifications, adaptations, or variations that rely upon the teachings of the present inventions, and through which these teachings have advanced the art, are considered to be within the spirit and scope of the present invention. For example, the devices set forth herein have been characterized herein as executing remote instructions on physical machines described as locks by means of controlling electrical relays or communicating over serial, USB, or wireless channels, but it is apparent that other professional or home automation devices may be accessed through these means as well. Hence, these descriptions and drawings are not to be considered in a limiting sense, as it is understood that the present invention is in no way limited to the embodiments illustrated.

The present disclosure relates to a system and service for activating electric devices including operable locks remotely from a portable electronic device. The system is constructed in a very modular way in order to provide configurable degrees of authentication balanced with efficient and appropriate mechanisms for accessibility. Other systems are not as configurable, not as secure, or not as accessible.

Figure 1:
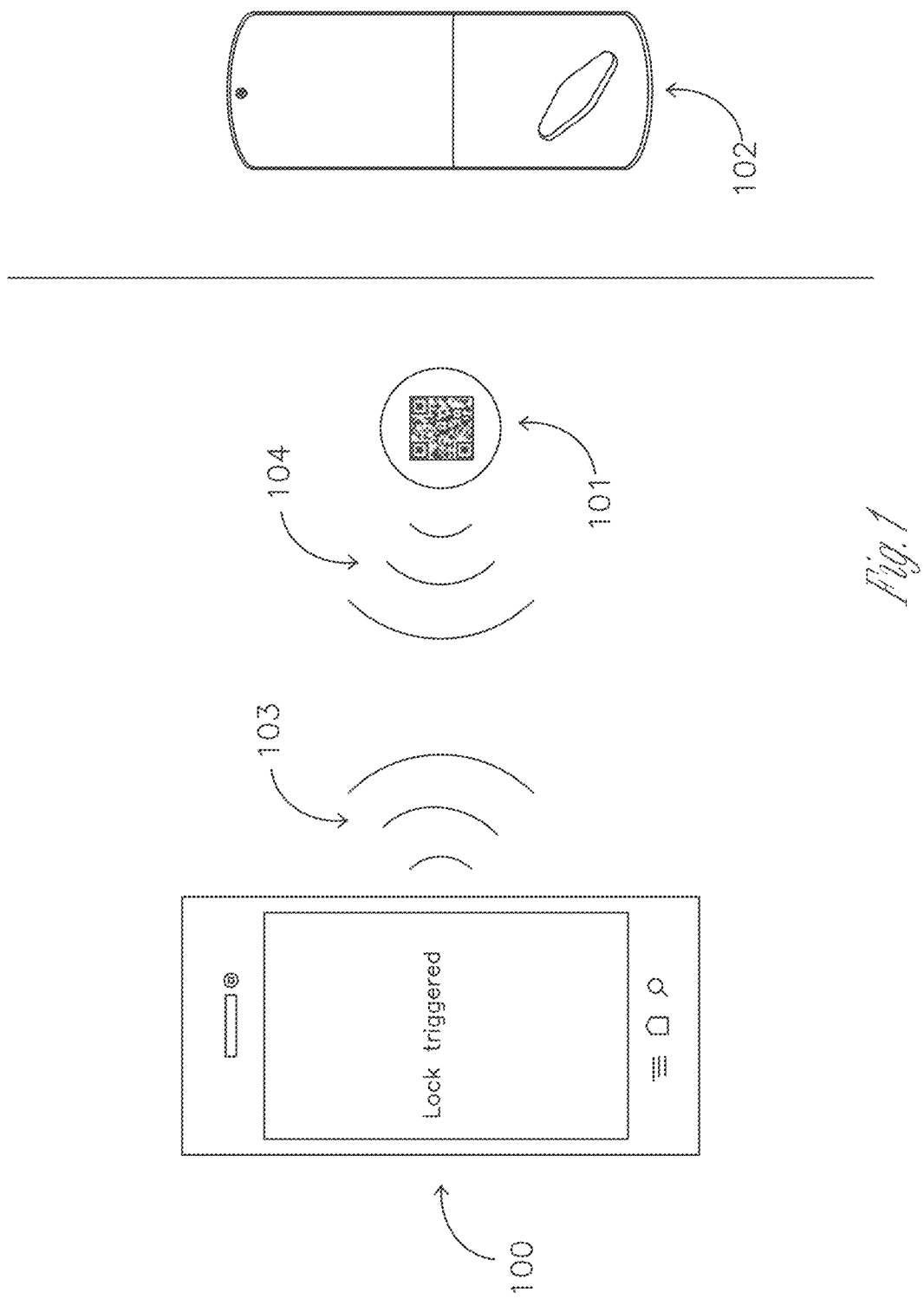
FIG. 1 demonstrates an NFC enabled portable electronic device reading an f tag. The act of reading the tag will trigger an application to launch and actuate a door lock.

FIG. 1 demonstrates an NFC enabled portable electronic device (100) reading a passive NFC tag (101). The NFC tag may be encoded in a variety of standards, including but not limited to ISO/IEC 14443 (both Type A and Type B), various MIFARE implementations, and FeliCa. The electronic device provides inductive power (103) to the NFC tag. The NFC tag responds with a static Universal Resource Indicator (URI) (104) which is encoded in such a way as to launch a special purpose application on the electronic device. The URI also contains an identifier string unique to each tag. The same URI can be encoded in the form of a Quick Response (QR) code onto the surface of the tag. The act of reading the tag will trigger the device to launch the application, passing the unique string as a parameter. The application then passes the user id, password hash, and unique identifier string to a cloud service. The cloud service validates the information, and performs an action associated with the unique tag identifier, or based on a command issued by a user as input on the portable electronic device. The action or command is performed on a lock or lock server associated with the tag identifier to actuate the door lock in 102. The server sends a confirmation of the action performed to the electronic device.

FIG. 2 demonstrates an alternate embodiment of the process represented in FIG. 1 with camera enabled portable electronic device reading a Quick Response (QR) code instead of reading the URI through NFC. In this case the URI mentioned in 104 would be encoded in QR format instead of an NFC data type. The user launches a QR code reader application, scans the QR code, the application parses the code as a URI and the application acts accordingly to actuate the lock using a unique identifier embedded in the QR code.

FIG. 3 depicts one type of door lock 102 in unlocked 302 and locked (304) positions. The thumbturn (300) is rotated clockwise or counterclockwise to drive a spindle which will insert or retract the bolt (301) from the door frame. The thumbturn can be actuated remotely using encrypted radio transmissions, which are deciphered by a special purpose onboard circuit. If the code has been deciphered successfully the circuit will enable a motor which will drive a gearing system which rotates the spindle. This type of door lock is commercially available and represented here for the purpose of illumination and to provide context to those skilled in the art.

Figure 4:
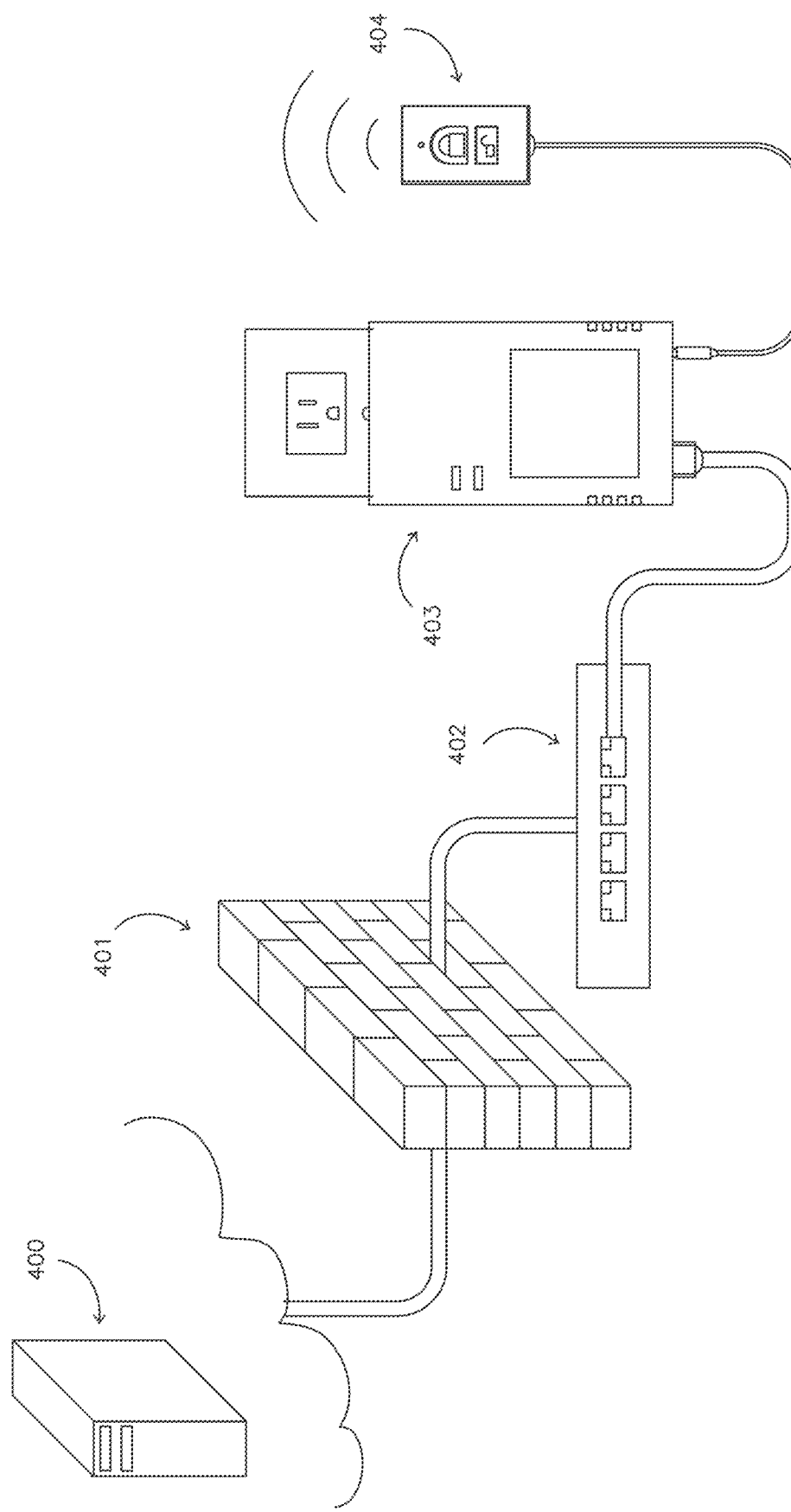
FIG. 4 demonstrates how the user's lock server unit connects to the cloud based service by tunneling through the user's firewall. The server is also responsible for transmitting "lock" and "unlock" codes to the lock.

FIG. 4 demonstrates how the user's lock server (403) connects to the web service (400) by tunneling through the user's firewall (401). The server is also responsible for transmitting lock and unlock commands (also termed "requests" in this disclosure) or codes to the lock.

The web service (400) securely controls all signals routed to the end lock. As such, it will accept commands from authenticated browsers and web services and relay them to the desired lock assuming all authentication requirements have been met.

In order to properly relay commands through various Network Address Translation (NAT) and firewall mechanisms with minimal initial configuration on the part of the user, the web service and lock server (403) engage in Secure Shell (SSH) reverse tunneling. When the lock server is first connected to an Internet connection it will attempt to initiate one or multiple Secure Socket Layer connections with the web service using the SSH implementation. If the lock server can successfully connect to the web service, the web service will initiate a reverse tunnel, whereby a forwarding port on the web service is bound to a second port on the lock server. In this manner requests received by the web server will be forwarded to the lock server without having to actively negotiate in Network Address Translation (NAT). Requests may be further restricted using firewall rules. The communication protocols between the two servers are well known to those skilled in the art. By having the lock server initiate the tunnel to the web service, the web service can access the lock server at any time without first having to negotiate NAT, thus enabling a more consistently reachable service.

The lock server (403) can either be connected directly to a user's Internet service or more likely through a router or switch that employs NAT and firewall technologies (402). Regardless of whether or not this component is present in the system, the reverse tunneling (401) will allow for bidirectional communications between the lock server and the web service.

The lock server (403) maintains a reverse tunnel (401) with the web service and receives and executes commands to modify the state of the lock. It is connected to the router or Internet service, a wired or wireless Internet connection. Plugged into the lock server is a remote control unit that communicates wirelessly with the lock.

The remote unit (404) is either built directly into the lock server or plugged into the lock server through a connector such as, but not limited to, USB. Depending on the type of wireless lock, the remote unit will take a signal and convert it into the appropriate format for the wireless lock. The signal will then be relayed over radio frequency to the lock and be executed.

In the case of bidirectional radio frequency communications between the remote unit and the lock, it is possible for the lock to confirm reception of the signal by sending a signal back to the remote. It is also possible that the lock may signal other information back to the remote including current battery status as well as any malfunction that occurs on the lock. Along with this, a lock with an associated key pad can relay the key pad command signals to the remote which are in turn passed through the lock server to web service to authenticate a user without a personal electronic device.

Figure 5:
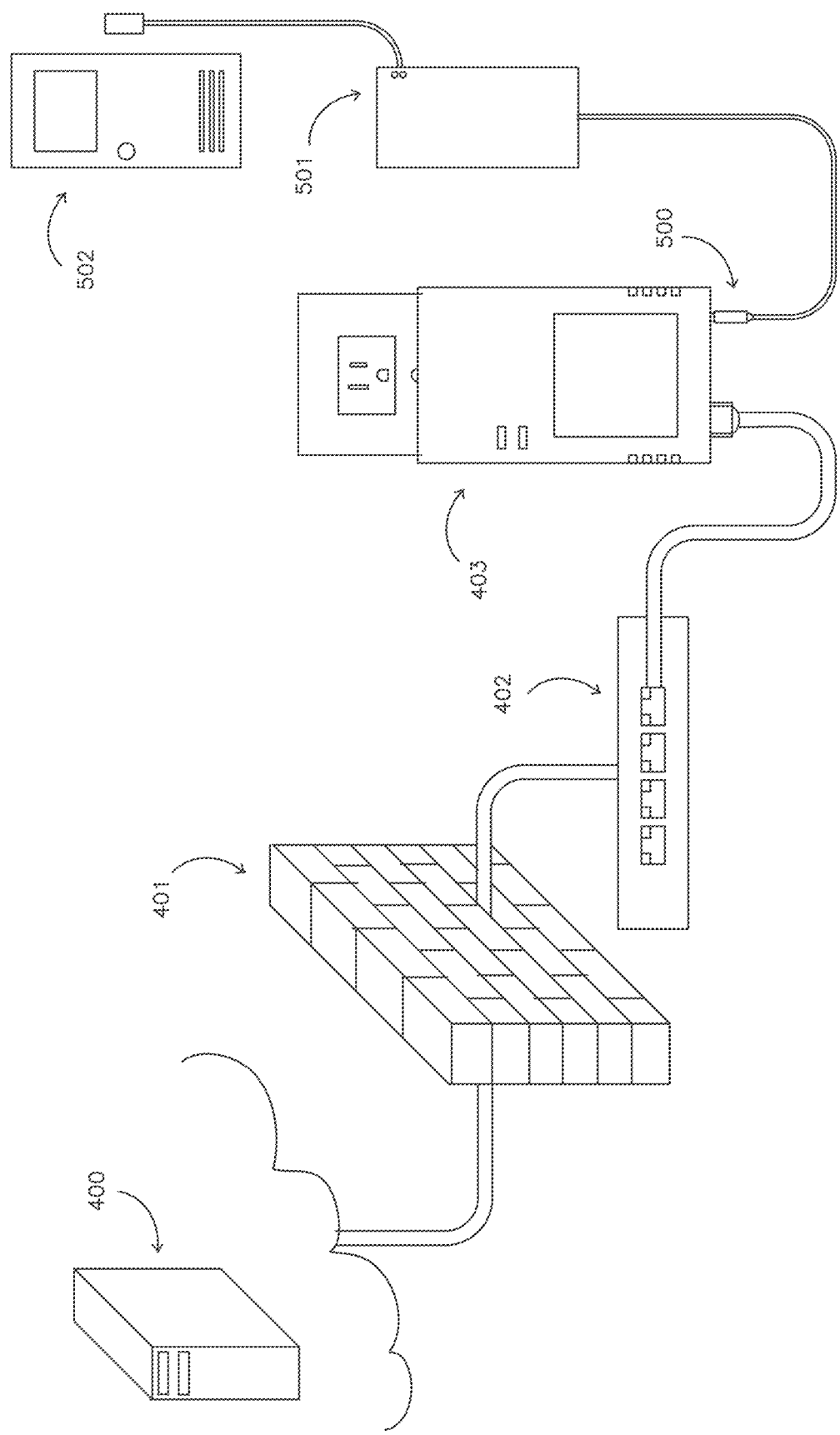
FIG. 5 presents an alternate configuration of FIG. 4 where the server controls a relay box to actuate an electric strike.

FIG. 5 presents an alternate embodiment of the components presented in FIG. 4. Here the lock server is instead connected to a relay control circuit (501) through a connector such as USB (500). Commands can be sent through the connector to direct the opening and closing of an individual or multiple relays. The relay control circuit can then be connected to a buildings electrical strike infrastructure in such a manner that the relay can trigger the release of an electric strike type lock (3402) remotely for a brief, specified period. The release of the electronic strike on the jamb allows for a door to be opened and any necessary alarm or security systems to be temporarily disabled.

The relay control circuit can control multiple relays, addressable individually, so that the lock server can address multiple electric strikes, or alternatively address other devices, which can be controlled with an electrical relay in conjunction or isolation such as an alarm system, security system, or other electrical appliance.

Figure 6:
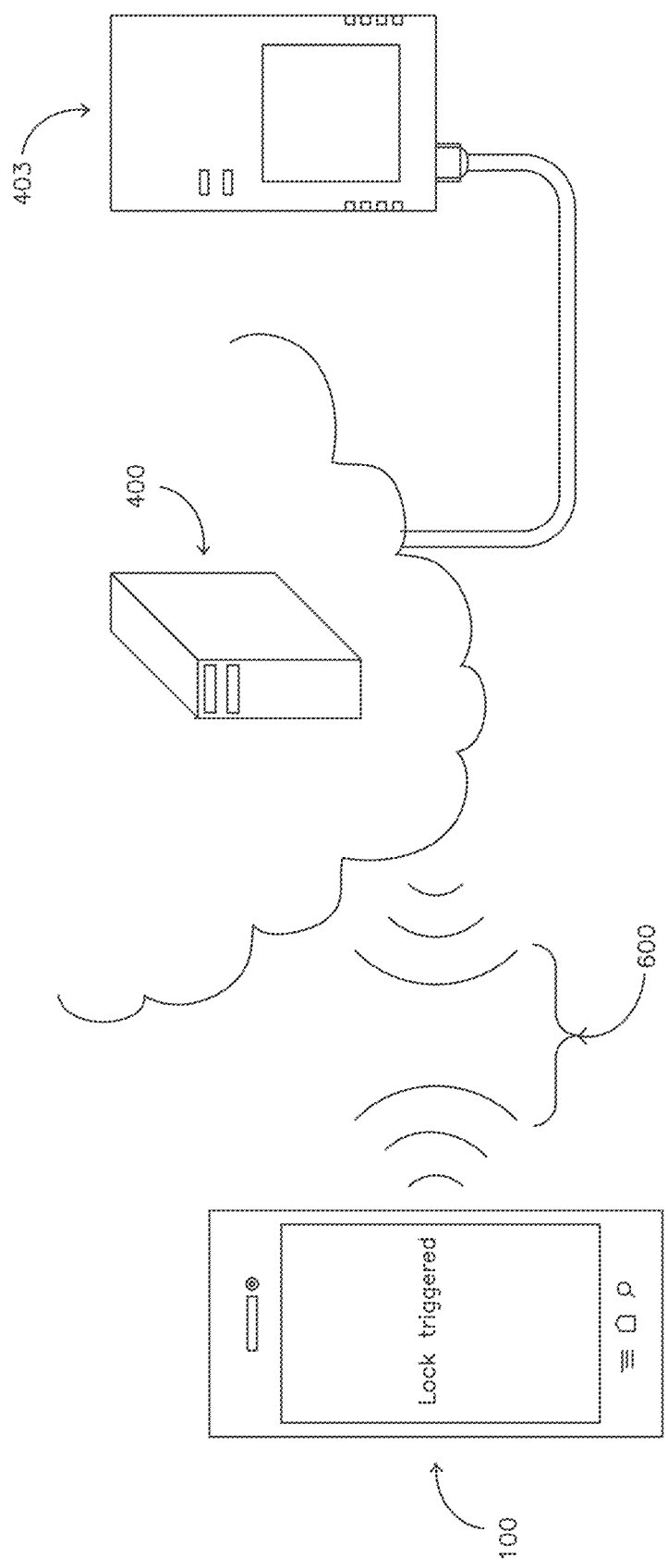
FIG. 6 demonstrates the Portable Electronic Device communicating through the Internet to the local server

FIG. 6 demonstrates an electronic device communicating through the Internet to the web service, which passes requests to the local lock server. The device may communicate to the Internet web service through any data connection (600) which would provide connectivity, including but not limited to Wi-Fi™, 3G, EDGE, SMS and Ethernet.

Figure 7:
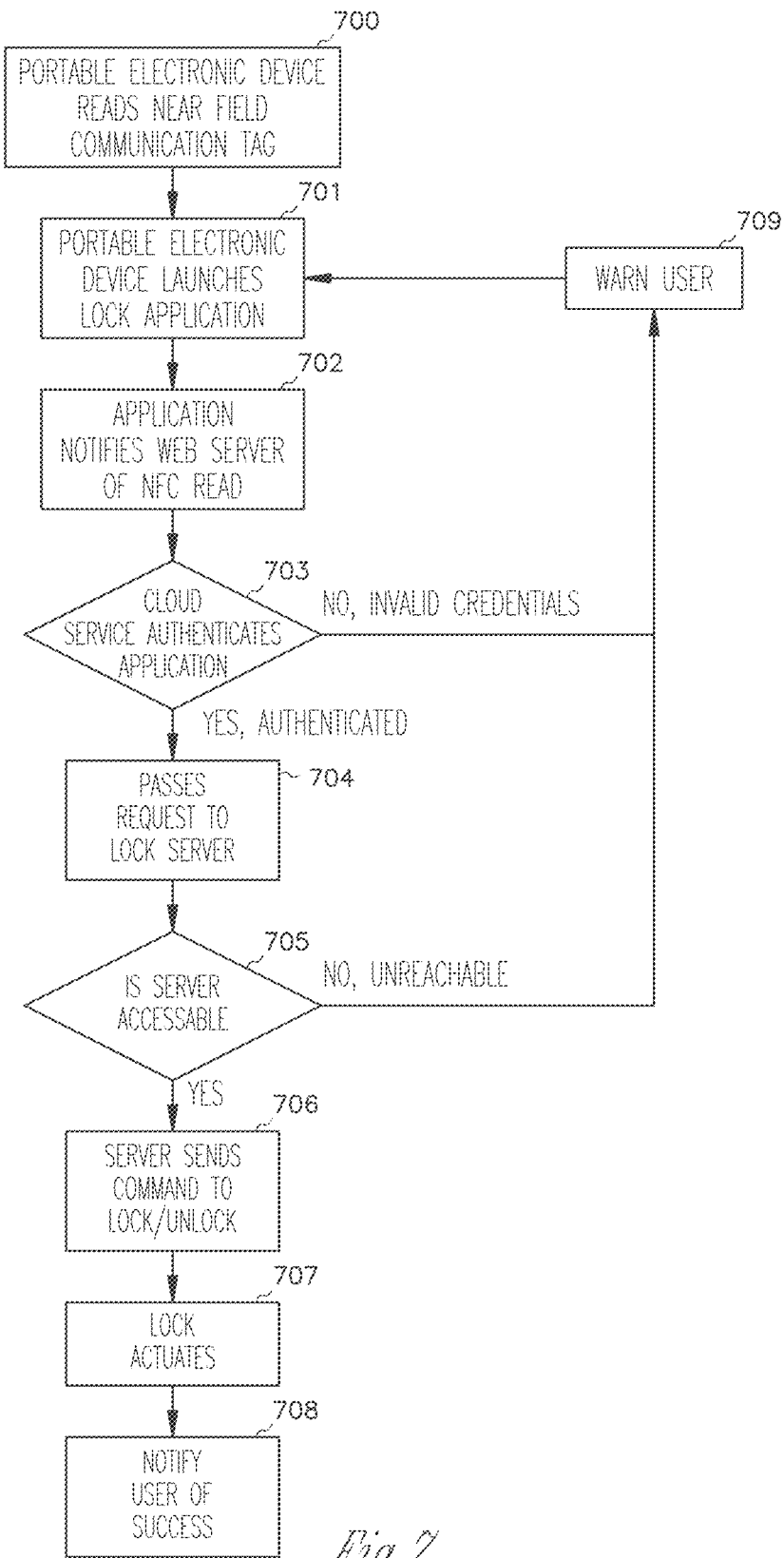
FIG. 7 is a flow chart depicting the steps of using Near Field Communication to lock or unlock a door FIG. 8 demonstrates the advantages of system by enabling extensive multi-factor authorization through means of Global Positioning System (GPS) coordinates, Wi-Fi™ network connectivity, Near Field Communication verification, pin code entry, QR code recognition, and timed entry.

FIG. 7 is a flow chart depicting the steps of using Near Field Communication to lock or unlock a door.

In 700, the user reads a Near Field Communication tag with their portable electronic device. The NFC tag is encoded with an application URI and unique code. Generally a system level interface will automatically read any sufficiently near tags with system level protocols. In some instances the device may first have to be put into a special purpose mode before being able to read an NFC tag, in such a case the electronic device would first be placed in a suitable mode to enable the NFC read functionality.

In 701 the electronic device recognizes the URI file type descriptor and launches the appropriate application bound to that type of descriptor. In this case the system launches a special purpose lock application and passes the application the unique id associated with the NFC tag just read.

In 702 the application will notify a web service that it has read a tag and pass along the associated unique id of that NFC tag. The web service will authenticate the application in 703 to verify that the read request came from a valid, signed in account. If the request is deemed to be invalid, the application will be notified in 709. If however the request is valid, the web server will pass a request corresponding to the NFC tag id to a lock server that corresponds to the NFC tag id in 704. The request could be a lock request, a timed unlock request, or a toggle request (issue the opposite request as previously sent.) The lock server could correspond to one door lock or many.

In 705 the lock server will receive the request issued in 704 and will initiate the request. If lock server is unreachable (if for instance, the server does not have a power connection) the web server will notify the application that the request could not be performed in 709. If the lock server is reachable, it will parse the request. If the request was for instance to lock a certain door, the lock server will issue a command to the hardware device associated with that door (404) to initiate a lock or unlock request 706 with the 102 lock. In 707 the 102 lock would actuate. If the lock actuated successfully, the lock server would notify the web server which would notify the lock application in 708.

Figure 8:
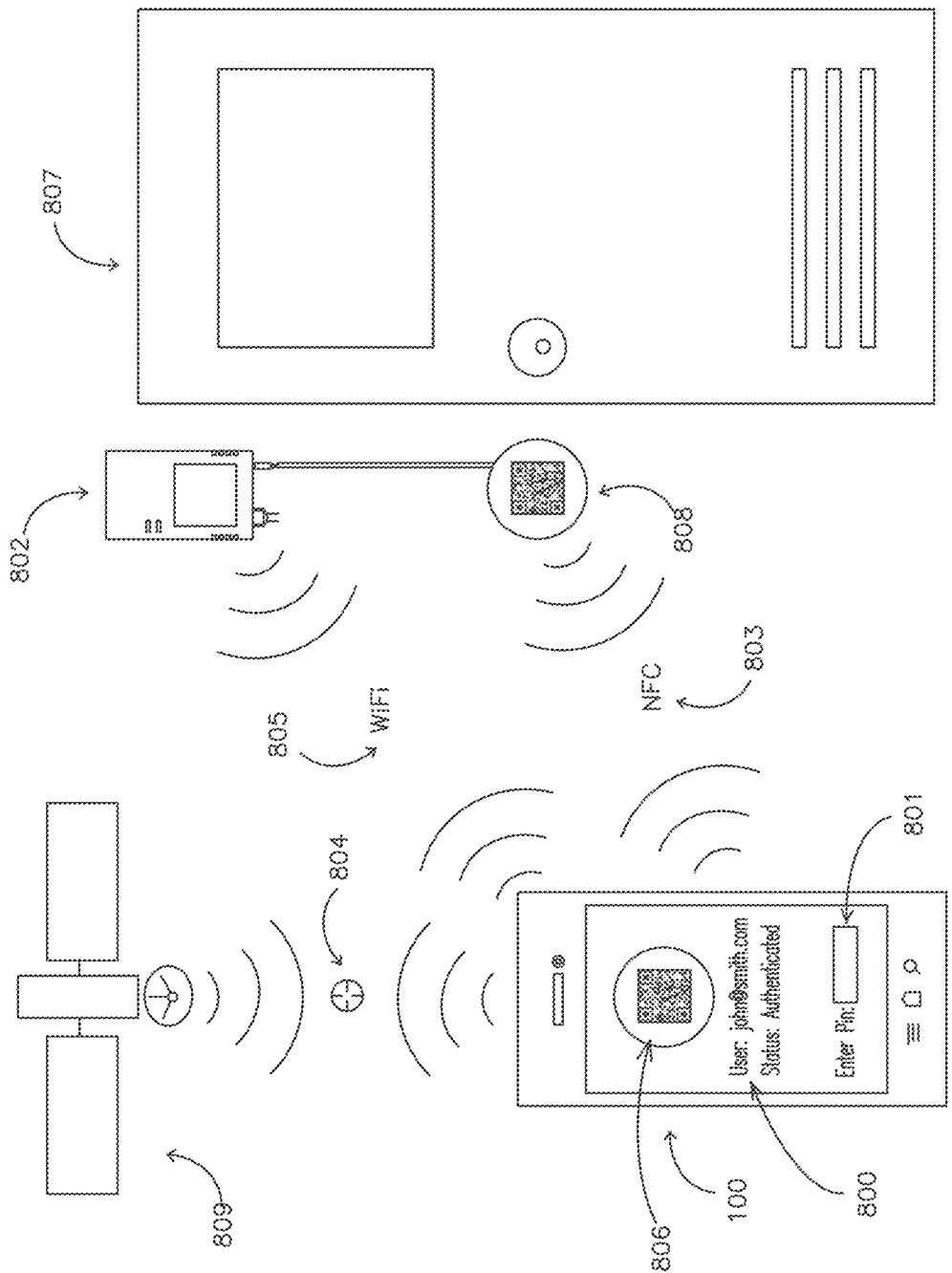

FIG. 8 demonstrates the advantages of system by enabling extensive multi-factor authorization through means of Global Positioning System (GPS) coordinates, Wi-Fi™ network connectivity, Near Field Communication verification, pin code entry, QR code recognition, and timed entry.

A user with a smart phone or portable electronic device (100) can authenticate through a combination of individual authentication methods.

A user must be authenticated on a web service (800) in order to manipulate the lock, as reflected by a cookie that is stored on the user's browser. The web service in turn can request the state of the user's session from the cookie and look up associated information with that user. This session state can then be relayed to the user, indicating whether or not they need to present appropriate credentials through the browser in order to manipulate the lock.

If requested by a lock owner or administrator, an additional form of authentication would be a pin code (801) that would be entered on the phone before every action to manipulate the lock. If the pin code matches a pin code pre-designated by the user, then the user would be authenticated either for a single action or for a set period of time (i.e. five minutes during which any action against the lock may be executed).

Any actions by an authenticated user will be relayed to a local lock web server (802) near the door (on the secured side) that will in turn trigger either a remote control that wirelessly transmits commands to the door lock or an electrical relay that is directly wired into the door lock or strike of the door.

A passive NFC or RFID (Radio-frequency identification) tag (808) can be affixed next to the door as a method to request access to the door. Such a passive tag would still require the user's NFC or RFID capable electronic device to be authenticated to the web service. Alternatively, the NFC or RFID unit noted (808) can in fact be an active reader or writer module that is wired into a server behind the secure perimeter of the door. In this case, the electronic device would transmit an encrypted key via NFC or RFID which would in turn be relayed to the server and compared against other noted forms of authentication such as an authenticated session on the user's electronic device to permit access to the door.

An additional form of authentication is through geopositioning (804) on the electronic device as established by GPS or similar satellite triangulation (809) on the electronic device. Latitude and longitude data would be relayed to the web service which in turn would compare the data against pre-designated latitude and longitude points that are assigned to the lock. If these points match within a pre-designated error (i.e. 50 feet within pre-established coordinates), then the user is assumed to be authenticated to the lock, assuming other prerequisite forms of authentication are confirmed as well.

If the user's electronic device is connected to or detects the SSID (Service Set Identifier) of a wireless ("Wi-Fi™") network (805) in the vicinity of the lock, this can act as an additional form of authentication by establishing that the user is within a given distance from the lock. Moreover, the user's electronic device may connect directly to the server (802), bypassing any web services in cases where they are unavailable, thus allowing for authentication in "offline" situations.

An additional form of authentication would be to request the user to photograph (806) either a static or dynamic QR code (808) next to the door through their electronic device. Such a QR code could be printed on top of a passive or active NFC or RFID tag or reader, or it could be shown on a display. In the case of a static QR code, the door lock would be identified and a command would be carried against the lock assuming that the user is also authenticated by another method such as a session with the web service. In the case of a dynamic QR code, the code could rotate to a unique code at a pre-designated interval, thus confirming the time at which the user took the photo as well as their presence by the specific QR code display and as such acting as a form of authentication.

Depending on the combination of authentication methods required by a lock administrator, the door (807) would enable the end user to carry out manipulations depending on the success of those authentication attempts. A non-limiting example of this would be the requirement that the user confirms their location through geo-location (804), is authenticated by a cookie through a web service accessed by their phone (800) and successfully enters a pin code that they have pre-designated (801).

FIG. 9 demonstrates a scenario where someone who is not authorized as a user on a lock requests access. The unauthorized account on the electronic device (900) attempts to read the NFC/QR code (101) using the methods described previously (103 & 104). The device will attempt to authenticate with the web service, however as the device is not authorized the web service will not unlock the door. The application on the device (901) receives a response from the web service indicating the user does not have access to that lock instance and will prompt the unauthorized user if he or she wishes to request access from the lock's administrator. If the user of 900 selects "YES", then the lock's administrator will receive an access request on their electronic device (100). The administrator may be prompted with the requesting user's profile information optionally including but not limited to name, photo, email address, or agency of employment. The administrator may unlock the door remotely and optionally add the requester as an authorized user or deny the requestor access.

FIG. 9 additionally depicts how the service may be used analogously to a doorbell. Upon a guest scanning a tag (101) the owner is notified (902) that said guest is requesting access. This is similar how a guest would normally request entrance to a property by ringing a doorbell, which would notify the owner that the guest is at the door. With this service however, the owner could be notified from anywhere where they have a data connection to their electronic device. An added benefit is the owner can unlock the door remotely and log the time which the guest requested access through the service.

Figure 10:
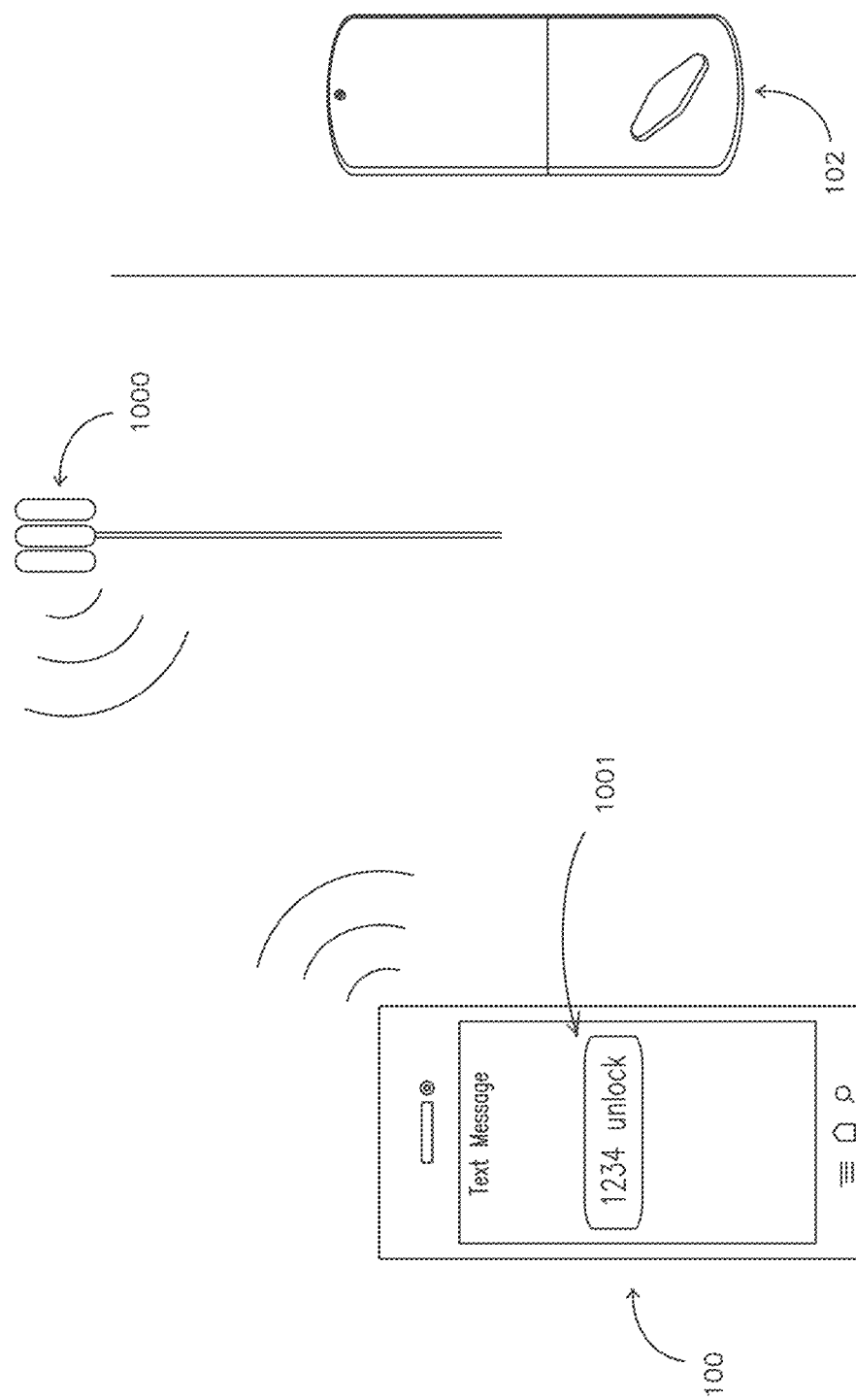
FIG. 10 demonstrates how the system can be used through the Simple Message Service (SMS).

FIG. 10 demonstrates how the system can be used through the Simple Message Service (SMS) or text message service.

An invited user sends a text message with a pin code (1001) that they have either pre-selected or that has been pre-assigned to them to a pre-designated phone number. Along with this pin code, the user sends a command to the web service to change the state of the lock, such as the command to unlock.

The cell phone provider receives the text message (1000) and relays its contents to the web service along with the phone number of the user's phone (100). The web service verifies the users phone number along with the given pin code to authenticate the user for the single action that they wish to carry out against the lock.

If the web service successfully authenticated the user and interprets their command, then it relays the signal to the electronic door lock (102), which carries out the appropriate command such as locking or unlocking.

FIG. 11 depicts a wireless key device or fob (1102) containing a unique, identifying, digital signature that may come in the form of cryptographic public/private key pair, private/private key pair, unique serial number, unique Media Access Control (MAC) address or equivalent permutation. A web service (1100) stores one or more elements of this unique signature (public key, one half of a private/private key pair, serial number) along with data indicating which signatures have access to which locking systems (1101). The web service (1100) relays authenticated signatures to the appropriate locking system (1101) either directly or through indirect means such as a mobile phone, electronic base station, or other communication methods between web service and locking system described elsewhere in the patent body.

When a wireless key device (1102) issues a command to the locking system (1101), the locking system first checks to see if the wireless key device's signature is authorized to issue the corresponding command by looking up the unique signature associated with the device (1102) in a local memory store, or by attempting to communicate with the web service before processing the request. Commands may be restricted to finer levels of granularity such as date, time, schedule, proximity, wireless signal strength, or other attributes that are communicated between key device, locking system and/or web service (1100). All commands issued by the wireless key device (1102) may be logged and stored on the locking system and/or relayed to the web service. Commands and devices which have not been authorized to use the lock system will not be executed but the issuance of these commands may be relayed to other authorized electronic devices through the web service so lock system administrators are aware a wireless key device which has not been authorized to use the lock system is attempting to use the lock system. Administrators may respond by granting authorization to the wireless key device (1102) dynamically.

In addition to communicating directly with the locking system, wireless key devices may communicate with intermediary devices which may communicate directly with the locking system (1101), web service (1100), or each other to provide equivalent functionality, to boost range, provide enhanced proximity detection, provide alternative command issuance, or relay additional information concerning the locking system state, device presence, or ambient data.

Figure 12:
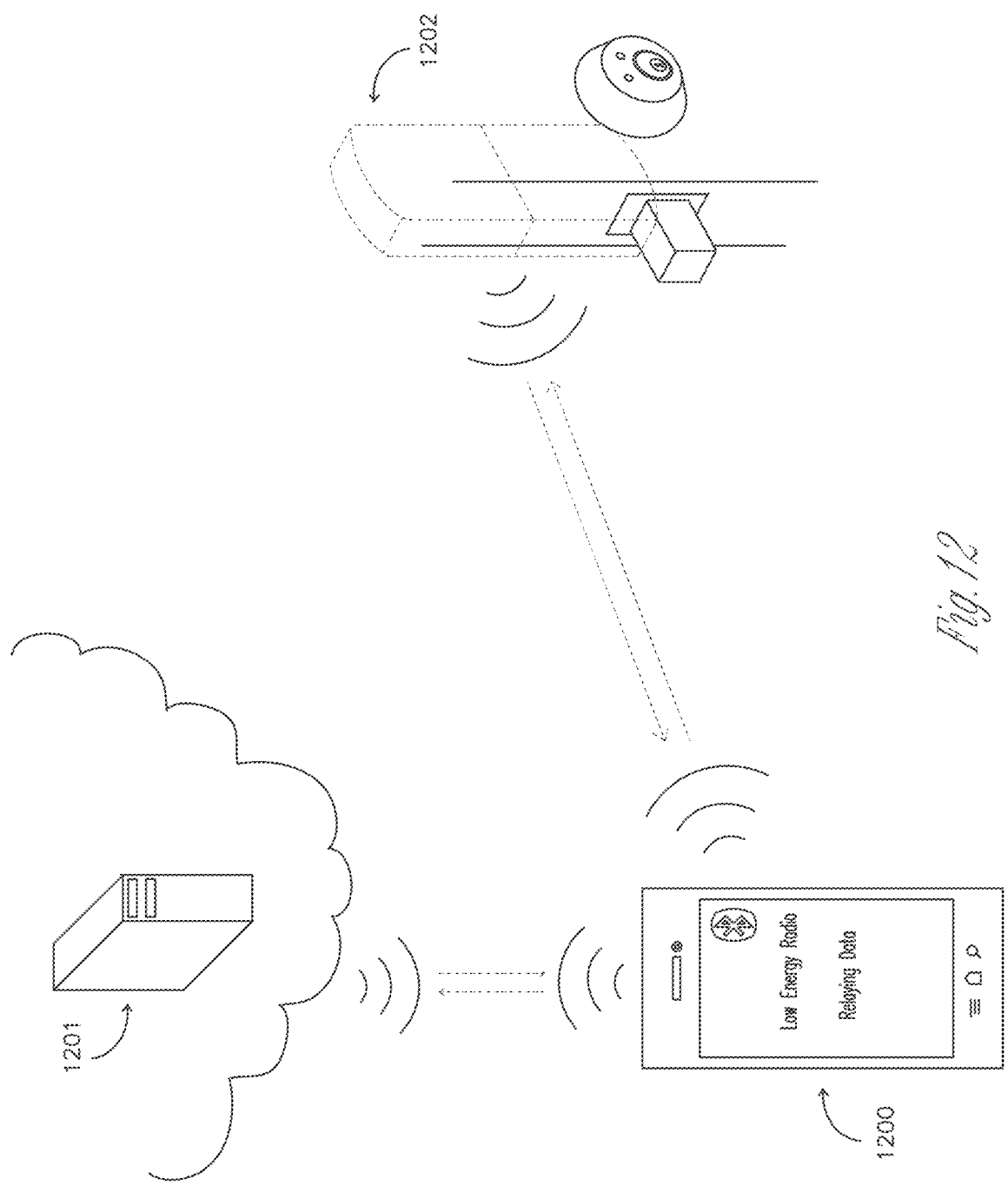

FIG. 12 depicts a mobile device (1200) device containing both low and high powered radios that communicate through cellular, wired, or wireless internet protocols to securely relay data between a web service (1201) and a locking system (1202).

In an example embodiment, the web service (1201) establishes an encrypted communications system using codes, encryptions or secrets known only to the web service and locking system (1202) and chooses to route these communications through a mobile device (1200). The messages may contain unencrypted routing information, encrypted routing information which only the mobile device may decrypt and encrypted data which only the locking system may decrypt. The mobile device (1200) may not be able to inspect the data transmitted to the locking system from the web service (1201) due to its encryption but may still pass along the data to the appropriate locking system (1202) using additional routing information transmitted to the mobile device. The encrypted data transmitted to the locking system (1202) may contain commands to lock, unlock or otherwise activate the locking system, read the locking systems status including battery life, authenticate the mobile device onto the lock, authenticating other devices onto the locking system, update the locking system firmware, or read access log data. The data transmitted to the mobile device (1200) may contain routing information, including but not limited to unique signature data associated with the locking system (1202) and web service (1201).

In an example embodiment, the mobile device (1200) uses its wired or high-powered radios to communicate to the web service (1201) while using its low powered radios to communicate with the locking system (1202). Both high powered and low powered communication channels may have additional encryption decipherable by a combination of the initiating, intermediary, and/or terminal devices.

Figure 13:
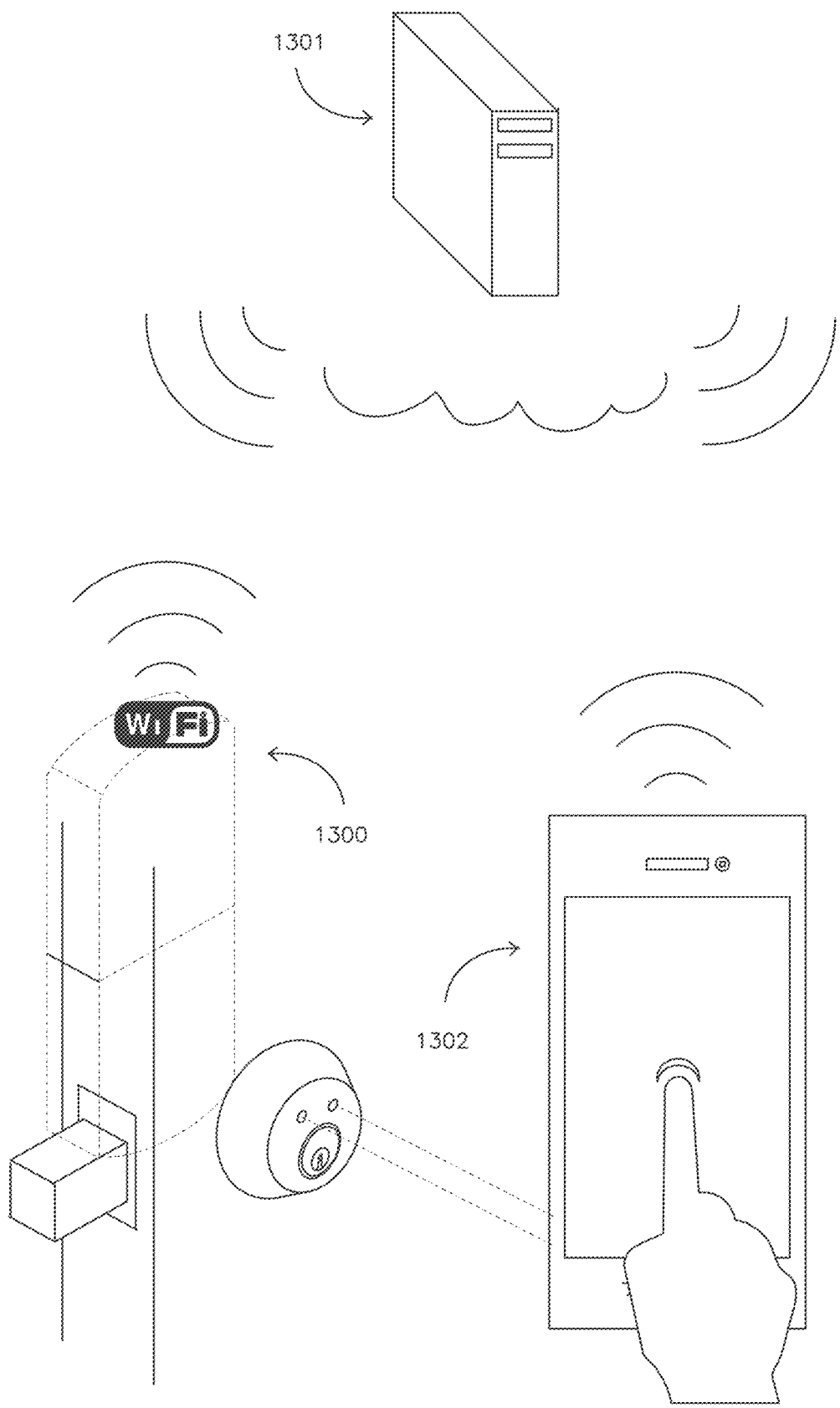

In the example embodiment depicted in FIG. 13, when a user approaches the lock system (1300), they trigger an infrared, sound, radio or vibration sensor. The sensor consumes significantly less power that the radio transmission device required to communicate with a web service (1301) over protocols that may include but are not limited to TCP (Transmission Control Protocol)/IP (Internet Protocol)/UDP (User Datagram Protocol), HTTP (Hypertext Transfer Protocol), HTTPS (Hypertext Transfer Protocol Secure) and SSH (Secure Shell). This in turn will nearly instantly wake up the higher power consuming components of the system (1300) not already in use by the sensor.

Once the locking system (1300) is awake and in a state where it may receive commands, it may either request status change commands from the web service (1301) or process queued commands from the web service directed at itself, such as Short Message Service commands sent to the web service to be relayed to the locking system.

Higher powered radio devices in a portable electronic device (1302) requesting status information from the web service (1301) will receive updated locking system status at this point. Alternatively, the high powered radio device may search for other compatible radio devices within range.

The proximate user may send a lock, unlock or status request command either directly to the now radio-enabled lock system (1300) directly, or route requests through the web service (1301) which in turn relays commands to the lock system. This significantly extends the battery life of the locking system (1300) as well as preserves bandwidth.

Figure 14:
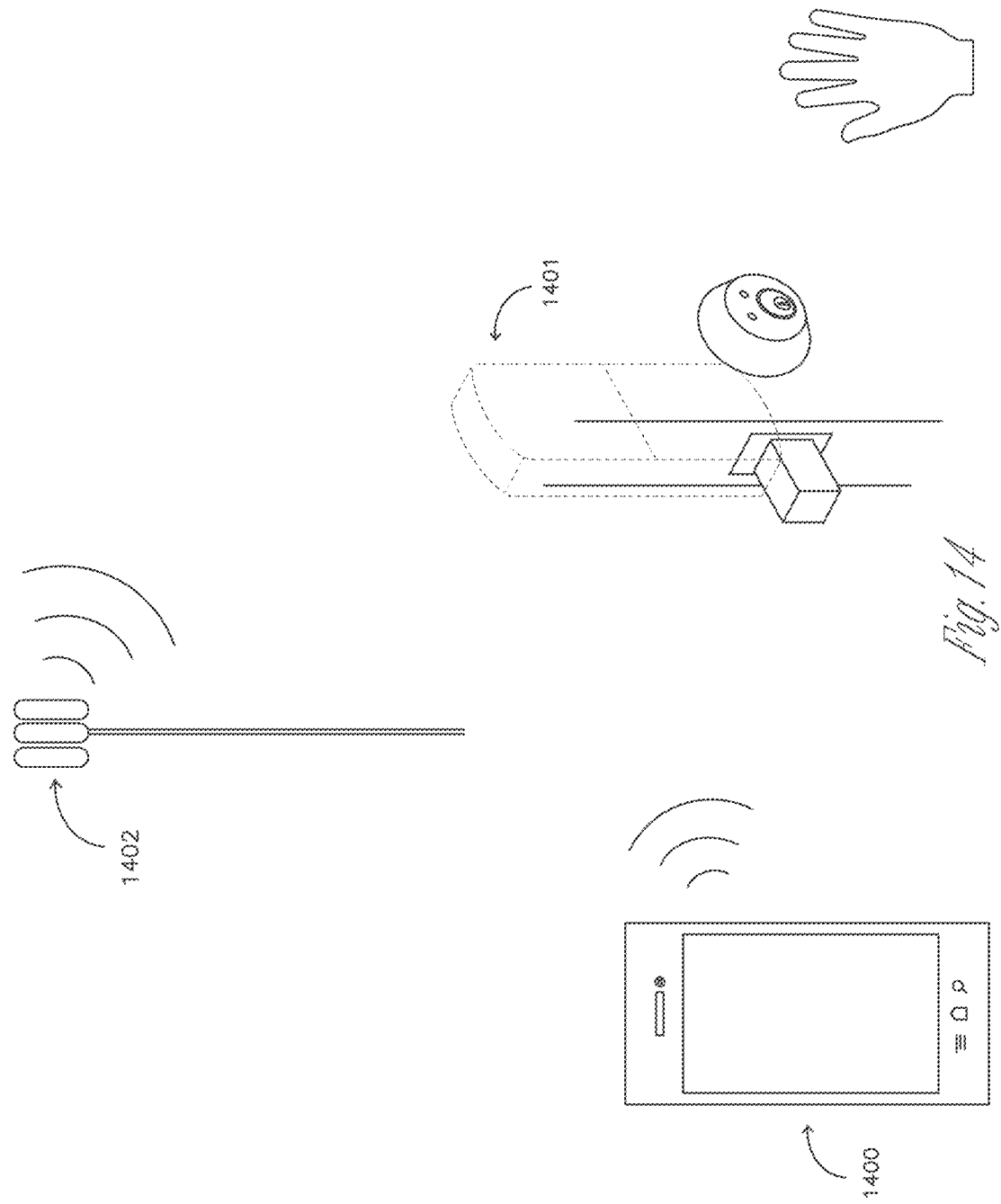

In FIG. 14 a mobile device (1400) may include a number of radios, notably those related for long distance communications such as cellular or satellite. It may send commands to or request the status of a locking system (1401) remotely through its cellular or satellite connection to a web service that in turn relays the commands or requests through another cellular or satellite connection (1402) to the locking system.

The locking system (1401) runs a high-powered radio connection intermittently so as to extend the life of any electricity storage devices, potentially several orders of magnitude depending on energy saving techniques used. The high-powered radio connection may include but is not limited to cellular or satellite communications. The method by which the locking system (1401) activates the high-powered radio connection to send status and request commands may include detection of proximity of another powered radio such as those contained in mobile devices.

Figure 15:
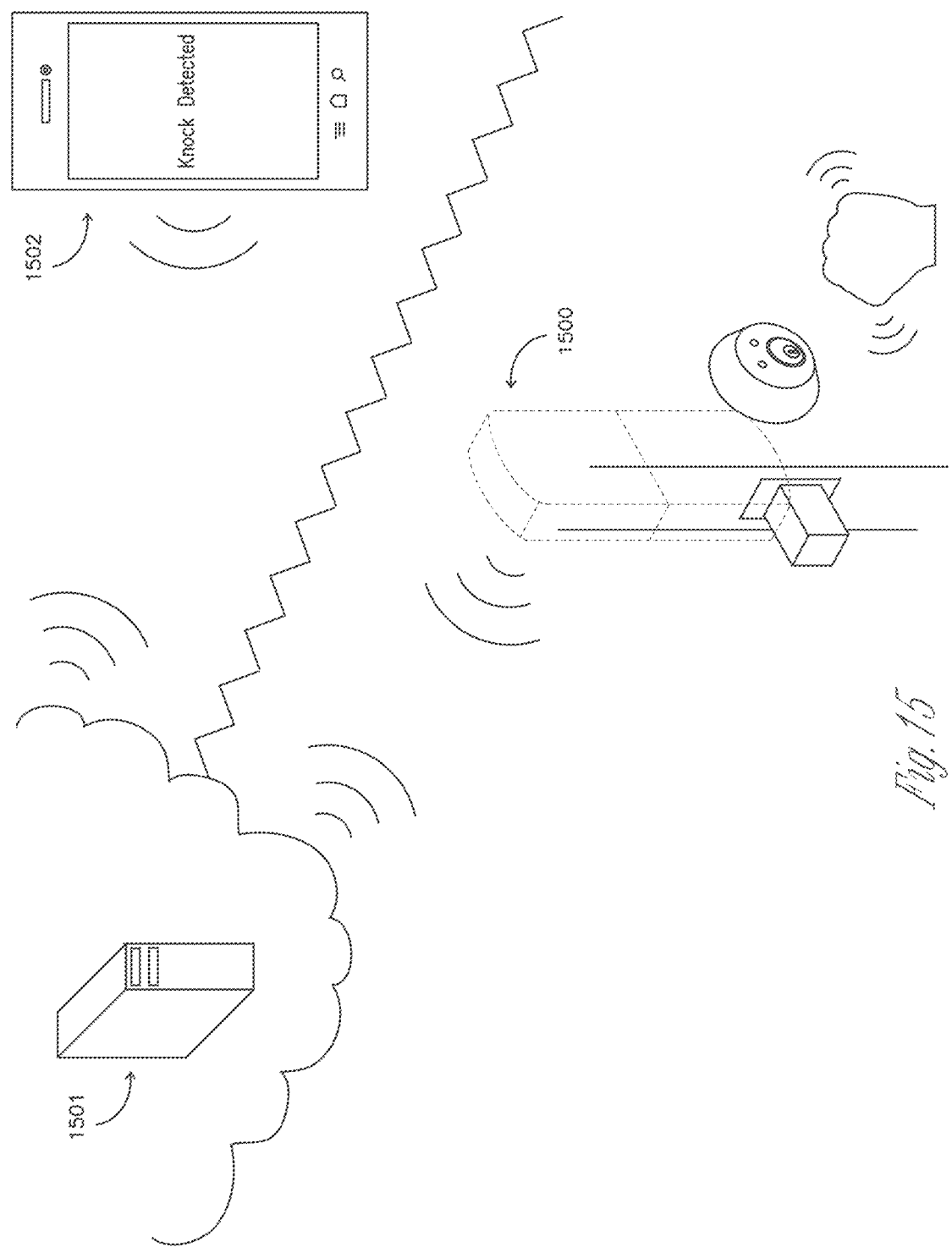

In an example embodiment depicted in FIG. 15, the locking system (1500) may register a knocking or door closing event through the addition of a vibration sensor. This data may be used to "wake" the lock from a low power state to a higher powered state whereby it would communicate with a web service (1501) or mobile device (13402) directly in order to indicate the knock or vibration. The sensor may be tuned so as to distinguish between the types of repetitive motion that would indicate a knock as opposed to the door closing or opening.

The web service (1501) may relay the data through any range of data interfaces to mobile devices to indicate the presence of someone at the door, a lock operation or a door close or open event. The web service may also use the opportunity of a higher-powered state device to relay information back to the device such as previous lock or unlock commands issued locally as well as receive lock status information from the lock system (1500).

A mobile device (13402) or web service (1501) may receive data about the knock sequence, lock operation or door close or door open event notifying the user. If the person knocking on the door is known, the notification might also contain data about who is knocking on the door such as unique signature data like MAC addresses associated with mobile devices attached to persons knocking at the door or a unique knock sequence.

This disclosure includes various ways to detect whether or not a user is proximate to a locking system. In various example embodiments, this may include detection of a locking or unlocking operation, an alarm, or the presence of an internet-connected device, and may further include granting appropriate access to a user for that locking system. The broad objectives of the proximity-based features of the locking system include detecting a person and/or granting them access to control some resource, whether an electronic lock, internet connected tea kettle, for example, or some other device, or taking control of a device, or identifying the user of a device. Reference to "locking system" is intended to include such devices.

Figure 16:
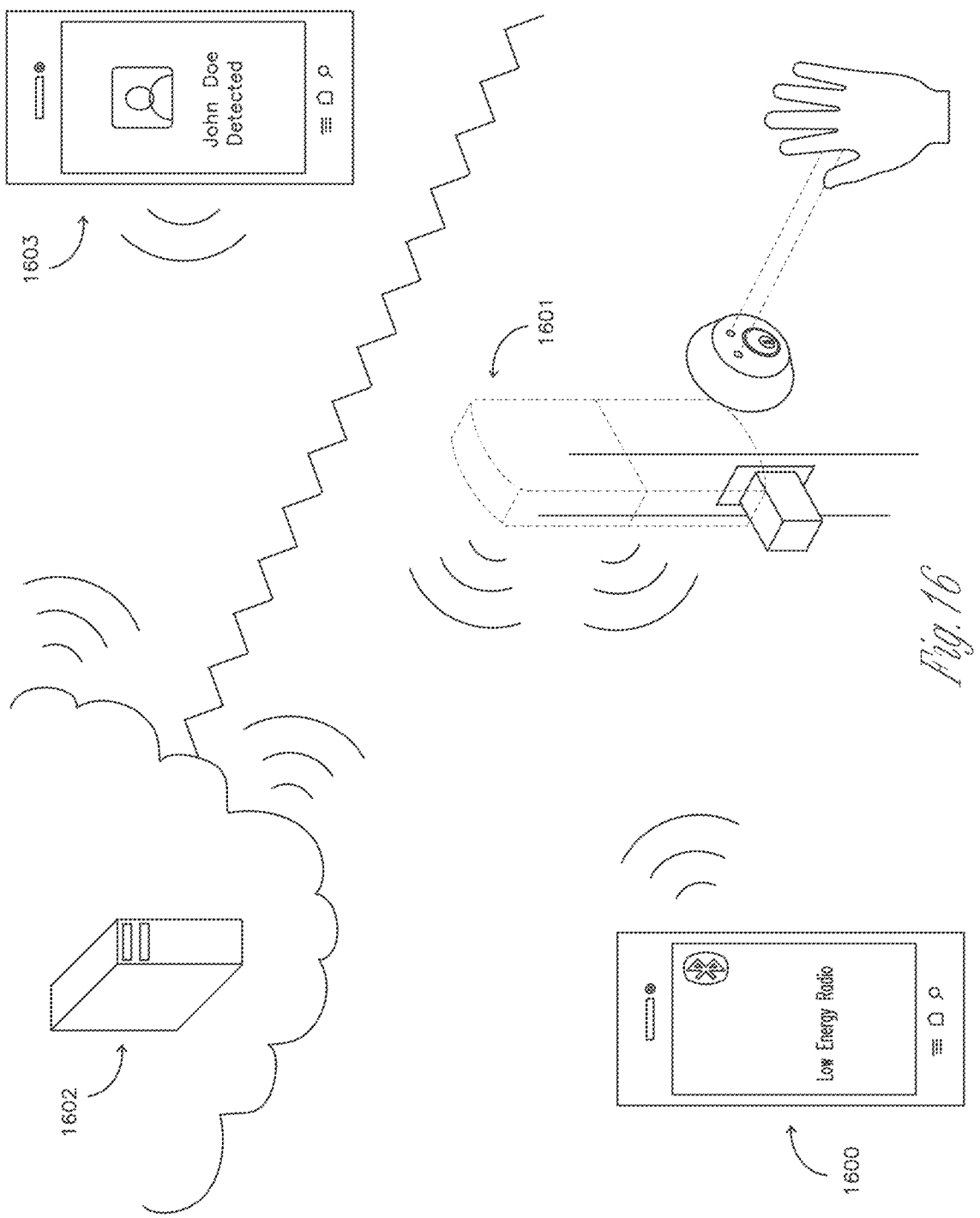

FIG. 16 depicts a (locking system) (1601) which detects the presence of a user through a number of methods. A user may be granted the ability to issue a range of commands on the locking system (1601) using a web service issuing remote commands to the locking system, or for example an internal data store on the locking system which notes whether or not the user is appropriately authenticated.

The authenticated user's commands that they may send while present may be constrained, including the specific commands that may be sent, the data that may be requested from the system as well potential constraints based on time and schedule. The locking system (1601) may detect the presence of a user or person which relays the fact of this presence either directly or indirectly through a locking system web service (1602) to an authenticated user with appropriate access via a portable electronic device (1603) on the locking system, such as an administrator.

Detection of the user may be made through specific radio technology on a mobile device or electronic credential (1600) that may communicate directly with the locking system (1601) or may be detected passively by the locking system (1601) on the user's approach. Depending on whether or not the user is approaching the locking system or moving away from it, the system may send differing notifications to the locking system web service (1602) and, in an example embodiment, directly or indirectly to interested authenticated users. The locking system (1601) may also automatically trigger different commands depending on whether or not the user is detected to be approaching or moving away from the locking system such as unlocking or disarming on approach or locking and arming on moving away. Similarly the concept of granting access to the user based on their electronic credential or mobile device (1600) may be extended to any appropriately enabled device such as but not limited to appliances, vehicles, electronics, industrial systems, security systems, access control systems, computers and other devices.

The approaching user device or credential (1600) may be notified of any commands for which they have access to on the device if they are so authenticated. The presence of a person may also be detected through the use of technology including but not limited to passive or active infrared sensors, radio signature detection, motion on cameras, specific sounds on microphones, light sensors, accelerometers as well as any appropriate form of motion detection. Depending on the sophistication of any of these sensors as well as the presence of an electronic credential, authenticated users may be alerted of a specific person's presence similar to the fashion described above.

A mobile device (1600) that enters the proximity of the presence-detecting locking system (1601) may receive a notification as to the ability to request access to the system from that that device so as to send and receive commands to and from the device. If the user is granted access to the device via the locking system web service (1602), then they may immediately send and receive commands to and from the device.

Depending on the radio communication protocol used to detect presence by the locking system (1601) of the mobile device (1600), a "pairing" process may be required to ensure secure, encrypted communication. While the chosen radio standard may offer a variety of closed pairing methods, open pairing methods may still securely be used to pair mobile devices with the locking system despite the absence of physical contact between the mobile device and the locking system. An open pairing system may allow for all mobile devices approaching the system with the appropriate mobile applications and radios to pair with the system, however, preclude the ability to send and receive any commands to the system beyond the initial pairing dependent on a pre-shared signature with the locking system and the mobile device. A web service (1602) to which the locking system connects may revoke or issue these keys.

Alternatively, a knock or series of knocks on a closed pairing system may trigger a secure pairing between a present device (1600) and the locking system (1601) despite the fact that the device may be held by a user outside a secured perimeter and even if the locking system is engaged. If available on the locking system, a key pad and pin entry may also be used to complete pairing between the mobile device (1600) and the locking system (1601).

FIG. 17 depicts a motion detection system or radio detection locking system detecting a person (1701) through their mobile device (1703), electronic credential or infrared signature (1702) detecting body heat.

The detector (1702) in turn relays information of the detection event, including if available information about the person as garnered from their mobile device or electronic credential, to the web service (1704). This information may be used by the web service for a number of purposes including but not limited to triggering a locking system, arming or disarming an alarm system for appropriate users or notifying a third-party application or service so that it may carry out an action.

If the detector (1702) picks up the radio signal of an authenticated electronic credential or mobile device (1703), it may send a different signal than the signal sent from the detection of person through their infrared signature. This may allow for seamlessly disabling alarm systems for authenticated users while triggering them for unknown infrared signatures.

Restrictions on authenticated users as well as the authentication of new users may be dictated by the web service (1704) that is in communication over the internet with the detector. Specific motions interpreted by sophisticated detectors such as passive infrared sensors or cameras may also serve to authenticate users.

FIG. 18 depicts the presence of a mobile device (1800) to a locking system (1802) as detected through global positioning satellites (1801) or other similar technologies that rely on triangulating a mobile device through the use of other known radio signals.

In turn the mobile device (1800) may automatically select the closest locking system (1802) available so that the user may instantly send commands to that locking system upon activating the mobile device and, potentially, an application dedicated to controlling the locking system (1802) on the mobile device (1800).

The mobile device (1800) may store information as to how it selects the locking system (1802) based on a variety of methods. The mobile device may receive the coordinates of the locking system upon enrollment of the mobile device or the authentication of an authenticated user of the mobile device. The coordinates may be determined by the locking device itself through a number of means, including but not limited to GPS, Wi-Fi™, cellular signals or IP address lookup. Alternatively, the associated locking system (1802) on the mobile device (1800) may request the user to manually input a trigger location for the application. This trigger may occur the first time that a command is sent to the locking system such as during its initial registration or after a certain number of commands have been detected to have been sent from a specific location. Location trigger coordinates may be stored locally on the mobile device as well as additionally sent to an associated locking system web service that in turn relays the data to other authenticated clients so they may avoid any initial set up.

The authenticated user may be limited in their ability to send commands to the locking system based on their detected location for security purposes. Administrators of the locking system may wish to limit commands to the locking system to a certain proximity at which a user is determined to be present to the locking system, incorporating some or no margins of error depending on the ability to pin-point the mobile device coordinates and the confidence in those coordinates. Multiple location factors may be used to achieve more accurate location information.

Depending on the preferences of locking system administrators, some locking systems may be public to all users executing the appropriate mobile application within a certain proximity range of the locking system. This allows users to request access through the locking system web service to send or receive commands from the locking system.

The locking system may use the ability to establish bidirectional communications between itself and a mobile device as another proxy for the presence of a user. A locking system may have the constraints set dynamically on certain users that their authenticated mobile device must be connected to a specific Wi-Fi™ network so as to execute locking commands. The connection through a technology such as Wi-Fi™ may be direct to the locking system, through a shared internal network or through a different network that has been pre-established on the locking system.

FIG. 19 depicts a locking system (1901) that is triggered by a mobile device (1900) which has entered the proximity of the locking system. Proximity to the locking system of the mobile device may be determined by a number of methods as described above.

On a mobile device (1900) having the ability to execute applications without the user's explicit intervention, it may be possible to send notifications from the lower level operating system to the attention of the user on the approach of a pre-defined "geo-fence". In an example embodiment, a geo-fence is a virtual perimeter for a real-world geographic area. A geo-fence could be dynamically generated, as in a radius around a store or point location. Or a geo-fence can be a predefined set of boundaries, like access-restricted zones or property boundaries. User-defined geo-fences may also be in use. When the location-aware device of a location-based service (LBS) user enters or exits a geo-fence, the device may receive a generated notification which may be used to launch a special purpose application to operate the lock system or otherwise generate an event. The lower level operating system may designate the geo-fence or it may relay the necessary data of the geo-fence to a specified locking system mobile application. Depending on the lower level operating system, the locking system mobile application may or may not have the ability to automatically send a radio request directly to the locking system or to a web service associated with the locking system to trigger a command.

In the case where the lower level operating system hinders or precludes the ability of the mobile application to send a radio command, a notification of proximity to the locking system may be relayed to the user. In turn, acknowledgement of this notification through a pre-designated action by the system such as a swipe may be used to launch the locking system mobile application and trigger a specific command. Depending on the lower level operating system and user preferences, a pin code or other authentication action may need to be taken to carry out the command after a gesture or command is made on the mobile device.

If the user is appropriately authenticated and has appropriate access to carry out commands on the lock, then their command may be immediately carried out upon launch of the mobile application from a notification-triggered action due to the fact that the lower level operating system allows access to send radio commands either directly or indirectly to the locking system.

The same premise may be used to arm or disarm alarm systems. Triggers for different commands such as lock or unlock or arm or disarm may be sent to the locking system depending on whether or not the user is detected to be moving towards or away from the locking system. The information as to whether or not the mobile device leaves or enters the geo-fence may be handled by the lower level operating system. The message relayed to the user of the mobile device in the form of a notification may be dynamic depending on direction of the user towards or away from the locking system as well as the user's last known authentication and access states.

The locking system mobile application may immediately carry out a command upon being loaded by the user from the notification. The user may be directed to a dashboard where they may send or receive other commands to or from the system.

Proximity to the locking system by appropriately enabled third-party devices or electronic credentials may also be registered in the same fashion as described above. These third-party devices may include but are not limited to radio-enabled phones, computers, watches, tablets, personal digital assistants and other electronic credentials. They would convey the presence of known or unknown users proximate to the locking system and would potentially be authenticated in the same way as a mobile device to send commands to the locking system. Authentication of a third-party device may originate from the locking system web service.

Although the primary operation of the locking system may be in relation to an internet connection so that it may interact with a web service that authenticates and revokes access to appropriate users, it may also function in an offline function whereby it communicates directly with an electronic credential or mobile device.

In the case of offline operation, a proximate mobile device or electronic credential would be authenticated directly on logic directly within the locking system, not merely on an associated web service. If disconnected from the web service the locking system would still be able to authenticate and accept commands from authenticated users (their mobile devices and electronic credentials). Schedules, time limits and other restrictions not reliant on a live connection to the web service would also still be adhered to by the locking system.

The present disclosure includes systems and methods for allowing third party systems to access a locking system, send and receive commands. The third-party system will typically need to be authenticated by a user with sufficient powers (i.e. administrator, owner) to authenticate the third party system. That authentication may be revoked or restricted at any time. Additionally, access may be granted directly to third-party devices which may connect directly to the locking system to control it. This facility extends to security/alarm systems as well.

Figure 20:
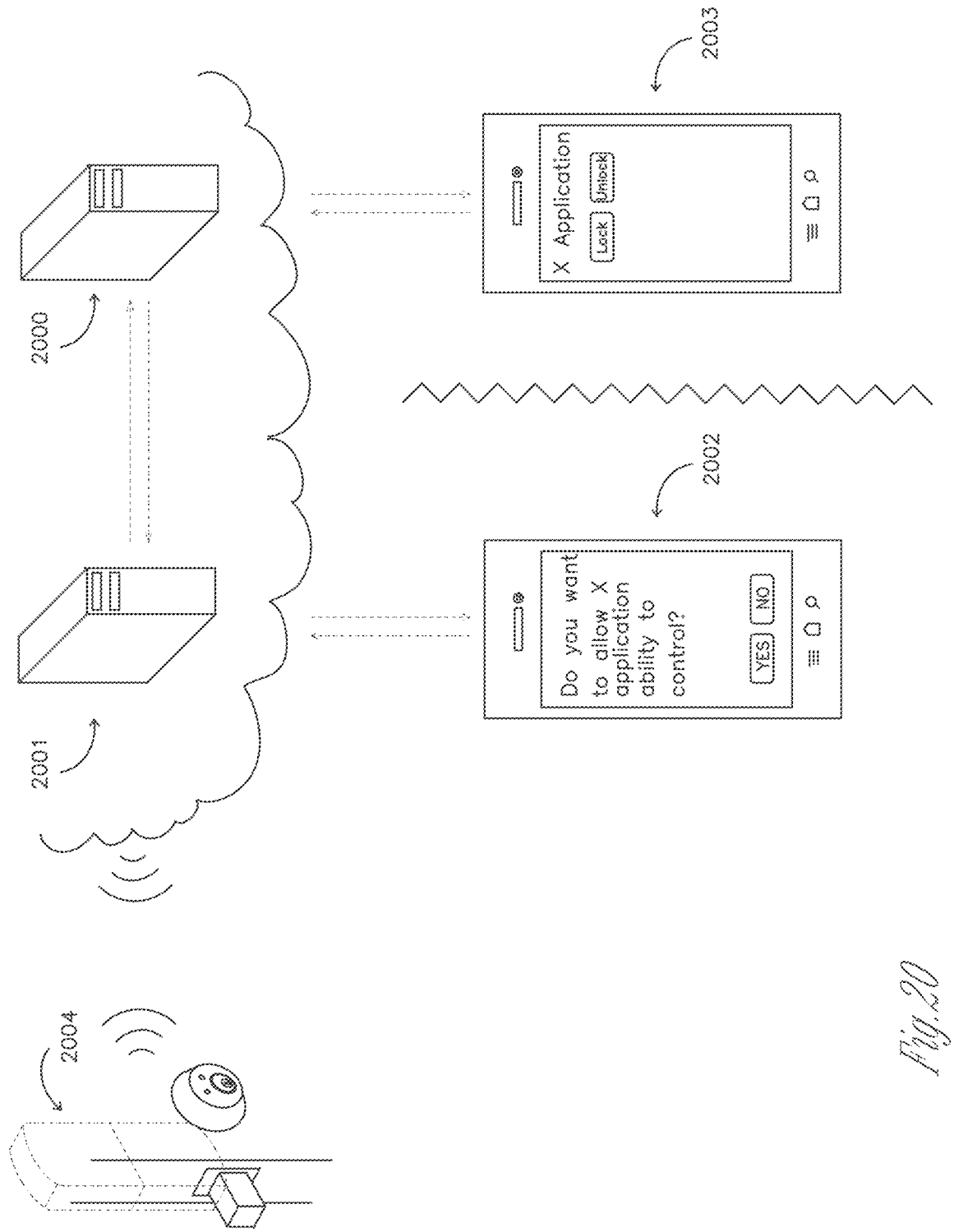

FIG. 20 discloses a third party service which has triggered a request to access the resources available on the locking (or security/detection) system (2004). The request from the third party (or requesting) system (2000) may be sent from third party software, originating either directly or indirectly from the third party web service. The request will typically contain information about the locking system (2004) or an associated user granted access on that system sufficient to directly or indirectly instruct the granting web service (2001) of the access the third party requires. An indirect request from the requesting web service may originate from web or mobile application (2003) that is hosted by the third party service, or another application which in turn has been granted authentication to make such requests.

In an example embodiment, the request from a third party system to access the resources and in turn control the locking system (2004) requires approval from an authenticated user (2002) who has been granted appropriate permissions on the locking system. The locking system web service (2001) may enumerate available commands dependent on the authentication of the requesting user. If appropriate authentication is met in order to grant the third party system access to the system then this access may be constrained or unlimited in scope, not limited to but including constraints such as time of request, quantity of requests, frequency of requests, format of request and commands available to be requested.

Once authentication is established for the third party system, a user of the third party system who in turn has sufficient authentication may seamlessly send and receive data from the locking system such as lock or unlock commands and locking system requests.

The locking system web service may interact through a standardized set of commands with the third party system to additionally notify it, and in turn, the user's third-party clients, with information about the status of the locking system not limited to but including such information as revocations in access, offline alerts, door status and battery levels.

Previously authenticated third-party services may have their access revoked on a number of factors, namely those relating to cancellation of their access by an authenticated user or abuse of the system such as sending an excessive number of commands or attempting to falsify commands. Third party services may be identified by a number of factors including but not limited to application keys, IP addresses, MAC addresses and user agent strings.

Figure 21:
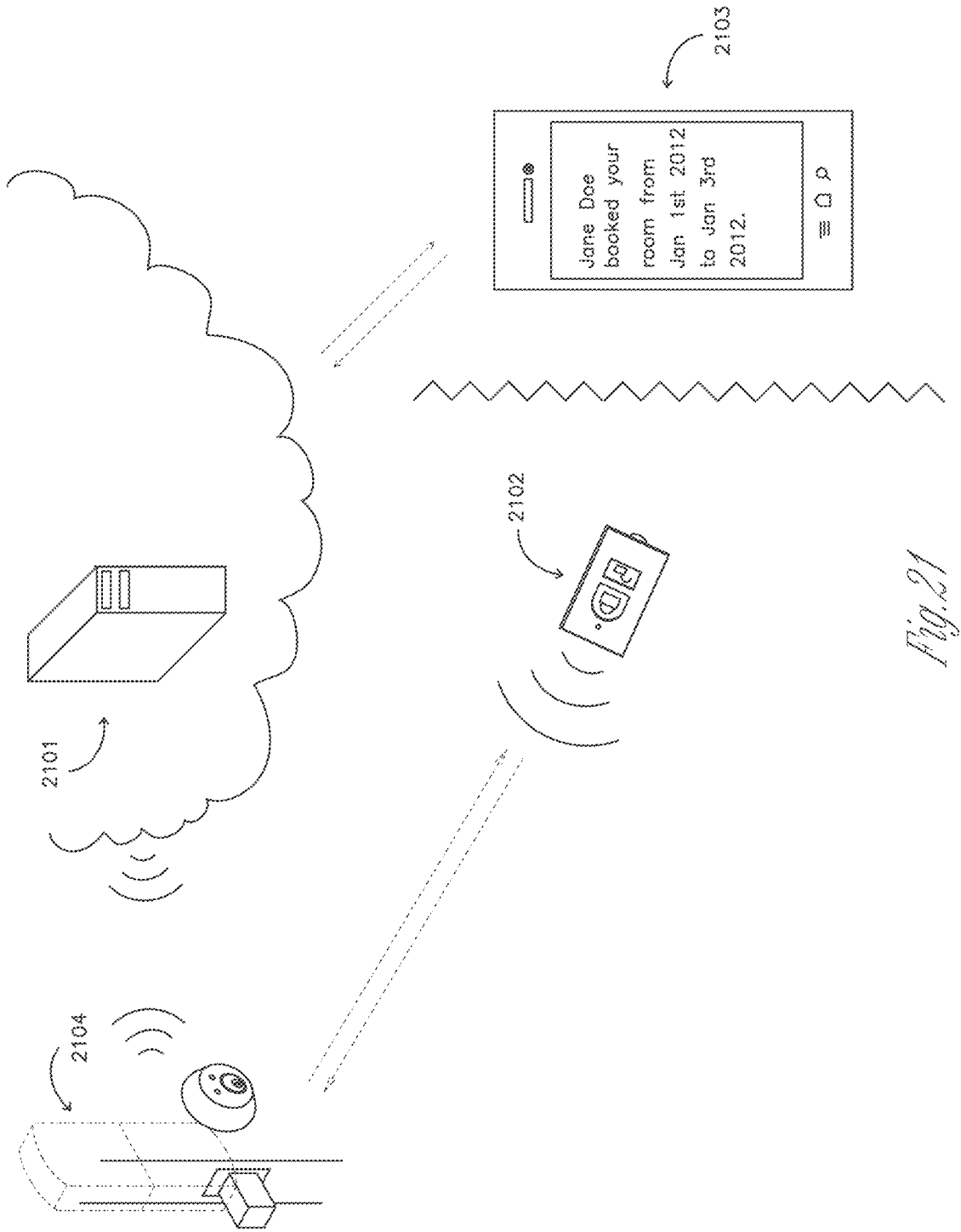

FIG. 21 demonstrates an alternate example embodiment whereby an electronic credential or wireless remote (2102) is pre-authenticated to send and receive commands from a locking system (2104). The locking system web service and third party web service (shown together at 2101) communicate with the client third-party applications (2103) receiving and sending commands to pre-authenticate the electronic credential. "Pre-authenticate" is the process of instructing the locking system to execute commands sent from an offline electronic credential based on a unique identifier or rolling token that is specific to that offline electronic credential.

The third-party client application may automatically request access on behalf of the electronic credential based on the trigger of an outside event such as booking a room for use at a certain time (see screen in 2103). The electronic credential may be entirely disconnected and offline from the locking and third-party web services, however, it would still be able to issue authenticated commands to the locking system (2104) if the system has been informed of the electronic credential's unique identifier. The electronic identifier may trigger an action with the locking system either through direct input by the user or through indirect input such as coming into proximity with the system, where proximity is the greatest range at which the electronic credential may communicate successfully with the locking system.

An electronic credential may include but is not limited to a simple key fob style remote control or a mobile phone that carries on it the same unique radio signature. The same features such as detection at proximity to carry out commands or direct commands from the user would apply. In addition, an internet connected device emulating a simple offline electronic credential may also relay additional data to or from the locking system.

Figure 22:
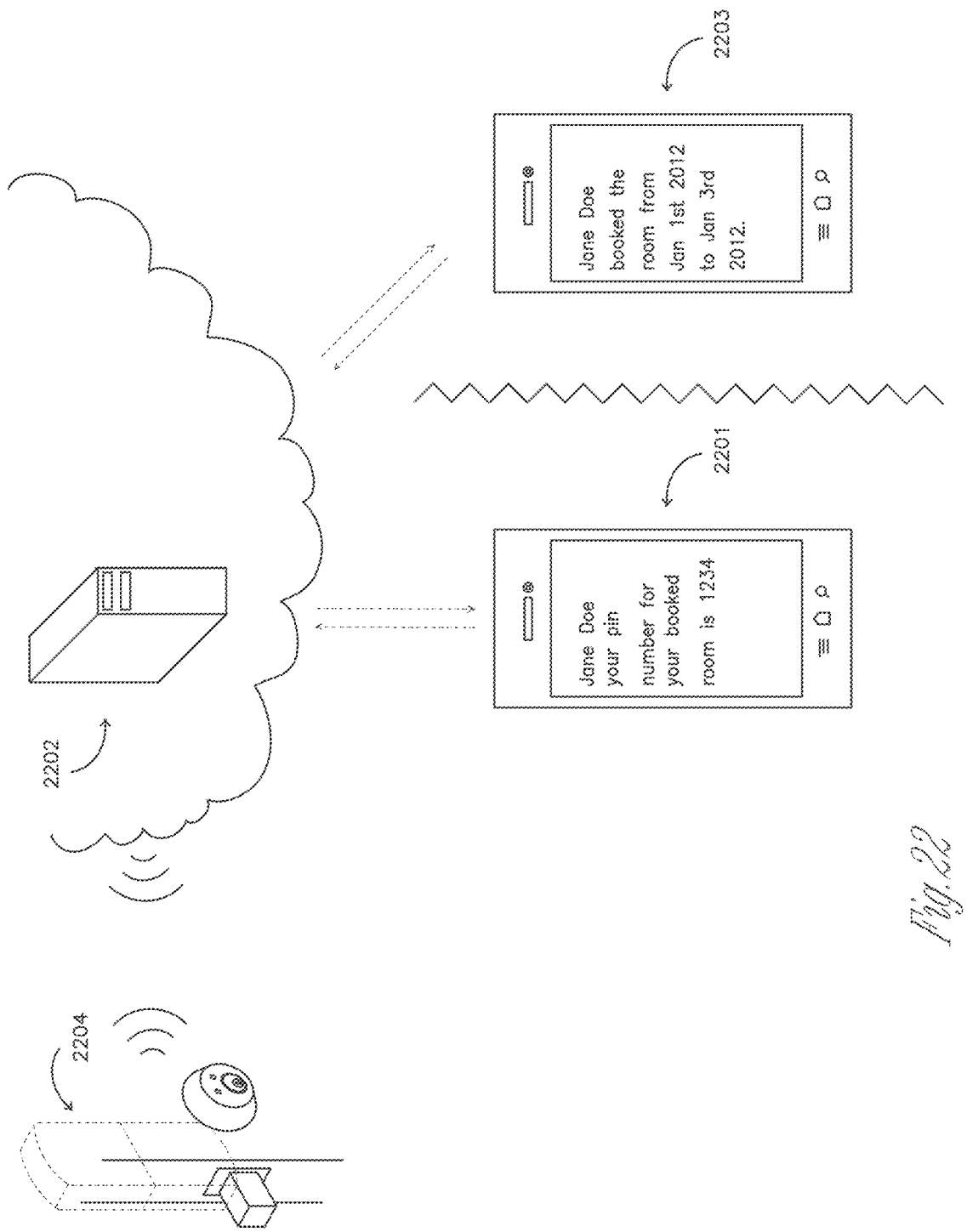

FIG. 22 discloses another example embodiment whereby a newly authenticated user (2201) receives a message confirming their registration via a communication such as but not limited to a text message, an email, a push notification or a third-party application notification informing the user of a pin code that allows the user access to a locking system (2204). If entered properly on a keypad (not shown) on the locking system, the pin code may grant access to a number of functions, including but not limited to locking or unlocking the locking system (2204). In the case where a third party application (2202) has already been authorized to send communications to the locking system (2204), clients to the third-party system may handle all communication to end users in order to convey information about the lock system as well as the ability to send commands through to it. A push notification may be context dependent, but in an example embodiment the web service sends a push notification to the portable electronic device informing the device that the status of the locking system has changed. It is also conceivable that the locking system sends a push notification when the status of the locking system has changed (for instance someone manually unlocked the door with a key). In an example embodiment, the portable electronic device sends the web service a push notification when a user is added as an authorized user to a lock.

Depending on the authentication conveyed to the third party service, the pin code may be relayed from the locking system service to the third-party service so that it may be conveyed to the end user. The pin code may be configured in a number fashions. The user may be required to enter a user specific pin code along with by a lock system specific pin code. Alternatively, the user may be granted a unique pin code for each lock system, where uniqueness is determined by requirements of the length of the pin code in terms of the total key space of pin codes.

Each time a granted user (2201) enters the pin code into a locking system where they have been granted access (2204), the entry of the pin code and any commands sent may be relayed by web service (2202) to the locking system (2204). If the issuing user (2203) directly or indirectly removes the granted user (2201) from the locking system or carries out an action that would remove the granted user from the locking system through the third-party service, the granted user's pin will be invalidated. An example of this includes the cancellation of a granted user's booking of a space for a specified time.

Figure 23:
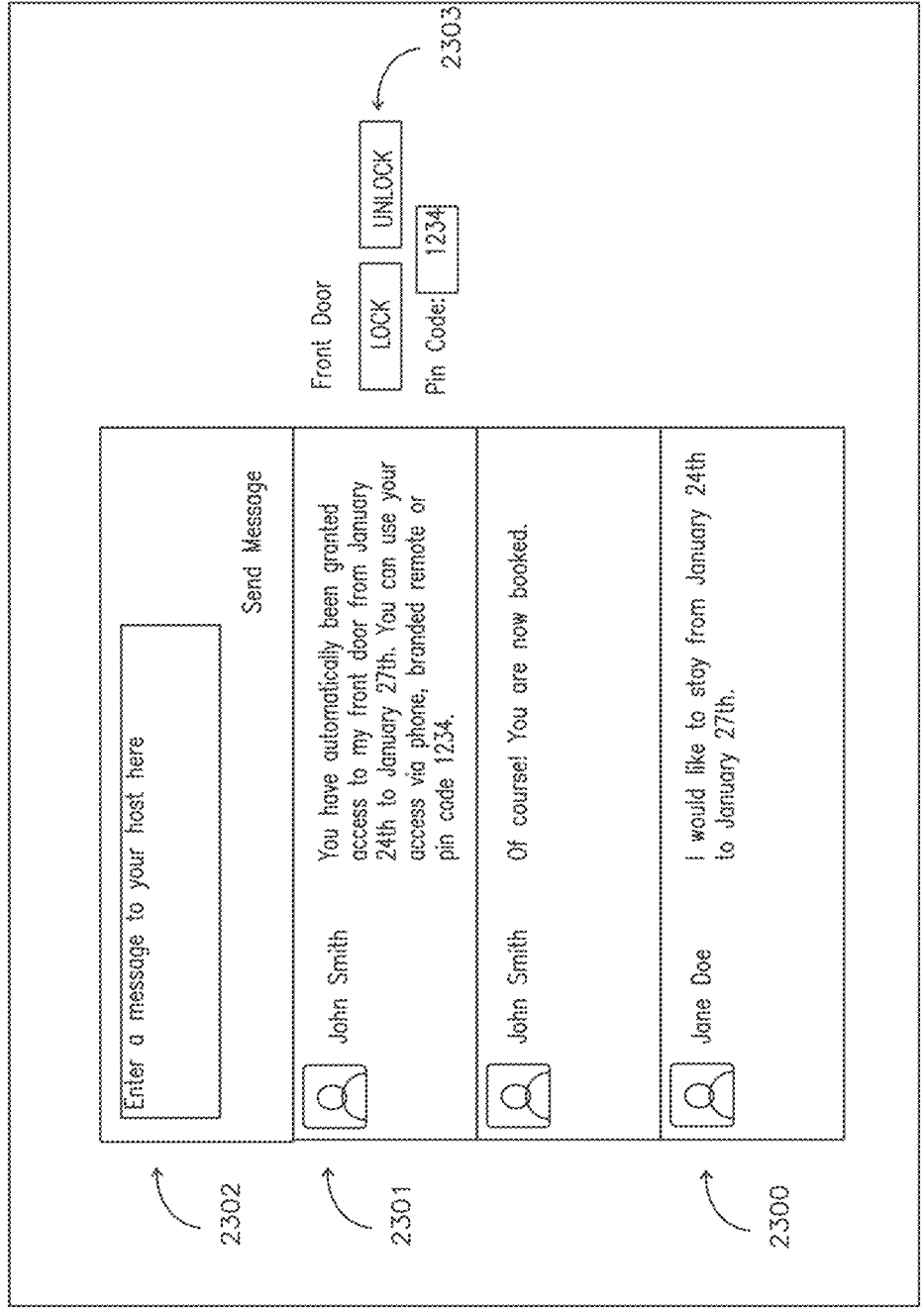

FIG. 23 depicts a dashboard component that may be shown by a third-party booking service which is authenticated to act on behalf of a sufficiently authenticated user on the locking system. In this scenario, a potential guest (2300) requests to book a space from the host booking out the space (2301). The third-party system may allow for internal messaging (2302) between potential guests and hosts. Upon the agreement of a booking time, the third-party system may automatically request access from the locking system for the guest, issuing the guest access to control the locking system for the time specified by the booking.

The third-party system may automatically message the guest the information required to access the locking system. Depending on the locking system, this may include a pin code (as shown in 2301) or a link that allows for setting up the locking system on a mobile application. Alternatively, the third-party system may request the locking system to authenticate an electronic credential to access the system similar to the process described above.

The third-party system may incorporate locking system controls directly into its dashboard component (2303) which allows the guest to modify their unique pin code (if granted) or to send locking system commands during the period of time and on the schedule which they have permitted.

Third party devices may interact directly with the locking system if they have been granted an appropriate unique identifier. The third-party device communicates directly with the locking system to send the command. The third-party device will typically first be pre-authenticated to send commands to the locking system in the same fashion as described above. This may mean that a unique identifier in the locking system or locking system web service is used to enable access to the for the third party device.

When the unique identifier is either relayed to the locking system, a derived rolling token is relayed or the device detected via an encrypted proximity signal from the third-party device, the locking system is triggered. The ability for the third-party device to send commands to the locking system may be constrained or limited by various schedule and timing constraints. The third-party device's authentication to use the locking system may be revoked or re-enabled at any time dependent on commands send to the locking system from the locking system web service or a third-party web service.

In using any third-party service or device to communicate with the locking system and locking system web service (if so configured), security is of the utmost consideration. The communication channels between the locking system web service and third-party web service may be required to be in an encrypted form, including but not limited to standards such as SSL, SSH, AES or other public or proprietary encryptions schemes.

Similarly, direct communications between the locking system and electronic credentials or third-party devices may be encrypted through various standards such as those incorporated by technologies including Bluetooth™, Bluetooth™ Low Energy, Near Field Communications, MiFare™, Felica™ (Felicity Card), Wi-Fi™, WEP (Wired Equivalent Privacy), WPA (Wi-Fi™ Protected Access), WPA PSK (Pre-shared key), and others. MiFare is the NXP Semiconductors-owned trademark of a series of chips widely used in contactless smart cards and proximity cards. Custom encryption standards may optionally be used in place of other encryption technologies or may be layered upon those technologies for additional security.

Figure 24:
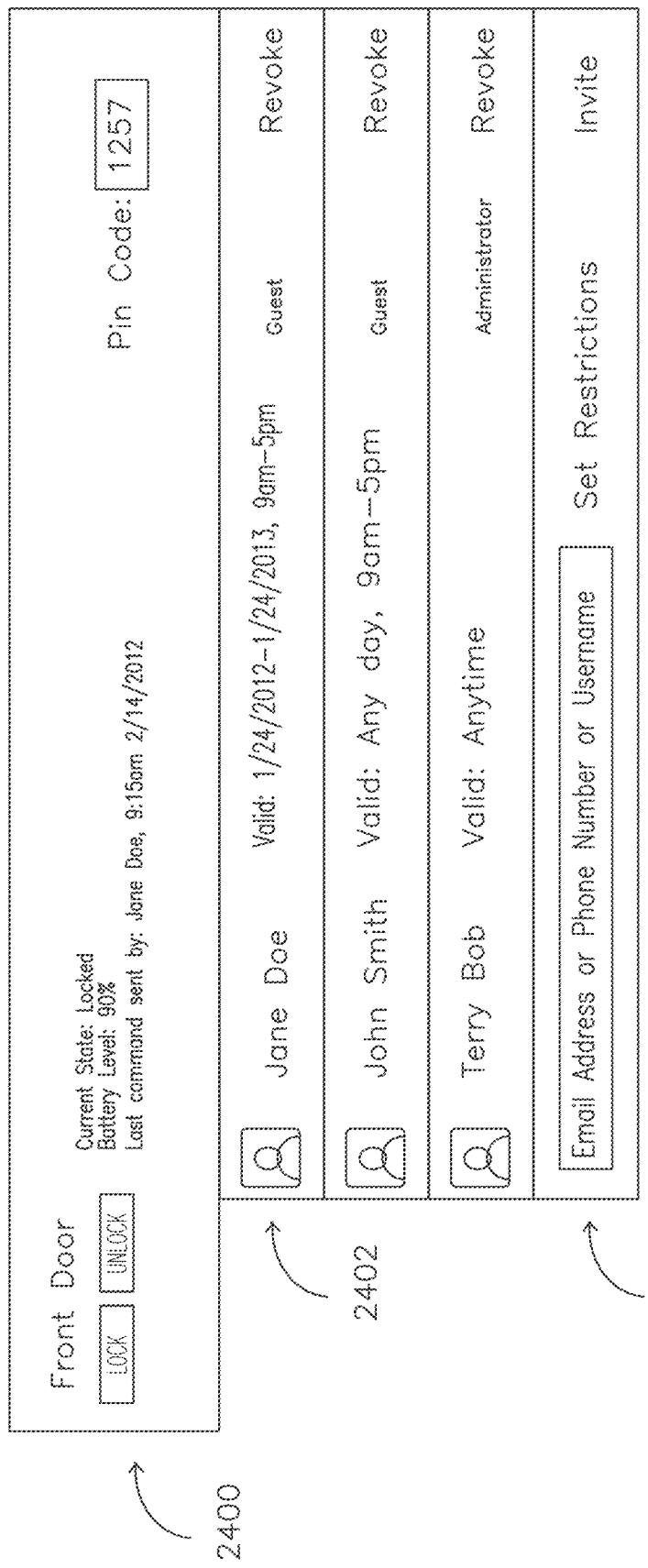

FIG. 24 depicts a web service dashboard (2400) which conveys the ability for administrative users to send and receive commands from a locking system, as well as invite other users to the system (2403), view any cached or live data about the locking system or its state and identify current users on the system (2402) as well as their activities on the locking system. This dashboard may be available in a variety of formats scaled for different applications including but not limited to a traditional desktop browser interface, a mobile phone interface, tablet phone interface or third-party interface. Depending on the privileges granted to the user viewing the dashboard, different information may be conveyed to the user. For instance, certain users may have variations on the ability to create, modify, manage and revoke access for other users as well as the ability to view logging information.

The web service dashboard (2400) may allow for the entry of additional identifying information for the user that may be used as an authentication token either in the form of a pin code that is entered directly in the door, a pin code that is used for text messaging a pre-designated phone number to send commands to the door, a pin code that is used for either purpose or any other serial number or secret token information that relates to an offline electronic credential such as a key card or key fob.

Information about other users (where user is a proxy for person on the system) (2402) may include identifiers such as but not limited to photos of the person, the person's names, aliases, email addresses, phone numbers, status on the web service, status on the locking system, associated privileges. The ability to issue, modify or revoke a virtual credential to other users may also be shown and managed through this system.

New virtual credentials may be issued (2403) by a variety of communication protocols including but not limited to email, phone call, text messaging, application interfaces or third party messaging. These credentials may be granted for various scopes of time and location, not limited to but including time schedules, start and expiration times, specific locations as determined by geo-data, specific locations as determined by proximity through powered or unpowered radio, single or multiple usages and may require multiple types of authentication to be used by the person to whom they are granted. The field in which the virtual credential is entered may automatically populate with identifiers such as but not limited to names, emails, photos, aliases and or phone numbers of users already registered to the system or associated from another third party system as the inviting user types in the field and letters are matched with the identifier dynamically. The field may optionally be extended to enter multiple identifiers for various people so as to invite multiple users at the same time with the same type of credential or optionally varying types of credential depending on a requested algorithm, i.e. incrementing or decrementing.

Figure 25:
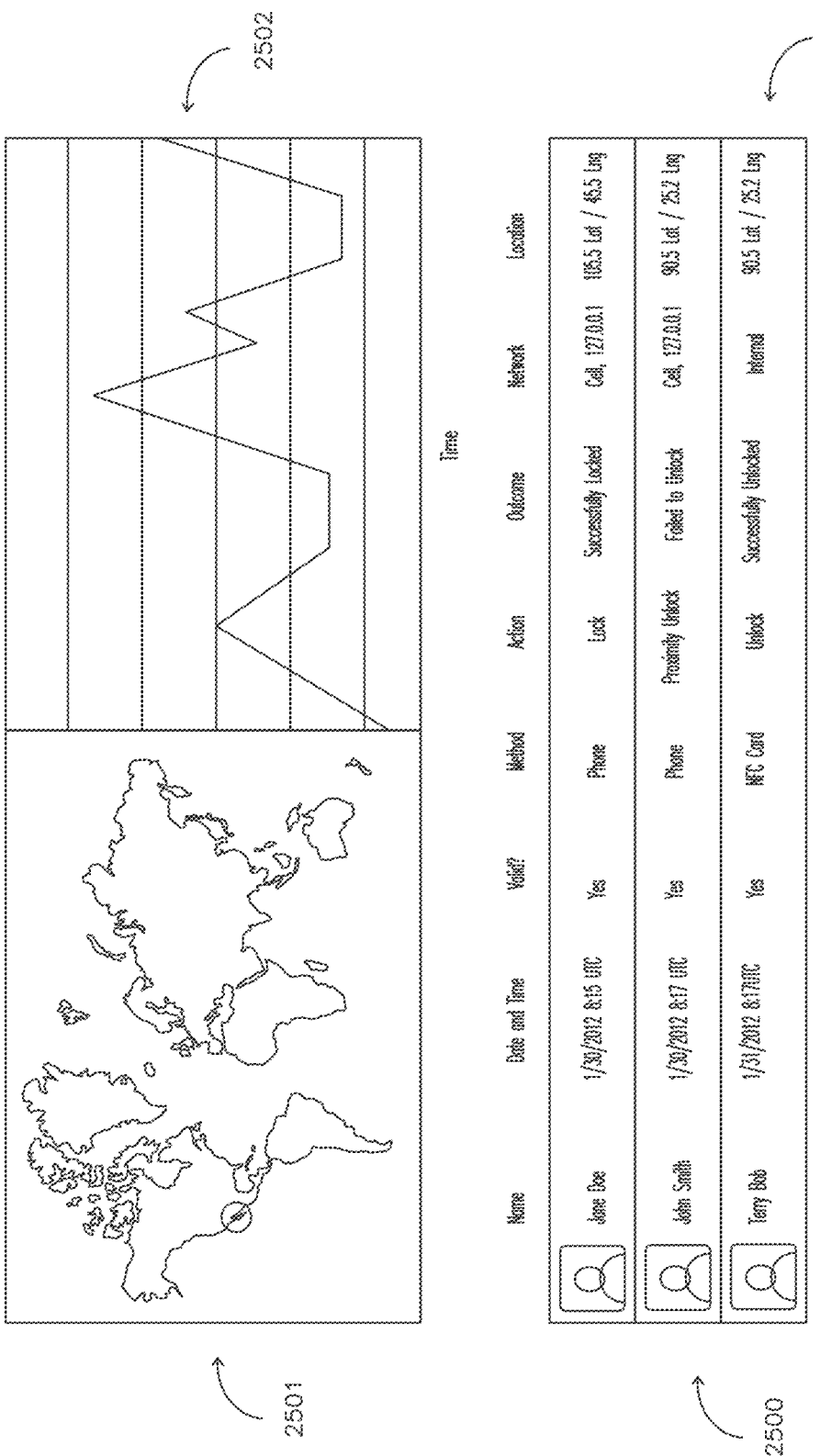

FIG. 25 discloses a logging panel as viewed by an authenticated user through a web, mobile, tablet or other browser interface. The web service associated with the locking system may record a range of information including that relating to information sent and received to and from the locking system as well as physical changes to the locking system, non-authenticated users attempting to access the locking system, events specific to the web service itself or third-party web services relating to or authenticated on the web service or locking system.

Actions carried out by users may be conveyed along with information (2500) such as but not limited to names, aliases, date and time of access, whether or not the virtual key was valid at the time the attempt to access the locking system was made, the desired action, proximity to the location, network location and type, geo location information, outcome and the method used whether the virtual key is from a mobile device, radio token, key pad, web interface, application interface or 3rd party application.

Any data relating to the locking system that is recorded by the locking system or associated web service or both may be conveyed on a map (2501) which may note the position of the locking system or the position of any data transmission sent or received from the locking system or web service. This may indicate whether or not a user was proximate to a locking system at the time they sent a command to the locking system. If the authenticated user has appropriate access to multiple locking systems, their coordinates may all be indicated on a single map.

The web service may convey graphs (23402) that indicate the frequency of locking events over time on a specific locking system. The user may have the ability to filter these events including but not limited to individual user actions over time, specific types of actions over time (i.e. number of unlock events on May 1, 2011), comparing to types of log entries over time (i.e. number of lock events from a mobile device vs. number of lock events from the locking system key pad from Apr. 1, 2011 12:00 pm to May 1st 1:00 pm).

The recorded events may include geo-location coordinate information about the origin of the command at the time the command was sent by a user. This information may be inferred either directly from geo-location coordinate information (2503) encoded directly in the request or indirectly by IP address lookup techniques. Mobile clients, web clients, third-party clients, fixed key pads and readers may be required to send geo-location information to the web service in order to successfully execute commands.

Figure 26:
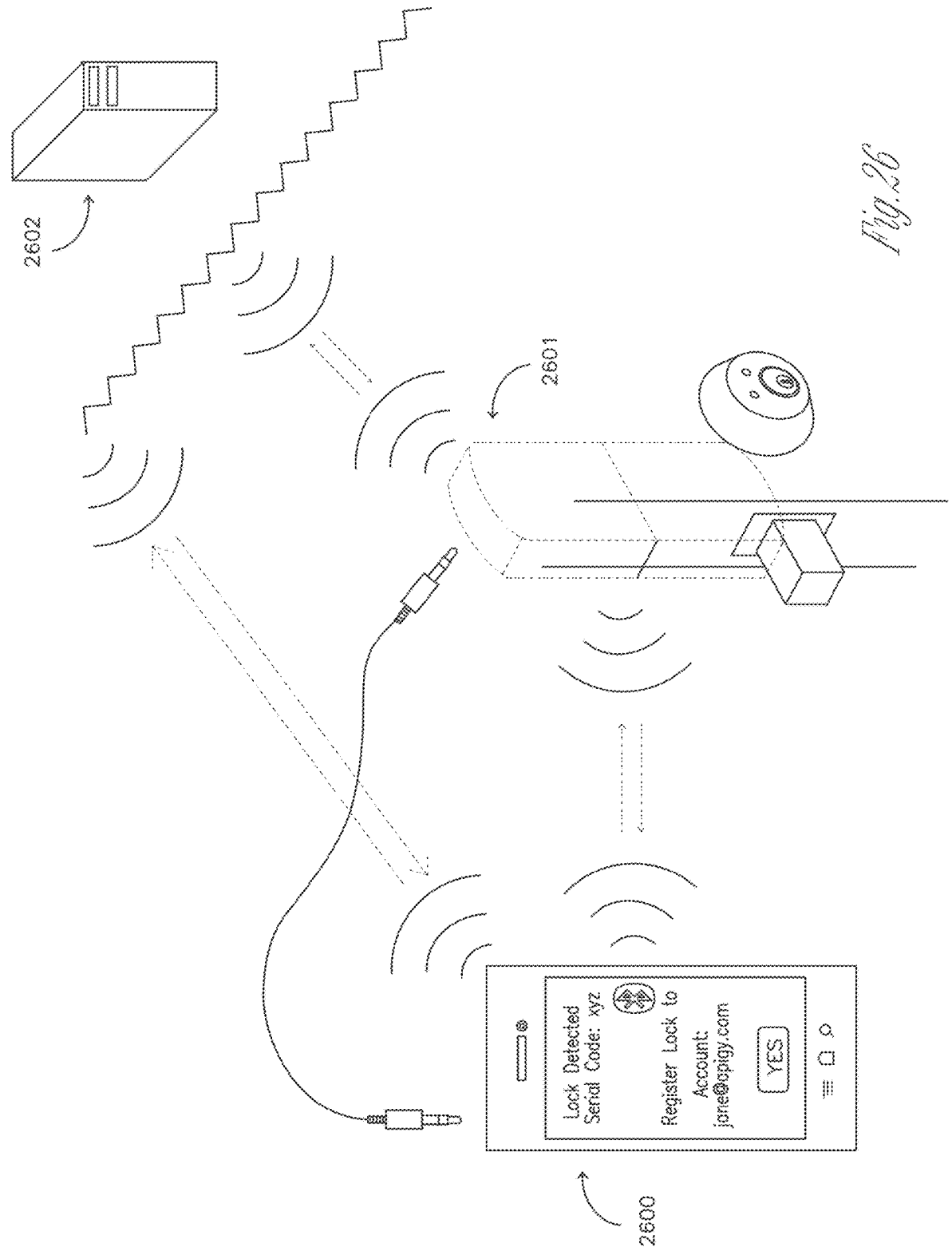

FIG. 26 discloses an example embodiment allowing the initial set up of a locking system to be simplified so that a new user may quickly connect the locking system to a corresponding web service or pair the locking system with their compatible electronic device (such as a mobile device, tablet device, laptop computer, desktop computer, personal digital assistant or third-party device) directly.

An application corresponding to the locking system is used on the mobile device (2600) which communicates with both the associated web service (2602) as well as the locking system (2601) so that it may confer the initial pairing between the new user and the locking system. This initial pairing may request certain identifying information from the new user in order to authenticate them on the locking system such as but not limited to their names, aliases, email addresses, phone numbers and photo. Other identifying information that automatically be sent to the web service during the initial registration may include but is not limited to geo-location information, IP address information, cellular network information if available and information about the mobile device upon which the application is running.

The locking system may be connected directly through a wired connection (2601) to the mobile device (2600) through a common interface such as an audio or serial bus connection. The locking system will receive programming commands from the mobile device, including but not limited to instructions on how to connect to a web service, as well as any necessary authentication keys to connect to local or wide array networks or to create a pairing with the mobile device itself.

The completion of the pairing process may preclude other mobile devices from carry out the same pairing process, as either dictated by logic directly on the locking system or on the associated web service. The initial user may allow requests by other mobile devices to pair with the locking system and these requests may be logged or facilitated by the web service. Physical interfaces on the locking system such as key pads, buttons and other sensors may be used to reset the locking system so that it may be associated freely with mobile devices. These interfaces may require the entry of a specific code or pattern of binary inputs in order to reset the device to a new pairing mode. Information about any reset event may be conveyed to the associated web service first and may trigger notifications or other events on the web service.

Figure 27:
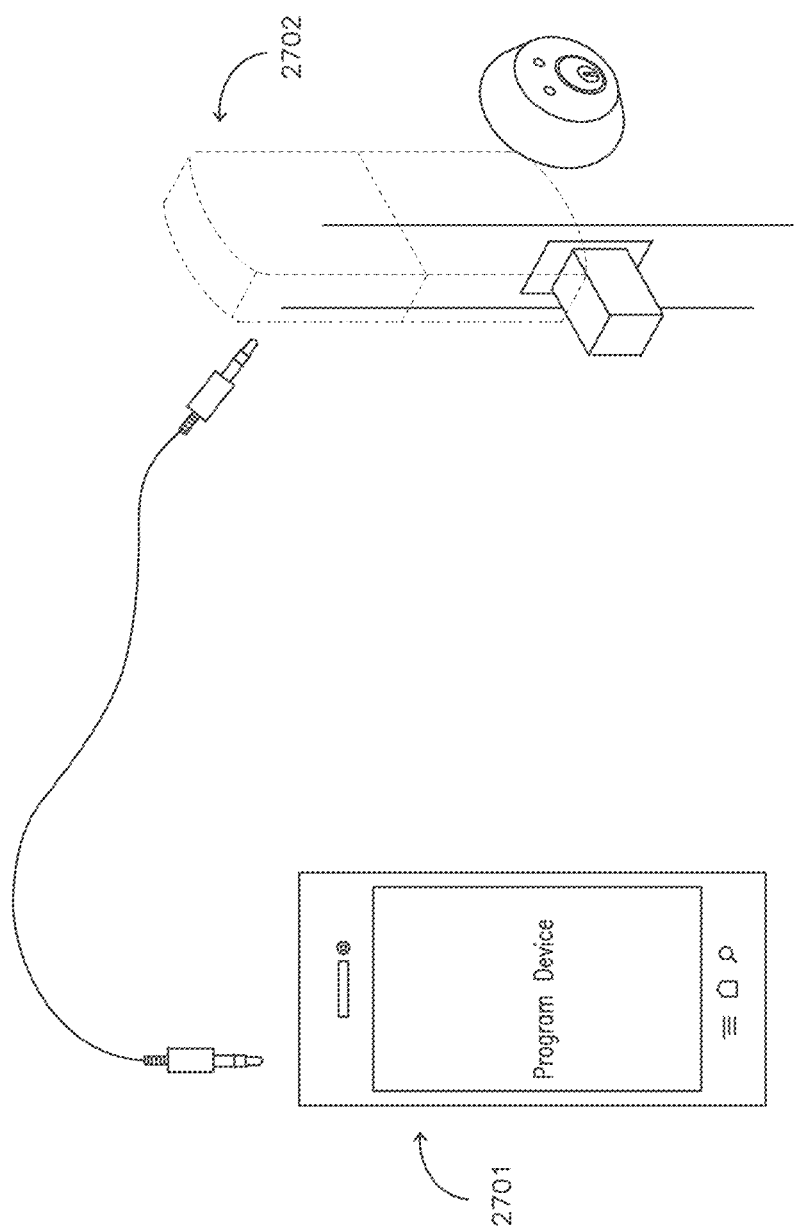

FIG. 27 discloses in an example embodiment a direct connection between a mobile device (2701) and locking system (2702) which may include both send and receive capabilities so that applications running on both devices may convey a range of programming, status and command information. This connection may be manifested as an audio, sound or microphone jack of varying dimensions such as those common on mobile devices. The connection may be used for the purpose of the initial set up and pairing of the locking system with available mobile devices and networks, programming the locking system, resetting the locking system, sending commands to the locking system as well as receiving status from the locking system. These may include instructions for an initial secured connection to wireless network, whether WAN (Wide Area Network), LAN (Local Area Network) or ad-hoc. The data may be transmitted in an encrypted or unencrypted fashion.

After the initial connection or programming event with the locking system it may bind itself to the mobile device via unique identifiers so that no other device may access the same programming functionality unless permission is first explicitly granted by an application either on the original programming mobile device or web service.

Figure 28:
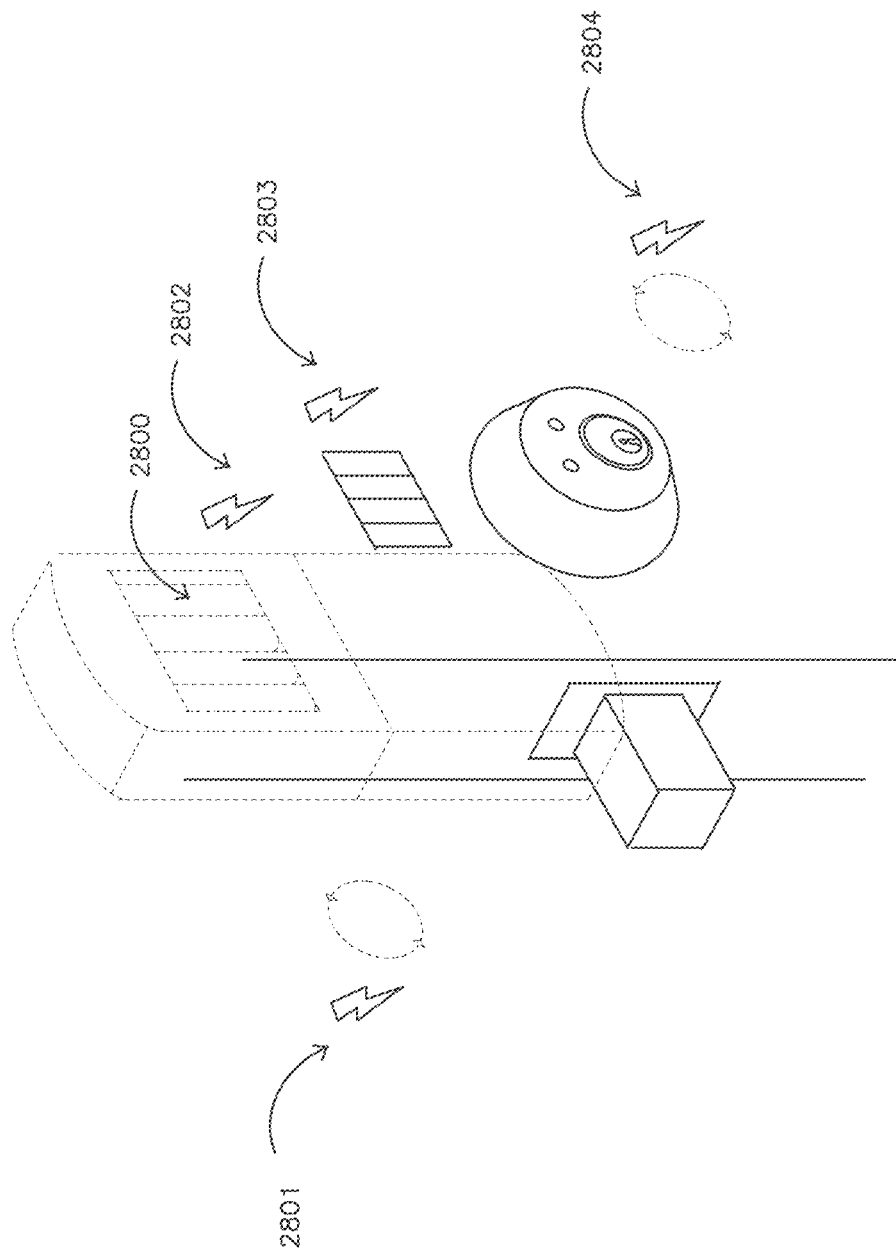

FIG. 28 discloses a locking system which is limited either by the amount of current it can draw at any single point in time or its ability to draw current continuously over time. This may be due to the fact that the locking system draws energy from batteries and with the intent of being usable over a long period of time or because it is partially powered by an energy harvesting or trickle charge system.

The energy for the locking system may be stored by any type of energy storage technology (2800) which meets the physical constraints of the locking system including but not limited to capacitive devices, various batteries of varying chemistries or mechanical energy storage. Appropriate circuitry associated with the energy storage technology would ensure that potentially damaging erratic currents and voltages would be brought to safe levels before being stored or utilized in the rest of the locking system.

Power for the locking system may be generated and captured from the rotation of a thumb-turn (2801) on the interior of the locking system or a similar locking system leverage point that rotates around a fixed spindle that may turn through a magnetic field to generate current (2804). Any number of mechanical interactions with the locking system may be used to capture energy which in turn would be used in the locking system or stored in the energy storage technology (2800). These also include harvesting energy from vibrations (2802) to the locking system that may result from shutting or opening a component related to the locking system. Power for the locking system may also be generated and captured from a photovoltaic or other light capture energy conversion device placed either on the interior or exterior of the device (2803).

Figure 29:
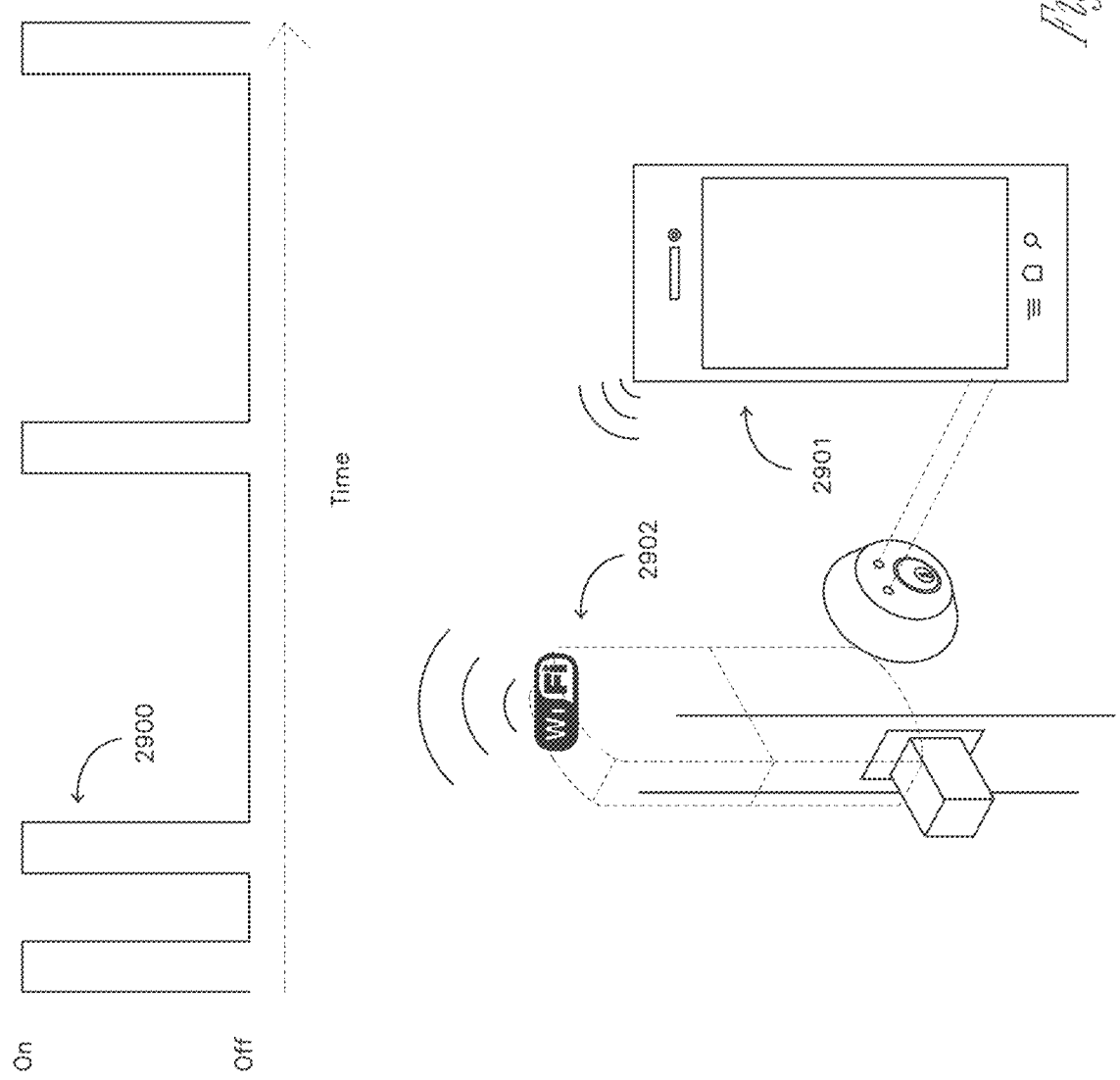

FIG. 29 discloses in an example embodiment a number of methods by which a locking system (2902) may lower its power consumption so as to extend battery or energy storage lifetime. These methods include logic inherent to the locking system (2900) which would activate the most power consuming aspects of the locking system only at those points in time during the day when the locking system is likely to be used.

Such logic may be considered as an algorithm that considers the most frequent times of day that a locking system (2902) is used or has been used in the past (2900). When it is calculated that there is a negligible or nil chance of an event being sent to the locking system the logic would disable the most power intensive components such as radios, microcontrollers, power regulators and other components. The algorithm may shift the schedule as the locking system logs access data from usage and passes this as a parameter into the algorithm. When the system periodically wakes up as determined by the algorithm it may check for lock, unlock or status commands send from the web service, and, potentially, from a mobile device proximate to the door or not, another third-party web service, an application interface, web interface or text message interface.

A mobile device (2901) may generate certain radio signatures which are detectable by specialized low-power consumption circuitry on the locking system (2902). Examples of this include distinguishable signatures from GSM™ (Global System for Mobile Communications), CDMA (Code-Division Multiple Access), Wi-Fi™, Bluetooth™ or other radio technologies which are commonly available on mobile devices. The low-power consumption circuitry would not be intended to communicate directly with the radios on the mobile device, but instead would merely detect their existence so as to power up additional components such as microcontrollers, radios and power regulators that would consume far more current when powered on. The user would then be able to successfully send or receive data to or from the locking system, either directly or indirectly through a web service, while the locking system would only need to consume significant amounts of power when a mobile device has been detected to be proximate to the locking system.

Other very low power consumption components in the locking system (2902) may be used to alert the system of the presence of a user so that other high power consumption components may be activated at the proper time. Very low power components may include vibration sensors, passive infrared sensors, microphones or sensors external to the locking system which communicate with the locking system over a very low power radio component while high power radio components remain in a deep sleep or powered down mode.

Figure 30:
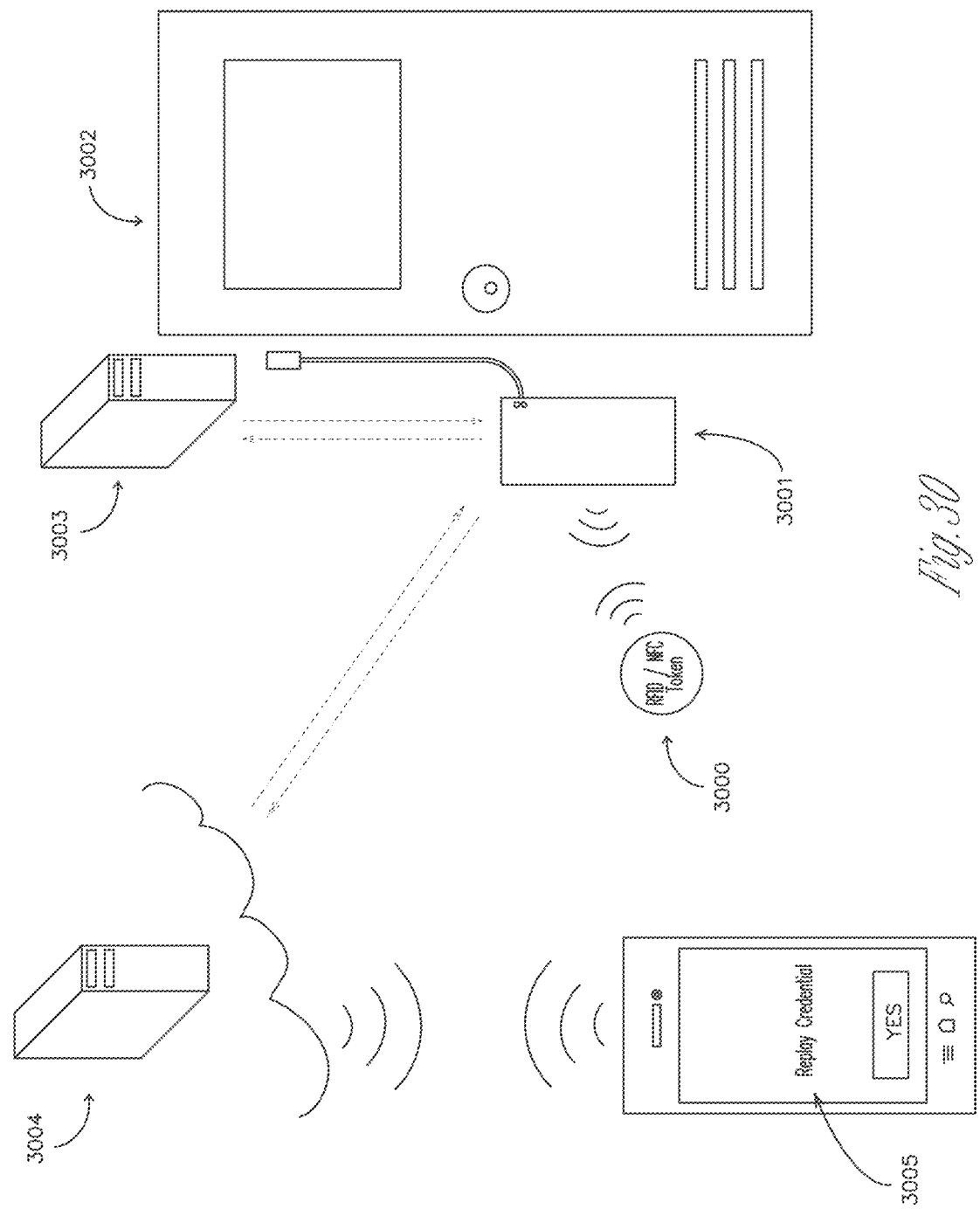

FIG. 30 discloses a locking system which has been modified to accommodate the use of mobile devices and control through web services while still maintaining the original structure of access control. The locking system relies on commonly known and understood access control technologies that consist of a computer controller (3003) which regulates whether or not passive radio credentials (3000) may lock, unlock, arm or disarm the locking or alarm system (3002) when scanned at a connected electronic credential reader (3001).

A traditional access control system may be modified so as to replace or augment the existing electronic credential reader with a microcomputer which may communicate directly with a mobile device or with a web service. The augmenting or replacement reading device (3001) may detect or read from a data connection the information from the passive electronic credential. This data signature may be sent in an encrypted or unencrypted fashion as in the case with standards such as the commonly used Wiegand technology. If encrypted, the device may use commonly exposed or known private keys to decrypt the associated data. The device may act to replay the data so as to emulate the passive radio credential. The emulation of the credential would be seamless to the rest of the locking system and notably the original computer controller (3003).

In conjunction with the mobile device (3005) and associated web service (3004), users who already possess radio tokens for the original service may present their token at the newly augmented or replacement reader device (3001) so as to pair their credential with their user account. Once paired, the user from a mobile device may send a command such as lock or unlock through an application on the mobile device which in turn is relayed directly to the augmented reading device or indirectly through an associated web service. The augmenting reading device would replay the associated radio token data to the original locking system controller, emulating the user holding the original radio token next to the reader.

Once paired, the user may send commands through the mobile interface, web interface, text-message interface or authenticated third-party applications. All of these commands would be ultimately executed according to the original access control computer system (3003), allowing the computer controller to maintain the exactly same programming, logging and other capabilities present with the usage of radio tokens. If the computer controller were to reject the emulated token, this fact could be relayed to the web service or mobile user through a variety of methods.

By preserving the existing infrastructure, the new web service and mobile enabled infrastructure may easily and quickly installed while maintaining all programming related to the original computer controller. The web service (3004) may additionally communicate directly with the computer controller (3003) in order to bypass the need for augmenting the reader component (3001). The augmented reader component may feature any range of proximity detection technology including those radios which communicate directly with common mobile device radios like Bluetooth™, Wi-Fi™ ™ or Near Field Communication.

Method Embodiments

Some embodiments of the present inventive subject matter include methods of operating a remotely operable lock.

Figure 31A:
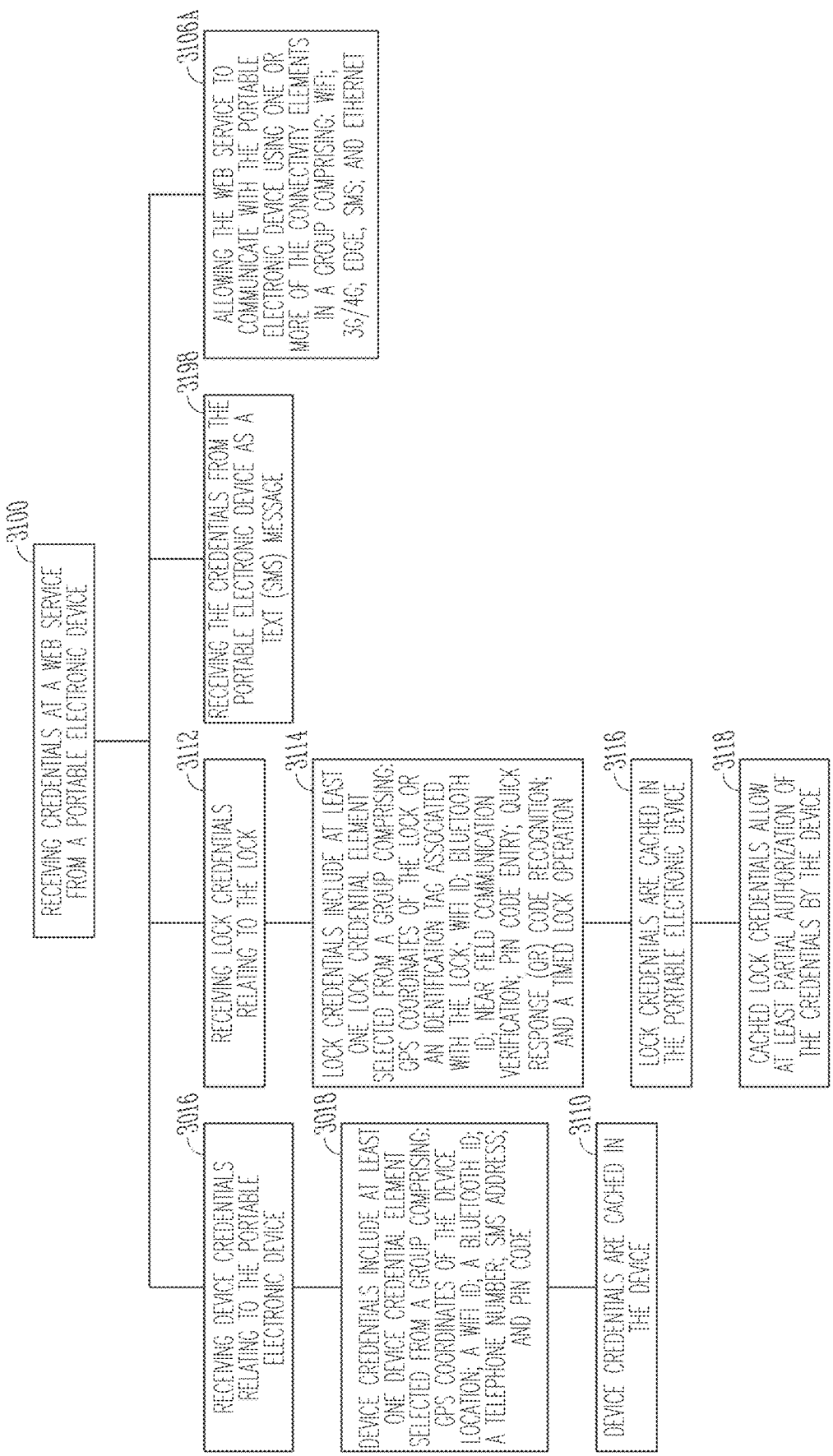
FIGS. 31-31G are charts showing methods according to example method embodiments.
Figure 31B:
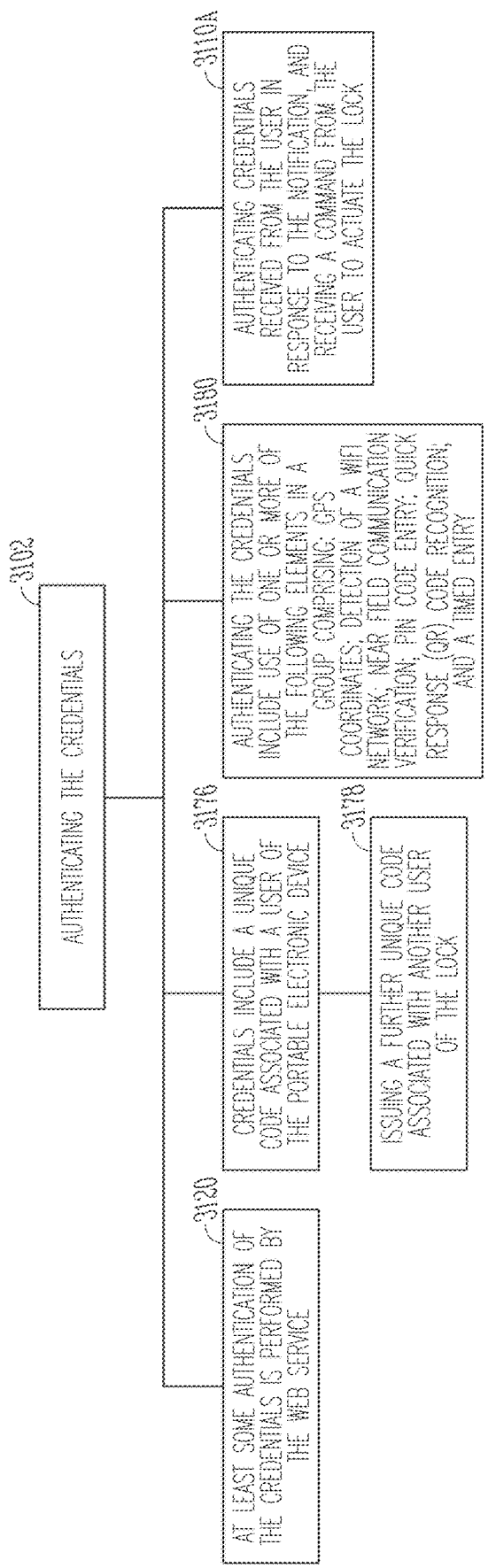
Figure 31C:
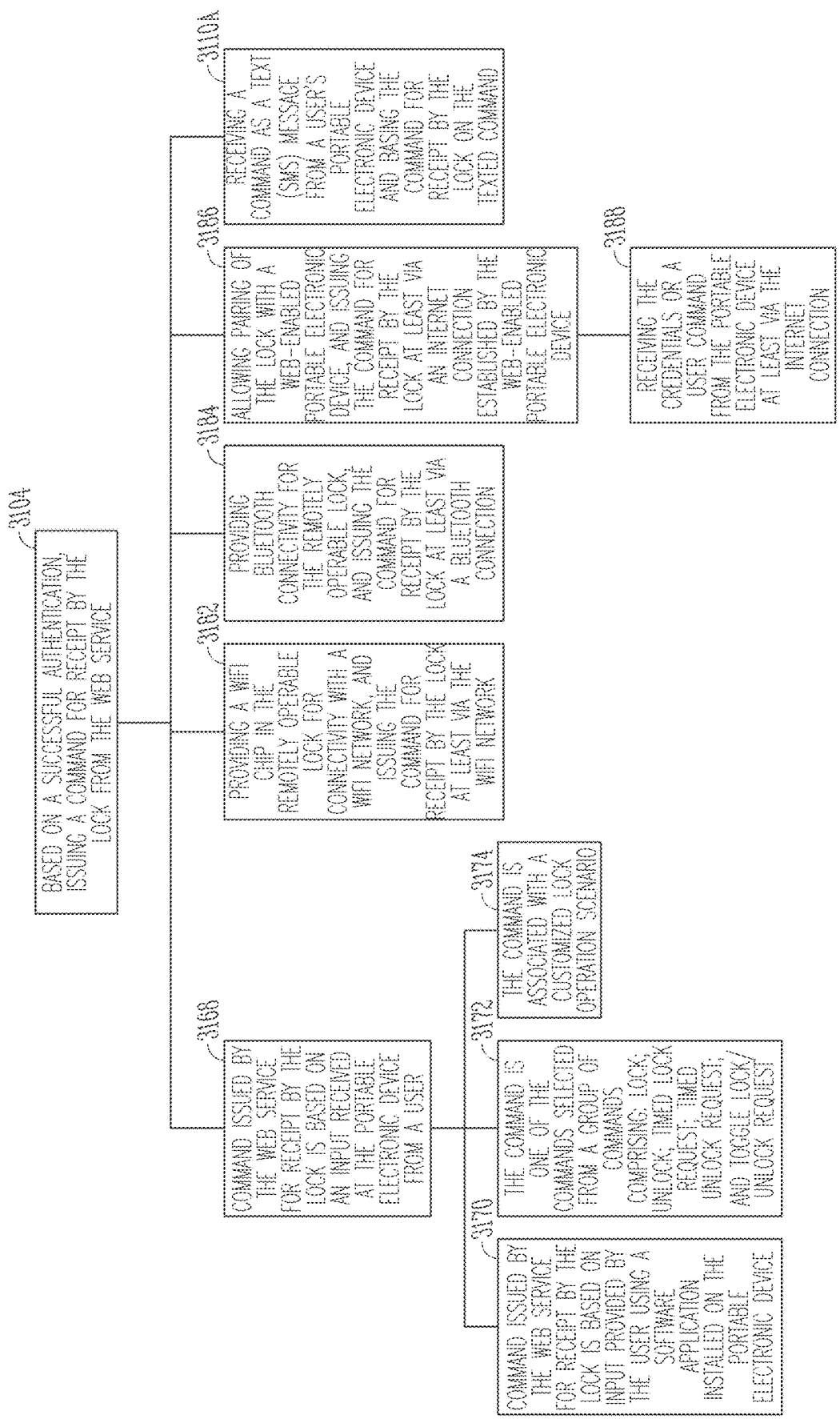
Figure 31D:
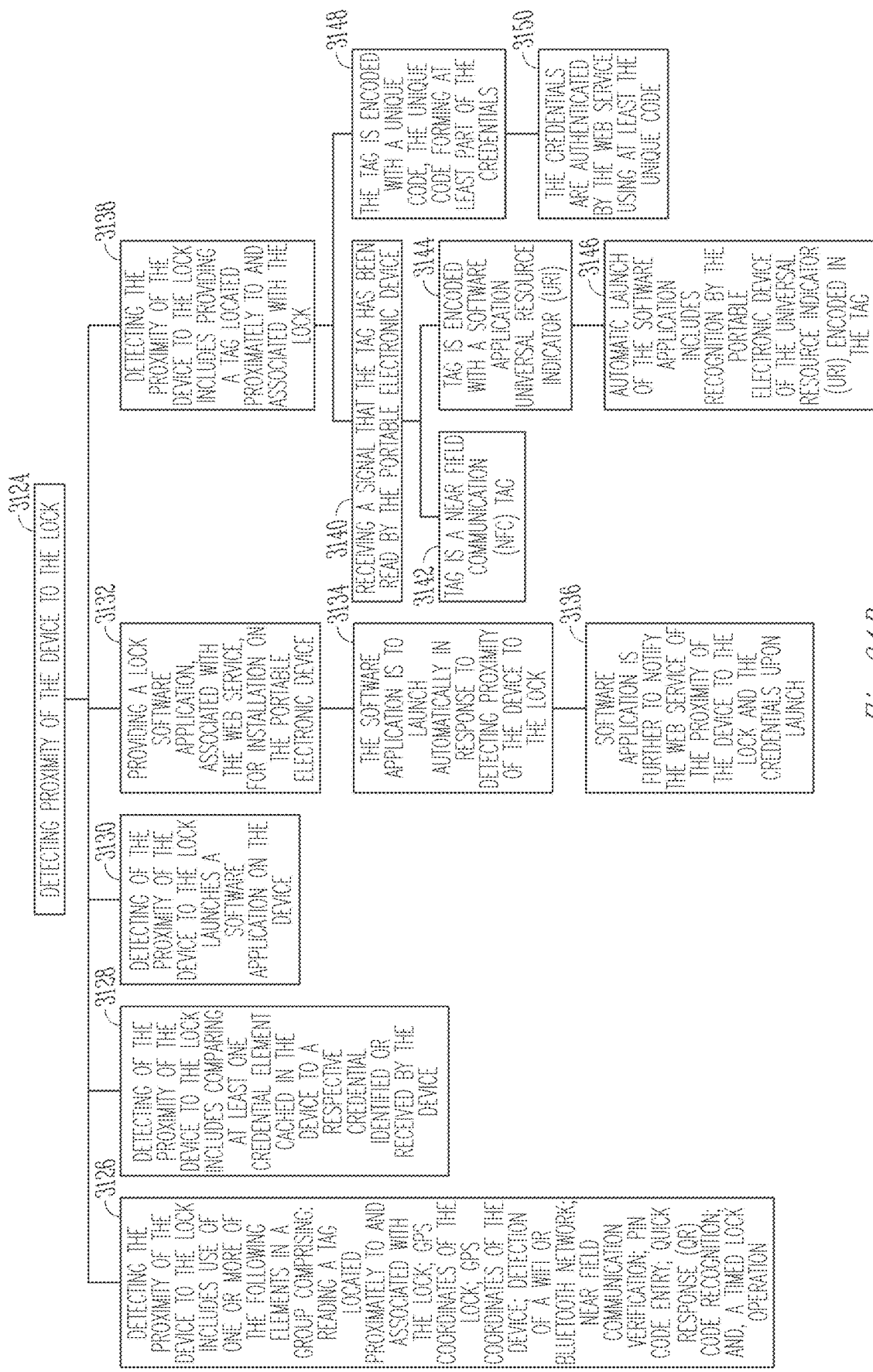
Figure 31H:
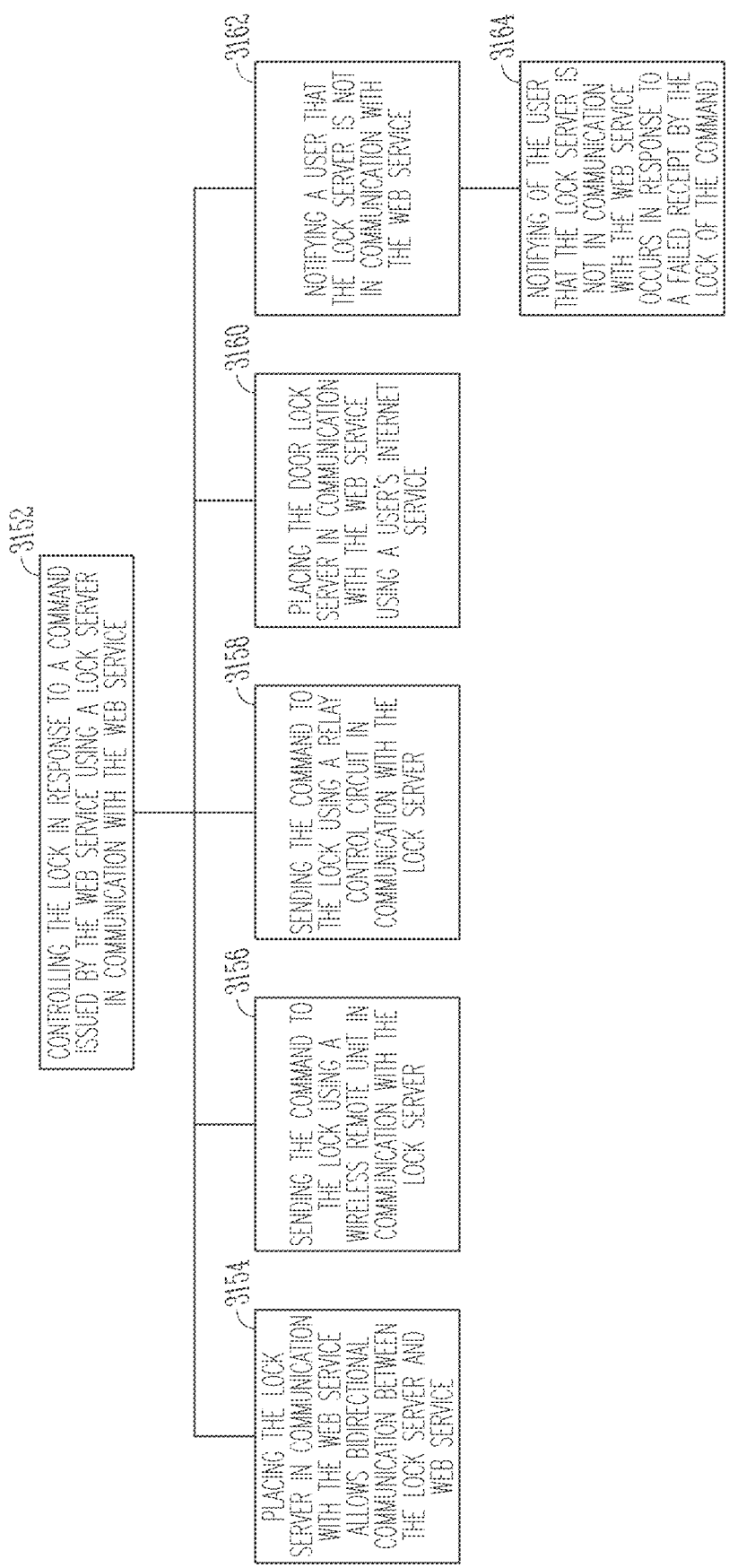
Figure 31G:
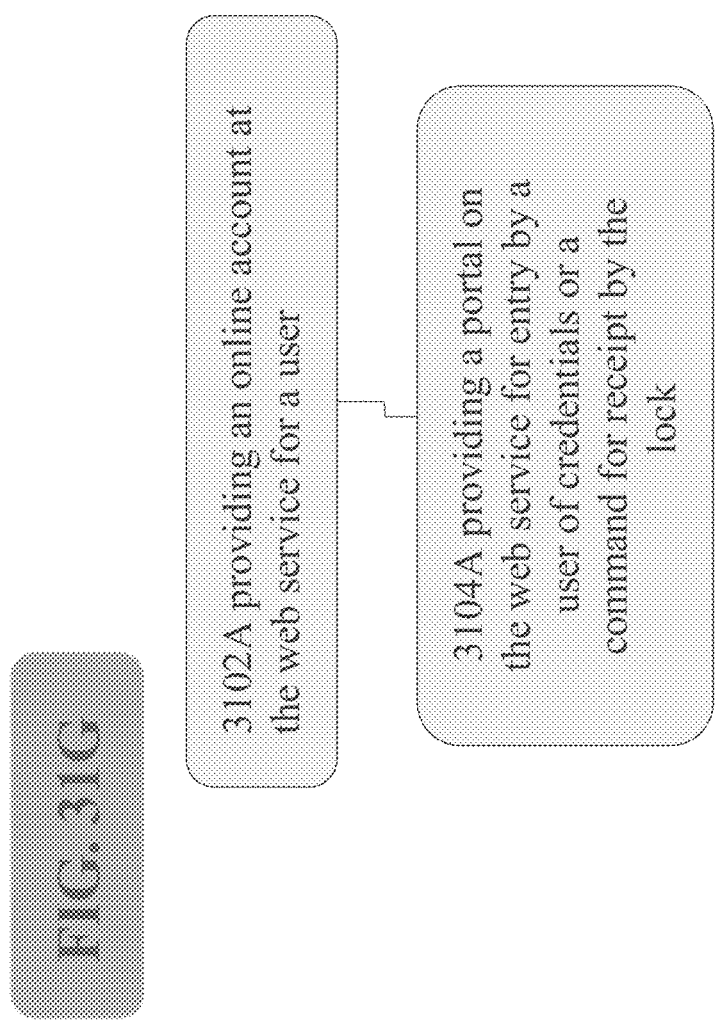

One such embodiment is illustrated in FIGS. 31-31G. In the example embodiment shown in FIG. 31, a method of operating a remotely operable lock comprises: at 3100, receiving credentials at a web service from a portable electronic device; at 3102, authenticating the credentials; and at 3104 based on a successful authentication, issuing a command for receipt by the lock from the web service.

In FIG. 31, the method may at 3122 further comprise notifying a user of the closest geographically nearby operable lock to the device based on receipt and authentication of the credentials, the geographically nearby operable lock being located within a determinable distance of the device. The method may further comprise at 3124 detecting proximity of the device to the lock.

In FIG. 31, the method of operating a remotely operable lock may further comprise, at 3152, controlling the lock in response to a command issued by the web service or portable electronic device using a lock server in communication with the web service or portable electronic device. In FIG. 31, the method may further comprise at 3166 using a remotely operable lock and notifying the user of successful actuation of the lock in response to the command.

In FIG. 31, the method may further comprise at 3190 providing a camera associated with the lock for taking a picture of a person seeking to operate the lock. At 3192, the method may further comprise providing a vibration sensor for detecting vibration of the lock or a door associated with the lock, and receiving a signal at least initiated by the vibration sensor.

In FIG. 31, the method may further comprise at 3102A providing an online account at the web service for a user. In FIG. 31G, the method may further comprise at 3104A providing a portal on the web service for entry by a user of credentials or a command for receipt by the lock.

In FIG. 31A, the receiving of the credentials at a web service from the portable electronic device 3100 may include at 3106 receiving device credentials relating to the portable electronic device. The device credentials may include at 3108 at least one device credential element selected from a group comprising: GPS coordinates of the device location; a Wi-Fi™ ID; a Bluetooth™ ID; a telephone number; SMS address; and pin code. The device credentials may at 3110 be cached in the device. The receiving of the credentials at a web service from the portable electronic device may include at 3112 receiving lock credentials relating to the lock. At 3114, the lock credentials may include at least one lock credential element selected from a group comprising: GPS coordinates of the lock or an identification tag associated with the lock; Wi-Fi™ ID; Bluetooth™ ID; Near Field Communication verification; pin code entry; Quick Response (QR) code recognition; and a timed lock operation. At 3116, at least some of the lock credentials may be cached in the portable electronic device. The cached lock credentials may at 3118 allow at least partial authorization of the credentials by the device. In FIG. 31B, authenticating the credentials 3102 may include at 3120 at least some authentication of the credentials being performed by the web service.

In FIG. 31A, the method may further comprise at 3198 receiving the credentials from the portable electronic device as a text (SMS) message. In FIG. 31C, the method may further comprise at 3100A receiving a command as a text (SMS) message from a user's portable electronic device and basing the command for receipt by the lock on the texted command.

In FIG. 31A, the method may further comprise at 3106A allowing the web service to communicate with the portable electronic device using one or more of the connectivity elements in a group comprising: Wi-Fi™; 3G/4G; EDGE (Enhanced Data rates for GSM Evolution), SMS (Short Message Service); and Ethernet. In FIG. 1, the method may further comprise at 3108A notifying a user of an attempt or request to operate the lock. In FIG. 31B, the method may further comprise at 3110A authenticating credentials received from the user in response to the notification, and receiving a command from the user to actuate the lock.

In FIG. 31B, the credentials may include at 3176 a unique code associated with a user of the portable electronic device. At 3178, a further unique code may be associated with another user of the lock. At 3180, authenticating the credentials may include use of one or more of the following elements in a group comprising: GPS coordinates; detection of a Wi-Fi™ network; Near Field Communication verification; pin code entry; Quick Response (QR) code recognition; and a timed entry.

In FIG. 31C, the command issued by the web service for receipt by the lock 3104 may be based at 3168 on an input received at the portable electronic device from a user. At 3170, the command issued by the web service for receipt by the lock may be based on input provided by the user using a software application installed on the portable electronic device. At 3172, the command is one of the commands selected from a group of commands comprising: lock; unlock; timed lock request; timed unlock request; and toggle lock/unlock request. At 3174, the command may be associated with a customized lock operation scenario.

In FIG. 31C, the method may further comprise at 3182 providing a Wi-Fi™ chip in the remotely operable lock for connectivity with a Wi-Fi™ network, and issuing the command for receipt by the lock at least via the Wi-Fi™ network. At 3184, Bluetooth™ connectivity may be provided for the remotely operable lock, and the command for receipt by the lock is issued at least via a Bluetooth™ connection. At 3186, the method may further allow pairing of the lock with a web-enabled portable electronic device, and issuing the command for receipt by the lock at least via an internet connection established by the web-enabled portable electronic device. At 3188, the method may further comprise receiving the credentials or a user command from the portable electronic device at least via the internet connection.

In FIG. 31D, detecting the proximity of the device to the lock 3124 may include at 3126 use of one or more of the following elements in a group comprising: reading a tag located proximately to and associated with the lock; GPS coordinates of the lock; GPS coordinates of the device; detection of a Wi-Fi™ or Bluetooth™ network; Near Field Communication verification; pin code entry; Quick Response (QR) code recognition; and, a timed lock operation. At 3128, detecting of the proximity of the device to the lock may include comparing at least one credential element cached in the device to a respective credential identified or received by the device. At 3130, detecting of the proximity of the device to the lock launches a software application on the device. At 3132, the method further comprises providing a lock software application, associated with the web service, for installation on the portable electronic device. At 3134, the software application is to launch automatically in response to detecting proximity of the device to the lock. At 3136, the software application is further to notify the web service of the proximity of the device to the lock and the credentials upon launch.

In FIG. 31D, detecting the proximity of the device to the lock 3124 may include at 3138 providing a tag located proximately to and associated with the lock. At 3140, the method may further comprise receiving a signal that the tag has been read by the portable electronic device. At 3142, the tag may be a Near Field Communication (NFC) tag. At 3144, the tag may be encoded with a software application Universal Resource Indicator (URI). At 3146, the automatic launch of the software application includes recognition by the portable electronic device of the Universal Resource Indicator (URI) encoded in the tag. At 3148, the tag may be encoded with a unique code, the unique code forming at least part of the credentials. At 3150, the credentials may be authenticated by the web service using at least the unique code.

In FIG. 31E, placing the lock server in communication with the web service may, at 3154, allow bidirectional communication between the lock server and web service. At 3156, the method may further comprise sending the command to the lock using a wireless remote unit in communication with the lock server. At 3158, the method may further comprise sending the command to the lock using a relay control circuit in communication with the lock server. At 3160, the method may further comprise placing the door lock server or lock in communication with the web service using a user's internet service. At 3162, the method may further comprise notifying a user that the lock server is not in communication with the web service. At 3164, notifying of the user that the lock server is not in communication with the web service may occur in response to a failed receipt by the lock of the command.

In FIG. 31F, the method may further comprise at 3194 notifying the user of the received signal initiated by the vibration sensor detecting vibration of the door or lock. Detecting vibration may at 3196 include detecting a user's special knock on the lock or door associated with the lock, the special knock forming part of the credentials.

Figure 32:
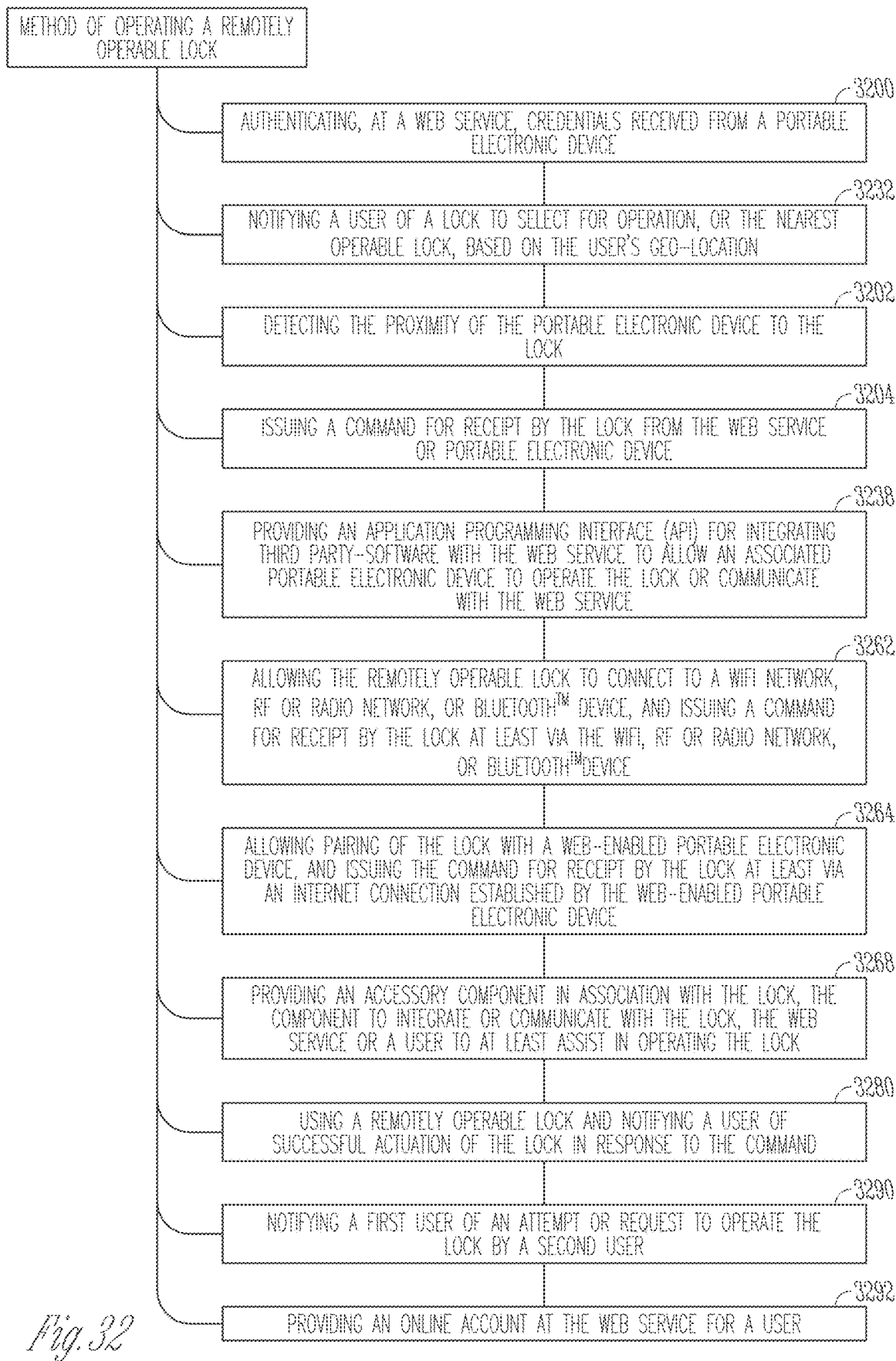
FIGS. 32-32G are charts showing methods according to example method embodiments.
Figure 32A:
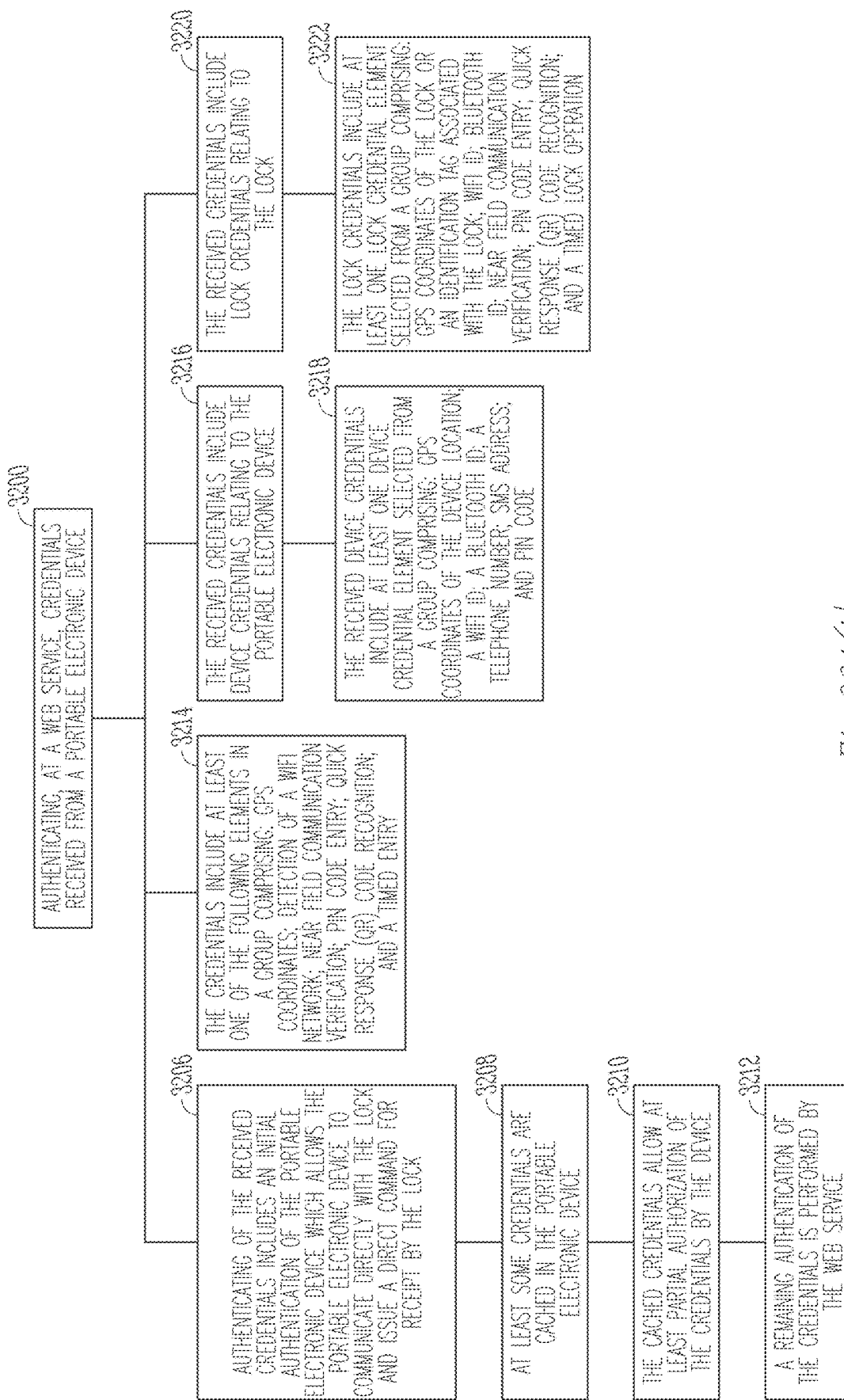
Figure 32B:
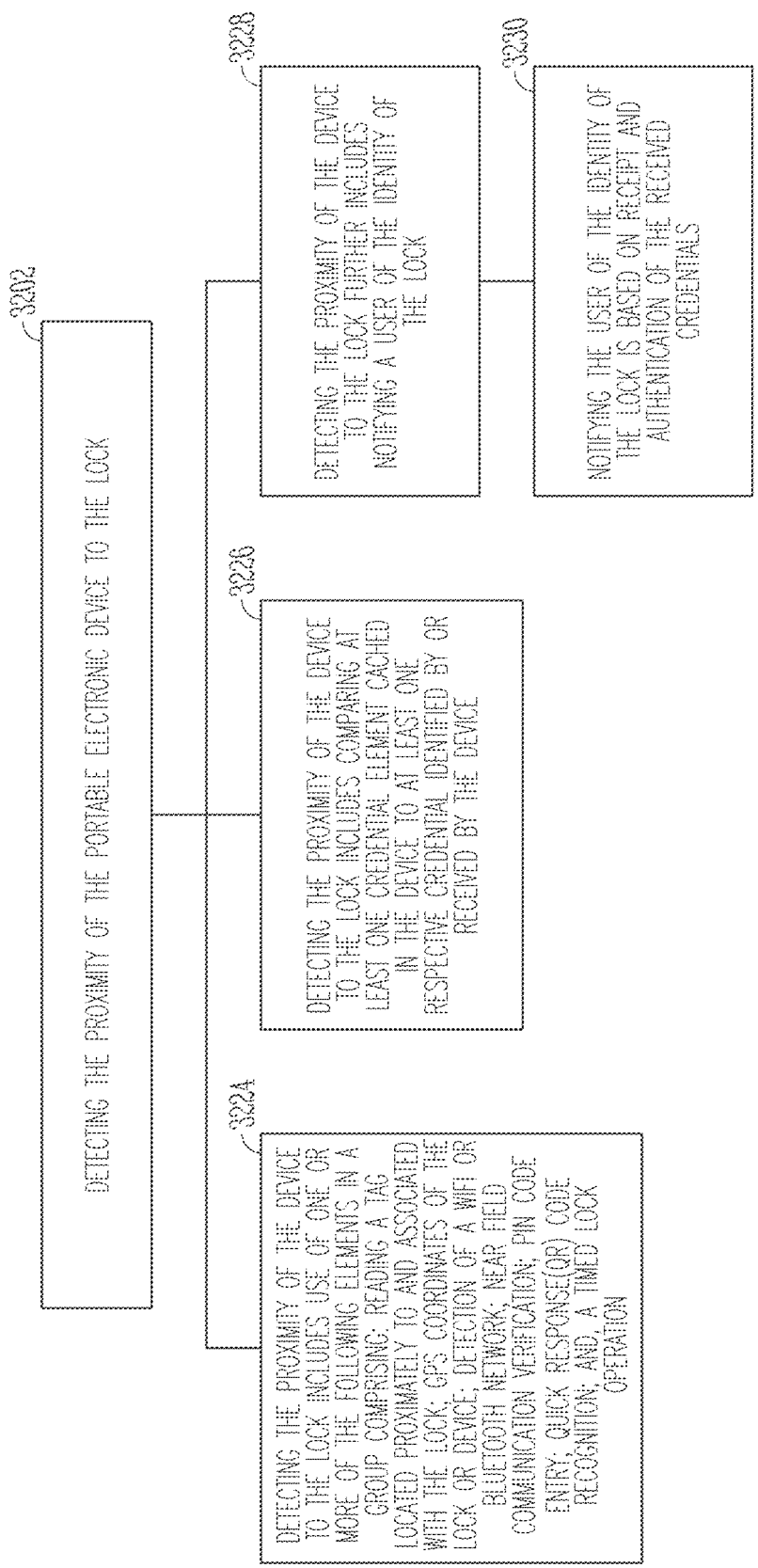
Figure 32H:
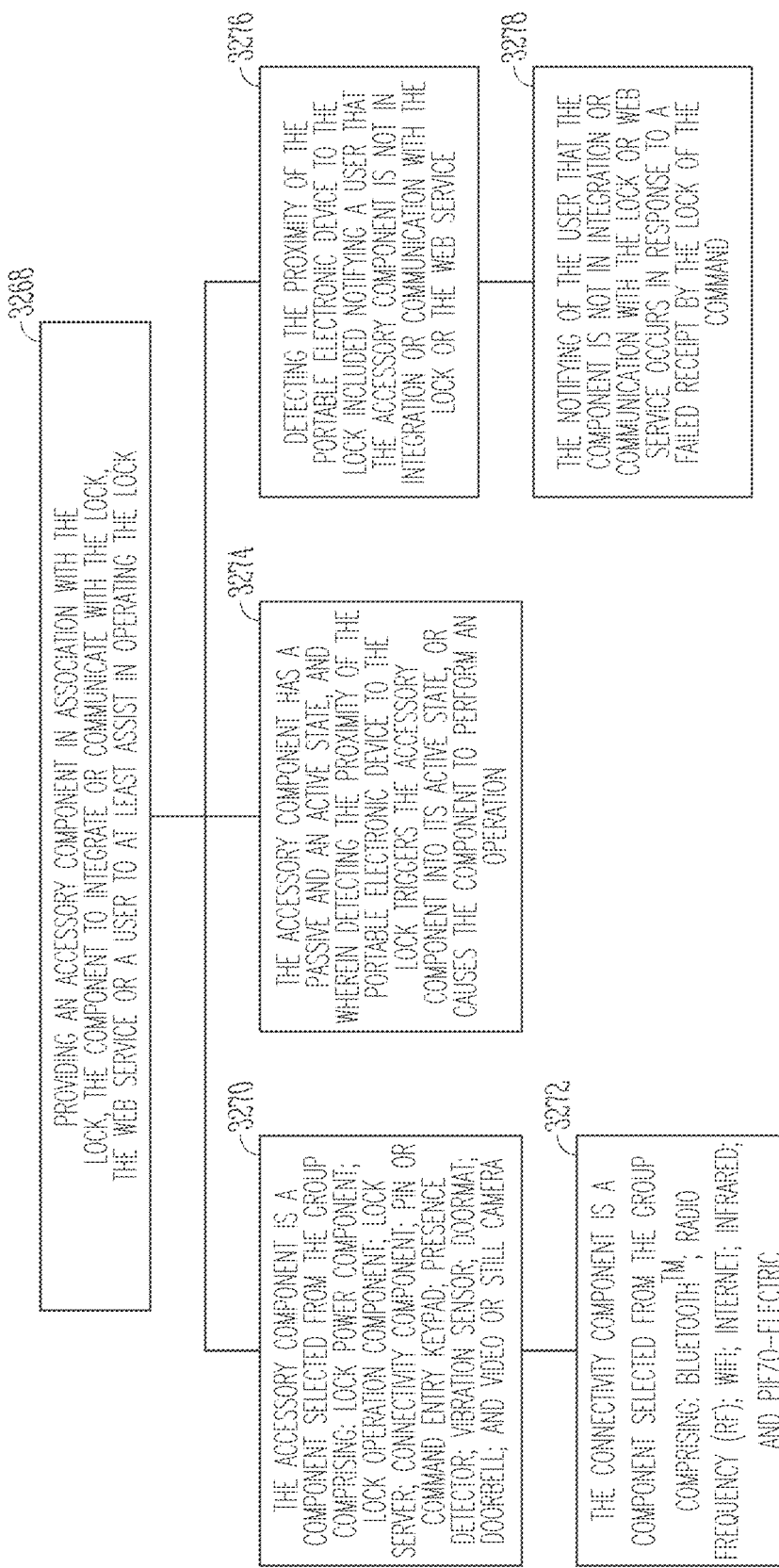
Figure 32G:
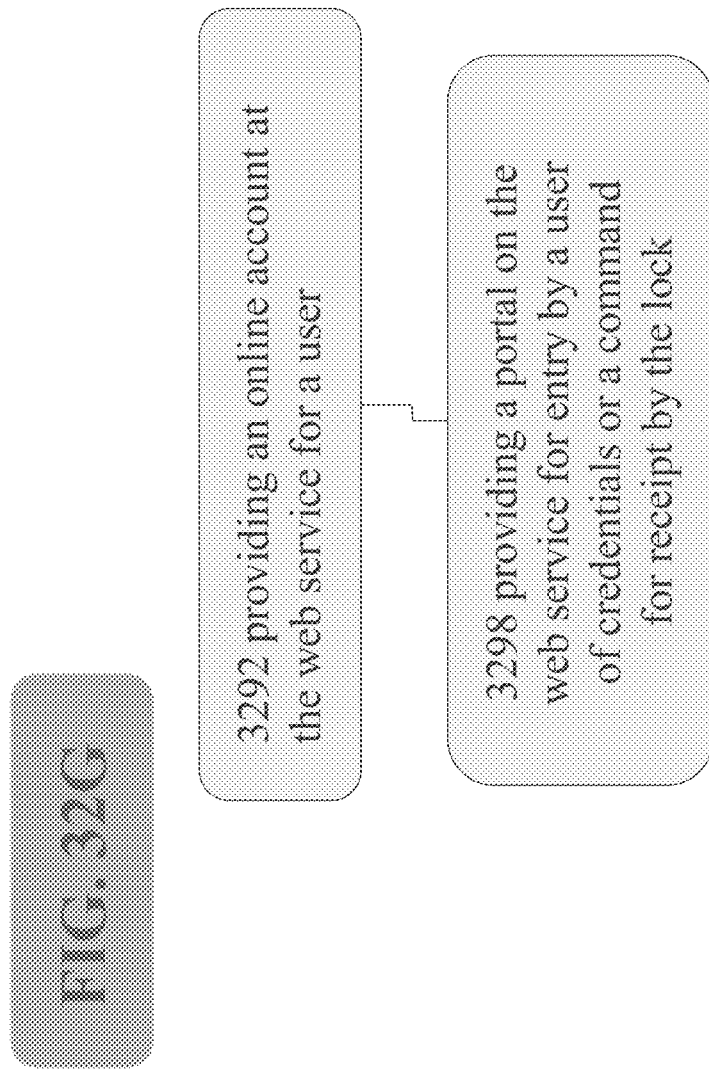

Another example method embodiment is illustrated in FIGS. 32-32G.

In the example embodiment shown in FIG. 32, a method of operating a remotely operable lock comprises: at 3200, authenticating, at a web service, credentials received from a portable electronic device; at 3202, detecting the proximity of the portable electronic device to the lock; and at 3204, issuing a command for receipt by the lock from the web service or portable electronic device.

In FIG. 32, the method may further comprise at 3232 notifying a user of a lock to select for operation, or the nearest operable lock, based on the user's geo-location. The method may further comprise at 3238 providing an application programming interface (API) for integrating third party software with the web service to allow an associated portable electronic device to operate the lock or communicate with the web service.

In FIG. 32, the method may further comprise at 3262, allowing the remotely operable lock to connect to a Wi-Fi™ network, RF or radio network, or Bluetooth™ device, and issuing a command for receipt by the lock at least via the Wi-Fi™, RF or radio network, or Bluetooth™ device. At 3264, the method may further comprise allowing pairing of the lock with a web-enabled portable electronic device, and issuing the command for receipt by the lock at least via an internet connection established by the web-enabled portable electronic device.

In FIG. 32, the method may further comprise at 3268 providing an accessory component in association with the lock, the component to integrate or communicate with the lock, the web service or a user to at least assist in operating the lock. In FIG. 32, the method may further comprise at 3280 using a remotely operable lock and notifying a user of successful actuation of the lock in response to the command. The method may further comprise at 3290 notifying a first user of an attempt or request to operate the lock by a second user. At 3292, the method may further comprise providing an online account at the web service for a user.

In FIG. 32A (i) the authenticating of the received credentials 3200 may include at 3206 an initial authentication of the portable electronic device which allows the portable electronic device to communicate directly with the lock and issue a direct command for receipt by the lock. At 3208, at least some credentials may be cached in the portable electronic device. At 3210, the cached credentials may allow at least partial authorization of the credentials by the device. At 3212, a remaining authentication of the credentials may be performed by the web service. At 3214, the credentials may include at least one of the following elements in a group comprising: GPS coordinates; detection of a Wi-Fi™ network; Near Field Communication verification; pin code entry; Quick Response (QR) code recognition; and a timed entry. At 3216, the received credentials may include device credentials relating to the portable electronic device. At 3218, the received device credentials may include at least one device credential element selected from a group comprising: GPS coordinates of the device location; a Wi-Fi™ ID; a Bluetooth™ ID; a telephone number; SMS address; and pin code. At 3220, the received credentials may include lock credentials relating to the lock. At 3222, the lock credentials may include at least one lock credential element selected from a group comprising: GPS coordinates of the lock or an identification tag associated with the lock; Wi- Fi™ ID; Bluetooth™ ID; Near Field Communication verification; pin code entry; Quick Response (QR) code recognition; and a timed lock operation.

In FIG. 32A (ii), the credentials may include at 3284 a unique code associated with a user of the portable electronic device. At 3286, the method may further comprise issuing a further unique code associated with another user of the lock. At 3288, the method may further comprise receiving the credentials from the portable electronic device as a text (SMS) message.

In FIG. 32B (i), detecting the proximity of the device to the lock 3202 may include at 3224 use of one or more of the following elements in a group comprising: reading a tag located proximately to and associated with the lock; GPS coordinates of the lock or device; detection of a Wi-Fi™ or Bluetooth™ network; Near Field Communication verification; pin code entry; Quick Response (QR) code recognition; and, a timed lock operation. At 3226, detecting the proximity of the device to the lock includes comparing at least one credential element cached in the device to at least one respective credential identified by or received by the device. At 3228, detecting the proximity of the device to the lock further includes notifying a user of the identity of the lock. At 3230, notifying the user of the identity of the lock is based on receipt and authentication of the received credentials.

In FIG. 32B (ii), detecting the proximity of the device to the lock 3202 automatically launches at 3234 a software application installed on the device. At 3236, the software application may be a third party application. At 3240, the command issued by the web service for receipt by the lock may be based on an input received at the portable electronic device from a user using the software application installed on the device. At 3242, the issued command may be one of the commands selected from a group of commands comprising: lock; unlock; timed lock request; timed unlock request; and toggle lock/unlock request. At 3244, the software application may be a lock software application, associated with the web service, for installation on the portable electronic device. At 3246, the software application may be further to notify the web service of the credentials upon launch.

In FIG. 32B (iii), detecting the proximity of the device to the lock 3202 may include at 3248 providing a tag located proximately to and associated with the lock, the tag to be read by the portable electronic device to launch the application. At 3250, the method may further comprise receiving a signal that the tag has been read by the portable electronic device. At 3252, the tag may be a Near Field Communication (NFC) tag. At 3254, the tag may be encoded with a software application Universal Resource Indicator (URI). At 3256, the launch of the software application includes recognition by the portable electronic device of the Universal Resource Indicator (URI) encoded in the tag. At 3258, the tag may be encoded with a unique code, the unique code forming at least part of the credentials. At 3260, the credentials may be authenticated by the web service using at least the unique code.

In FIG. 32C, issuing a command 3204 may at 3282 include a command associated with a customized lock operation. The method may further comprise at 3296 receiving a command as a text (SMS) message from a user's portable electronic device and basing the command for receipt by the lock on the texted command.

In FIG. 32D, allowing pairing 3264, further comprises at 3266 receiving or sending the credentials or a user command from the portable electronic device at least via the internet connection.

In FIG. 32E, the accessory component may be at 3270 a component selected from the group comprising: lock power component; lock operation component; lock server; connectivity component; pin or command entry keypad; presence detector; vibration sensor; doormat; doorbell; and video or still camera. At 3272, the connectivity component may be a component selected from the group of components comprising: Bluetooth™; Radio Frequency (RF); Wi-Fi™; internet; infrared; and piezo-electric. At 3274, the accessory component may have a passive and an active state, and wherein detecting the proximity of the portable electronic device to the lock triggers the accessory component into its active state, or causes the component to perform an operation. At 3276, detecting the proximity of the portable electronic device to the lock may include notifying a user that the accessory component is not in integration or communication with the lock or the web service. At 3278, notifying the user that the component is not in integration or communication with the lock or web service occurs in response to a failed receipt by the lock of the command.

In FIG. 32F, the method may further comprise at 3294 authenticating credentials received from the first user in response to the notification, and receiving a command from the first user to actuate the lock.

In FIG. 32G, the method may further comprise at 3298 providing a portal on the web service for entry by a user of credentials or a command for receipt by the lock.

Figure 33:
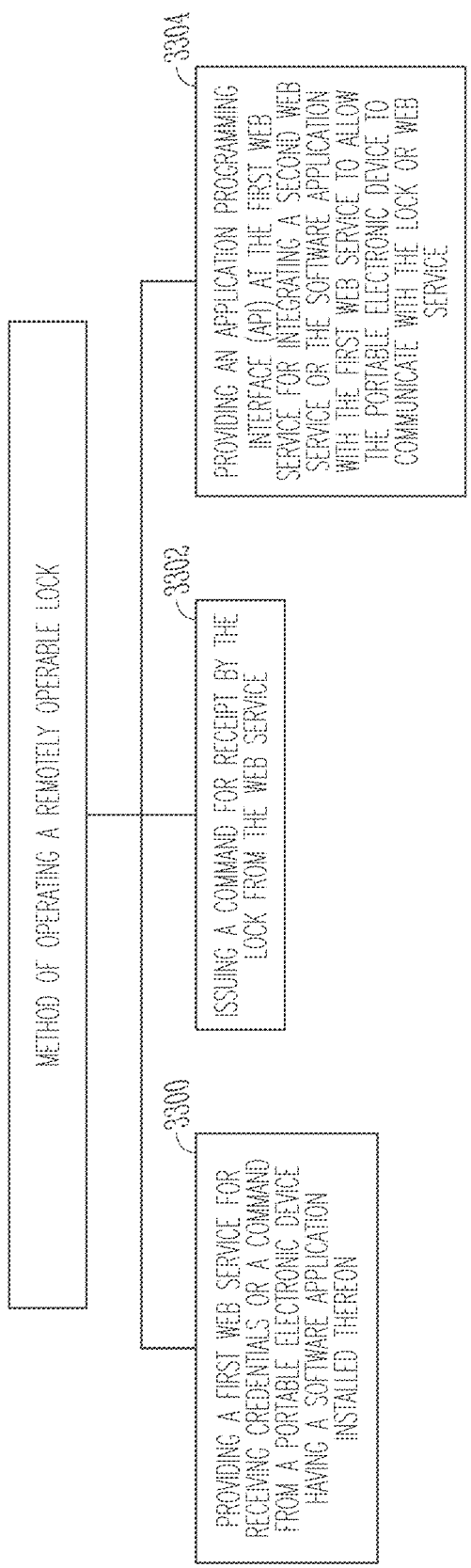
FIGS. 33-33C are charts showing methods according to example method embodiments.
Figure 33A:
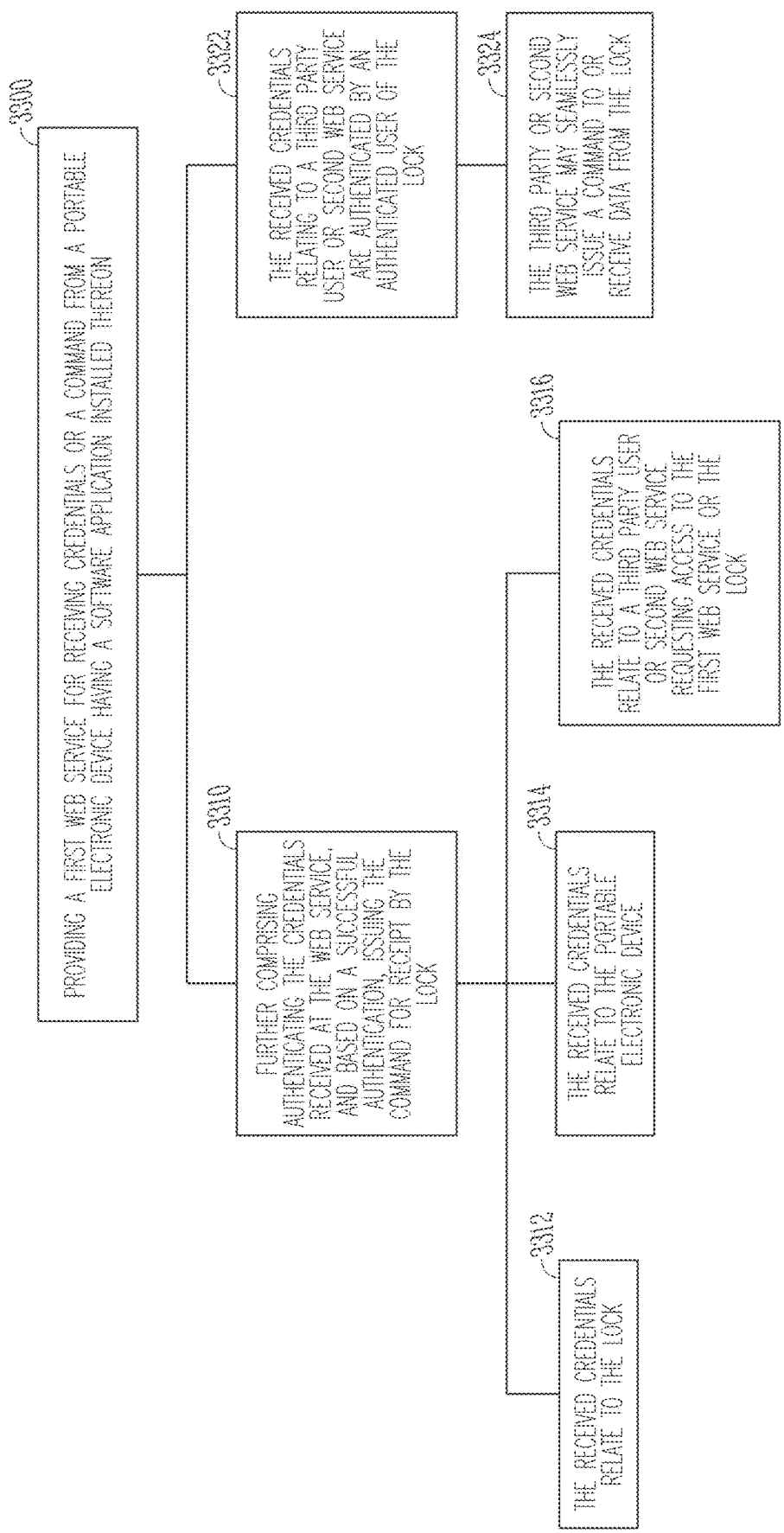
Figure 33B:
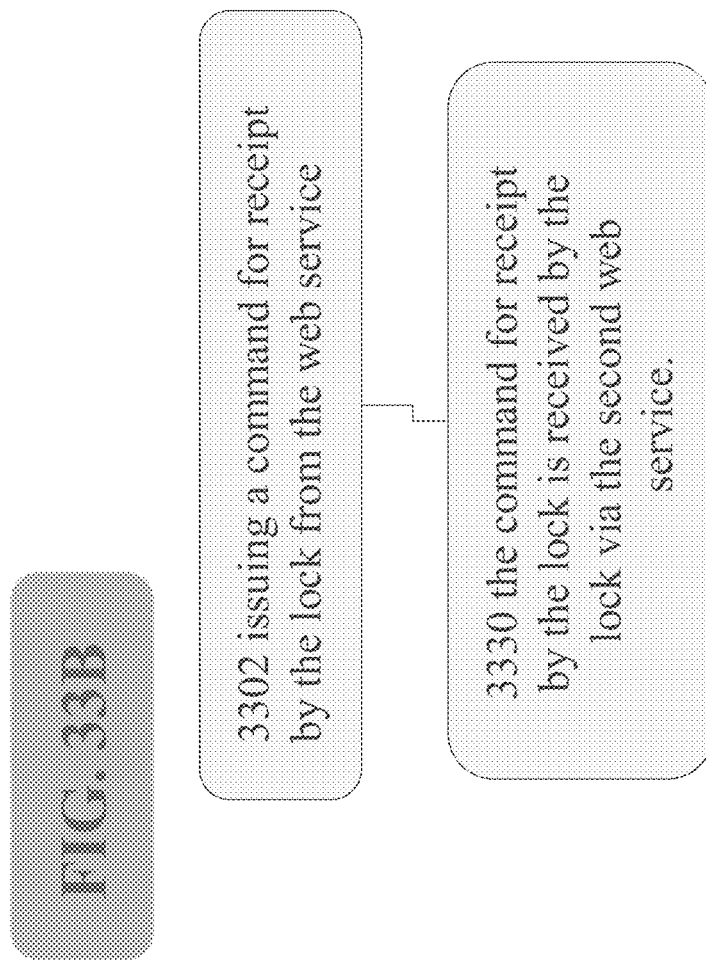
Figure 33C:
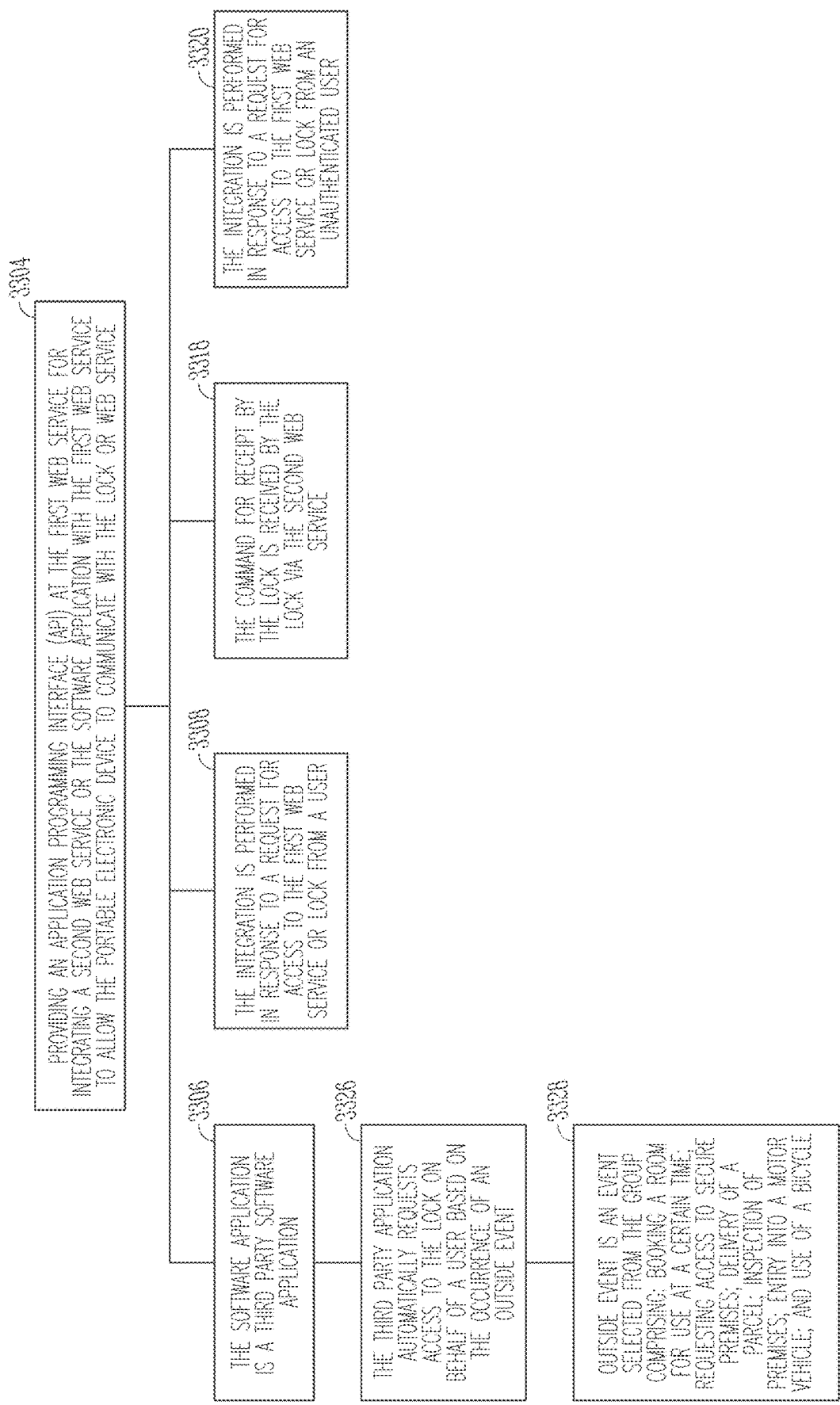

Another example method embodiment is illustrated in FIGS. 33-33C.

In the example embodiment shown in FIG. 33, a method of operating a remotely operable lock comprises: at 3300, providing a first web service for receiving credentials or a command from a portable electronic device having a software application installed thereon; at 3302, issuing a command for receipt by the lock from the web service; and at 3204, providing an application programming interface (API) at the first web service for integrating a second web service or the software application with the first web service to allow the portable electronic device to communicate with the lock or web service.

In FIG. 33A, the received credentials relating to a third party user or second web service may at 3322 be authenticated by an authenticated user of the lock. At 3324, the third party or second web service may seamlessly issue a command to or receive data from the lock.

In FIG. 33A, the method may further comprise at 3310 authenticating the credentials received at the web service, and based on a successful authentication, issuing the command for receipt by the lock. At 3312, the received credentials may relate to the lock. At 3314, the received credentials may relate to the portable electronic device. At 3316, the received credentials may relate to a third party user or second web service requesting access to the first web service or the lock.

In FIG. 33B, the command for receipt by the lock may at be received at 3330 by the lock via the second web service.

In FIG. 33C, the software application may be at 3306 a third party software application. At 3308, the integration is performed in response to a request for access to the first web service or lock from a user.

In FIG. 33C, the command for receipt by the lock may be received at 3318 by the lock via the second web service. At

3320, the integration is performed in response to a request for access to the first web service or lock from an unauthenticated user.

In FIG. 33C, the third party application at 3326 automatically requests access to the lock on behalf of a user based on the occurrence of an outside event. At 3328, the outside event may be an event selected from the group comprising: booking a room for use at a certain time; requesting access to secure premises; delivery of a parcel; inspection of premises; entry into a motor vehicle; and use of a bicycle.

These method embodiments are also referred to herein as "examples." Such examples can include method elements in addition to those shown or described. However, the present inventors also contemplate examples in which only those method elements shown or described are provided. Moreover, the present inventors also contemplate examples using any combination or permutation of those method elements shown or described above (or one or more aspects thereof), either with respect to a particular example (or one or more aspects thereof), or with respect to other examples (or one or more aspects thereof) shown or described herein.

Processor Implementation

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures usually require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 34:
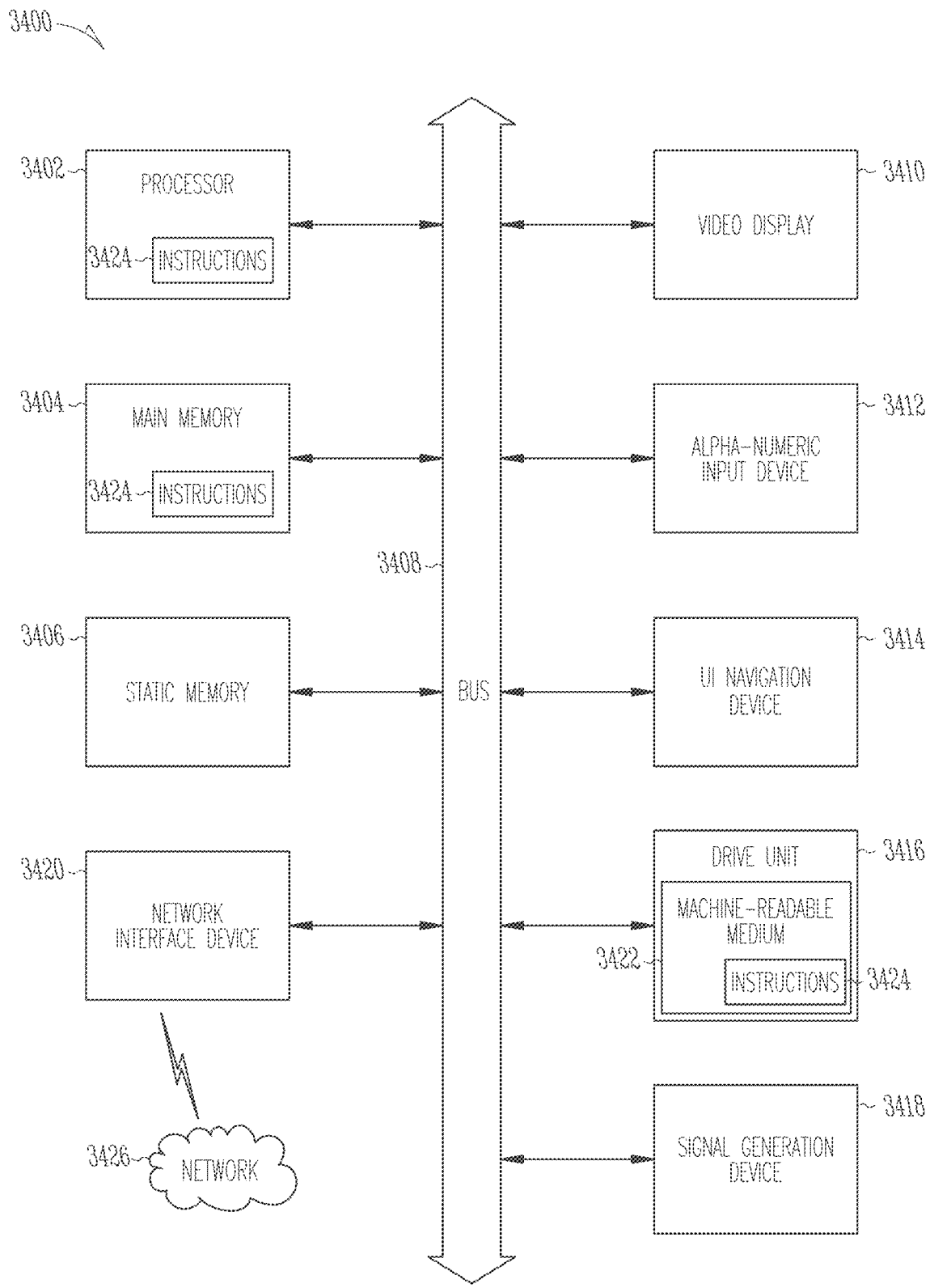
FIG. 34 is a block diagram of a machine in the example form of a computer system within which a set of instructions may be executed for causing the machine to perform any one or more of the methodologies herein discussed

FIG. 34 is a block diagram of machine in the example form of a computer system 3400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3400 includes a processor 3402 (e.g., a central processing unit (CPU), a graphics processing unit (GPU) or both), a main memory 3404 and a static memory 3406, which communicate with each other via a bus 3408. The computer system 500 may further include a video display unit 3410 (e.g., a liquid crystal display (LCD) or a cathode ray tube (CRT)). The computer system 500 also includes an alphanumeric input device 3412 (e.g., a keyboard), a user interface (UI) navigation or cursor control device 3414 (e.g., a mouse), a disk drive unit 3416, a signal generation device 3418 (e.g., a speaker) and a network interface device 3420.

Machine-Readable Medium

The disk drive unit 3416 includes a machine-readable medium 3422 on which is stored one or more sets of data structures and instructions 3424 (e.g., software) embodying or utilized by any one or more of the methodologies or functions described herein. The instructions 3424 may also reside, completely or at least partially, within the main memory 3404 and/or within the processor 3402 during execution thereof by the computer system 500, with the main memory 3404 and the processor 3402 also constituting machine-readable media.

While the machine-readable medium 3422 is shown in an example embodiment to be a single medium, the term "machine-readable medium" may include a single medium or multiple media (e.g., a centralized or distributed database, and/or associated caches and servers) that store the one or more data structures or instructions 3424. The term "machine-readable medium" shall also be taken to include any tangible medium that is capable of storing, encoding, or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 3424 may further be transmitted or received over a communications network 3426 using a transmission medium. The instructions 3424 may be transmitted using the network interface device 3420 and any one of a number of well-known transfer protocols (e.g., HTTP). Examples of communication networks include a LAN, a WAN, the Internet, mobile telephone networks, Plain Old Telephone (POTS) networks, and wireless data networks (e.g., Wi-Fi™ and WiMax™ networks). The term "transmission medium" shall be taken to include any intangible medium that is capable of storing, encoding or carrying instructions for execution by the machine, and includes digital or analog communications signals or other intangible media to facilitate communication of such software.

Non-Limiting Embodiments

While the invention has been described with reference to specific embodiments, it will be understood by those skilled in the art that various changes may be made and equivalents may be substituted for the elements thereof without departing from the true spirit and scope of the invention. In addition, modifications may be made without departing from the essential teachings of the invention. Moreover, each of the non-limiting examples described herein can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A non-transitory computer-readable medium storing instructions which, when executed, cause performance of a method by an access control device of a secured premises, the method comprising:
receiving, at the access control device, a command that instructs the access control device to enable access to the secured premises by a first entity, wherein the command is received by the access control device from a server computer after receipt by the server computer of an authentication code from a mobile device associated with the first entity, and wherein the authentication code is used by the server computer to authenticate the first entity before communication by the server computer of the command to the access control device;
after the command is received at the access control device, determining that the mobile device associated with the first entity is proximate to the access control device;
after the access control device receives the command, enabling, by the access control device, access to the secured premises after determining that the mobile device is proximate to the access control device and an authorization to access the secured premises has been granted to the first entity by a second entity with administrative status associated with the secured premises; and
communicating, by the access control device, a notification from the access control device to the server computer indicating the first entity has been granted access to the secured premises.

2. The non-transitory computer-readable medium of claim 1, wherein the method further comprises:
causing broadcast of a communication signal adjacent the access control device via a short-range wireless communication protocol; and
wherein the mobile device associated with the first entity is determined to be proximate to the access control device based on reception by the mobile device of the communication signal.

3. The non-transitory computer-readable medium of claim 2, wherein the method further comprises:
receiving a response via the short-range wireless communication protocol from the mobile device that indicates the reception; or
receiving a communication from the server computer that indicates the reception.

4. The non-transitory computer-readable medium of claim 2, wherein the short-range wireless communication protocol is selected from the group consisting of a near field communication protocol, a Bluetooth communication protocol, and a Wi-Fi communication protocol.

5. The non-transitory computer-readable medium of claim 1, wherein the method further comprises:
receiving, from the mobile device or the server computer, a location of the mobile device; and
wherein the first entity is determined to be proximate to the access control device based at least in part on comparison of the location of the mobile device with a location of the access control device or with an area adjacent the access control device.

6. The non-transitory computer-readable medium of claim 5, wherein the comparison is performed by at least one of the access control device, the mobile device, and the server computer.

7. The non-transitory computer-readable medium of claim 1, wherein the authorization to access the secured premises includes a temporal restriction, a spatial restriction, or a spatial-temporal restriction.

8. A method of granting access to a secured premises, the method comprising:
receiving, at an access control device at the secured premises, a command that instructs the access control device to enable access to the secured premises by a first entity, wherein the command is received by the access control device from a server computer after receipt by the server computer of an authentication code from a mobile device associated with the first entity, and wherein the authentication code is used by the server computer to authenticate the first entity before communication by the server computer of the command to the access control device;
after the command is received at the access control device, determining that the mobile device associated with the first entity is proximate to the access control device; and
after receiving the command, enabling, by the access control device, access to the secured premises after determining that the mobile device associated with the first entity is proximate to the access control device and an authorization to access the secured premises has been granted to the first entity by a second entity with administrative status associated with the secured premises.

9. The method of claim 8, further comprising:
causing broadcast of a communication signal adjacent the access control device via a short-range wireless communication protocol; and
wherein the mobile device associated with the first entity is determined to be proximate to the access control device based on reception by the mobile device of the communication signal.

10. The method of claim 9, further comprising:
receiving a response from the mobile device that indicates the reception; or
receiving a communication from the server computer that indicates the reception.

11. The method of claim 9, wherein the short-range wireless communication protocol is selected from the group consisting of a near field communication protocol, a Bluetooth communication protocol, and a Wi-Fi communication protocol.

12. The method of claim 8, further comprising:
receiving, from the mobile device or the server computer, a location of the mobile device; and
wherein the first entity is determined to be proximate to the access control device based at least in part on comparison of the location of the mobile device with a location of the access control device or with an area adjacent the access control device.

13. The method of claim 12, wherein the comparison is performed by at least one of the access control device, the mobile device, and the server computer.

14. The method of claim 8, wherein the authorization to access the secured premises includes a temporal restriction, a spatial restriction, or a spatial-temporal restriction.

15. The method of claim 8, further comprising:
communicating, by the access control device, a notification from the access control device to the server computer indicating the first entity has been granted access to the secured premises.

16. The method of claim 8, further comprising:
receiving, at the access control device, a command that instructs the access control device to revoke access to the secured premises by the first entity, wherein the command is received by the access control device from the server computer; and
in response to receiving the command, revoking, by the access control device, access to the secured premises by the first entity.

17. A non-transitory computer-readable medium storing instructions which, when executed, cause performance of a method by an access control device of a secured premises, the method comprising:
receiving, at the access control device, a command that instructs the access control device to enable access to the secured premises by a first entity, wherein the command is received by the access control device from a server computer after receipt by the server computer of an authentication code from a mobile device associated with the first entity, and wherein the authentication code is used by the server computer to authenticate the first entity before communication by the server computer of the command to the access control device;
after the command is received at the access control device, causing broadcast of a communication signal adjacent the access control device via a short-range wireless communication protocol;
receiving a response via the short-range wireless communication protocol from the mobile device that indicates reception of the signal by the mobile device;
in response to the access control device determining that the mobile device is proximate to the access control device; and
after the access control device receives the command, enabling, by the access control device, access to the secured premises after determining that the mobile device is proximate to the access control device and an authorization to access the secured premises has been granted to the first entity by a second entity with administrative status associated with the secured premises.

18. The non-transitory computer-readable medium of claim 17, wherein the method further comprises:
receiving, from the mobile device or the server computer, a location of the mobile device; and
wherein the first entity is determined to be proximate to the access control device based at least in part on comparison of the location of the mobile device with a location of the access control device or with an area adjacent the access control device.

19. The non-transitory computer-readable medium of claim 18, wherein the comparison is performed by at least one of the access control device, the mobile device, and the server computer.

20. The non-transitory computer-readable medium of claim 17, wherein the authorization to access the secured premises includes a temporal restriction, a spatial restriction, or a spatial-temporal restriction.

* * * * *